(12) United States Patent
Milbourne et al.

(10) Patent No.: US 7,404,781 B2
(45) Date of Patent: *Jul. 29, 2008

(54) MULTISPEED POWER TOOL TRANSMISSION

(75) Inventors: Rodney Milbourne, Abington, MD (US); Christine Potter, Baltimore, MD (US); Todd A. Hagan, Windsor, PA (US); Michael C. Bowers, Littlestown, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,173

(22) Filed: Oct. 30, 2007

(65) Prior Publication Data

US 2008/0051247 A1 Feb. 28, 2008

Related U.S. Application Data

(60) Division of application No. 11/733,493, filed on Apr. 10, 2007, which is a continuation of application No. 11/507,060, filed on Aug. 18, 2006, now Pat. No. 7,223,195, which is a continuation of application No. 10/792,659, filed on Mar. 3, 2004, now Pat. No. 7,101,300, which is a continuation-in-part of application No. 10/384,809, filed on Mar. 10, 2003, now Pat. No. 6,984,188, which is a division of application No. 09/964,078, filed on Sep. 26, 2001, now Pat. No. 6,676,557.

(60) Provisional application No. 60/263,379, filed on Jan. 23, 2001.

(51) Int. Cl.
*F16H 3/44* (2006.01)

(52) U.S. Cl. ............. 475/298; 475/263; 475/264; 475/275; 475/317; 475/320; 475/330; 173/47; 173/178; 173/216; 173/217

(58) Field of Classification Search ......... 475/263, 475/264, 270, 275, 279, 286, 298, 305, 317, 475/320, 330; 192/3.52, 17 R, 48.91, 56.61; 173/47, 48, 178, 216, 217; 464/38
See application file for complete search history.

(56) References Cited

U.S. PATENT DOCUMENTS

| 1,228,472 A | 6/1917 | Olson |
|---|---|---|
| 1,401,659 A | 12/1921 | Ward |
| 1,404,984 A | 1/1922 | Lower |
| 1,427,599 A | 8/1922 | Johanson |

(Continued)

FOREIGN PATENT DOCUMENTS

DE 37 20 633 1/1988

(Continued)

OTHER PUBLICATIONS

FESTO Catalogue 96/97, pp. 1 through 4 and 10 through 19.

(Continued)

*Primary Examiner*—David D. Le
(74) *Attorney, Agent, or Firm*—Harness, Dickey & Pierce, P.L.C.

(57) ABSTRACT

A method for operating a portable power tool having a multi-stage, three-speed transmission.

20 Claims, 47 Drawing Sheets

U.S. PATENT DOCUMENTS

| | | | |
|---|---|---|---|
| 1,514,872 A | 11/1924 | Starr |
| 1,693,139 A | 11/1928 | Dietsche |
| 1,777,997 A | 10/1930 | Wise |
| 1,792,484 A | 2/1931 | Fawick |
| 1,909,330 A | 5/1933 | Banker |
| 2,066,952 A | 1/1937 | Tornebohm |
| 2,137,778 A | 11/1938 | McCullough |
| 2,331,684 A | 10/1943 | Henningsen |
| 2,466,683 A | 4/1949 | Buckendale |
| 2,493,592 A | 1/1950 | Peabody |
| 2,848,908 A | 8/1958 | Hollis |
| 2,899,030 A | 8/1959 | Douglas et al. |
| 2,911,854 A | 11/1959 | Fabian |
| 2,949,795 A | 8/1960 | Morey et al. |
| 3,055,236 A | 9/1962 | Born, Jr. |
| 3,127,801 A | 4/1964 | Binns |
| 3,491,863 A | 1/1970 | Karlsson et al. |
| 3,513,724 A | 5/1970 | Box |
| 3,774,476 A | 11/1973 | Sohnlein et al. |
| 3,872,742 A | 3/1975 | States et al. |
| 3,878,926 A | 4/1975 | Adachi et al. |
| 3,901,104 A | 8/1975 | Sims |
| 4,070,927 A | 1/1978 | Polak |
| 4,178,813 A | 12/1979 | Smemo |
| 4,181,041 A | 1/1980 | Frost |
| 4,189,960 A | 2/1980 | Holdeman |
| 4,274,023 A | 6/1981 | Lamprey |
| 4,274,304 A | 6/1981 | Curtiss |
| 4,347,762 A | 9/1982 | Holdeman |
| 4,366,871 A | 1/1983 | Dieterle et al. |
| 4,418,766 A | 12/1983 | Grossmann et al. |
| 4,448,098 A | 5/1984 | Totsu et al. |
| 4,453,430 A | 6/1984 | Sell et al. |
| 4,493,223 A | 1/1985 | Kishi et al. |
| 4,536,688 A | 8/1985 | Roger et al. |
| 4,569,252 A | 2/1986 | Harper et al. |
| 4,585,077 A | 4/1986 | Bergler et al. |
| 4,617,837 A | 10/1986 | Kataoka et al. |
| 4,641,551 A | 2/1987 | Pascaloff |
| 4,644,822 A | 2/1987 | Batchelor |
| 4,651,580 A | 3/1987 | Deane et al. |
| 4,710,071 A | 12/1987 | Koehler et al. |
| 4,757,598 A | 7/1988 | Redman |
| 4,772,765 A | 9/1988 | Markle et al. |
| 4,791,833 A | 12/1988 | Sakai et al. |
| 4,805,485 A | 2/1989 | Ida et al. |
| 4,842,078 A | 6/1989 | Hansson et al. |
| 4,869,131 A | 9/1989 | Ohmori et al. |
| 4,875,528 A | 10/1989 | Thackston |
| 4,892,013 A | 1/1990 | Satoh et al. |
| 4,908,926 A | 3/1990 | Takeshima et al. |
| 5,005,682 A | 4/1991 | Young et al. |
| 5,019,023 A | 5/1991 | Kurosawa et al. |
| 5,046,998 A | 9/1991 | Frost |
| 5,050,291 A | 9/1991 | Gilmore |
| 5,159,986 A | 11/1992 | Hoser et al. |
| 5,176,593 A | 1/1993 | Yasui et al. |
| 5,277,527 A | 1/1994 | Yokota et al. |
| 5,282,510 A | 2/1994 | Pacher et al. |
| 5,301,565 A | 4/1994 | Weismann et al. |
| 5,339,908 A | 8/1994 | Yokota et al. |
| 5,411,447 A | 5/1995 | Frost |
| 5,451,127 A | 9/1995 | Chung et al. |
| 5,550,416 A | 8/1996 | Fanchang et al. |
| 5,551,927 A | 9/1996 | Enzmann et al. |
| 5,573,074 A | 11/1996 | Thames et al. |
| 5,588,930 A | 12/1996 | Chen et al. |
| 5,598,911 A | 2/1997 | Joachim et al. |
| 5,601,491 A | 2/1997 | Chan et al. |
| 5,692,575 A | 12/1997 | Hellstrom et al. |
| 5,704,433 A | 1/1998 | Bourner et al. |
| 5,730,232 A | 3/1998 | Mixer |
| 5,842,527 A | 12/1998 | Arakawa et al. |
| 5,897,454 A | 4/1999 | Cannaliato |
| 5,903,462 A | 5/1999 | Wagner et al. |
| 5,954,608 A | 9/1999 | Kirkwood et al. |
| 5,967,934 A | 10/1999 | Ishida et al. |
| 6,062,114 A | 5/2000 | Rahm et al. |
| 6,070,675 A | 6/2000 | Mayer et al. |
| 6,076,438 A | 6/2000 | Rahm et al. |
| 6,086,502 A | 7/2000 | Chung et al. |
| 6,093,128 A | 7/2000 | Seith |
| 6,142,242 A | 11/2000 | Okumura et al. |
| 6,223,833 B1 | 5/2001 | Thurler et al. |
| 6,305,481 B1 | 10/2001 | Yamazaki et al. |
| 6,431,289 B1 | 8/2002 | Potter et al. |
| 6,457,535 B1 | 10/2002 | Tanaka et al. |
| 6,502,648 B2 | 1/2003 | Milbourne |
| 6,599,219 B2 | 7/2003 | Pan |
| 6,655,470 B1 | 12/2003 | Chen et al. |
| 6,676,557 B2 | 1/2004 | Milbourne et al. |
| 6,796,921 B1 | 9/2004 | Buck et al. |
| 6,805,207 B2 | 10/2004 | Hagan et al. |
| 6,857,983 B2 | 2/2005 | Milbourne et al. |
| 6,983,810 B2 | 1/2006 | Hara et al. |
| 6,984,188 B2 | 1/2006 | Potter et al. |
| 7,121,361 B2 | 10/2006 | Hara et al. |
| 2004/0211576 A1 | 10/2004 | Milbourne et al. |
| 2005/0028997 A1 | 2/2005 | Hagan et al. |
| 2005/0061521 A1 | 3/2005 | Saito et al. |
| 2005/0061524 A1 | 3/2005 | Hagan et al. |

FOREIGN PATENT DOCUMENTS

| | | |
|---|---|---|
| DE | 39 04 085 | 8/1990 |
| DE | 40 38 226 | 6/1992 |
| DE | 40 38 502 | 6/1992 |
| DE | 42 13 291 | 10/1993 |
| DE | 44 06 018 | 4/1995 |
| DE | 19719923 | 11/1998 |
| DE | 199 03 863 | 8/2000 |
| EP | 88101883.2 | 2/1988 |
| EP | 0 519 121 | 12/1992 |
| EP | 0 787 931 | 8/1997 |
| FR | 1 072 143 | 9/1954 |
| GB | 2 102 515 | 2/1983 |
| JP | 49 56 276 | 5/1974 |
| JP | 57 139 330 | 8/1982 |
| JP | 58 4 308 | 1/1983 |
| JP | 62224584 | 10/1987 |
| JP | 63101545 | 5/1988 |
| JP | 63 96 354 | 6/1988 |
| JP | 60 34 275 | 2/1994 |
| JP | 06320435 | 11/1994 |
| WO | WO-97/33721 | 9/1997 |
| WO | WO-99/16585 | 4/1999 |
| WO | WO-00/23727 | 4/2000 |

OTHER PUBLICATIONS

FESTOOL Festo Tooltechnic CDD 9,6ES Exploded View (457 895/10.99).
Tools of the Trade Online: Stop the Pain (Spring 1998).
Print-out of parts list for Bosch Cordless Drill 0 601 938 520 GBM 12 VES-2.
Print-out of parts list for Bosch Battery Operated Drill 0 601 933 503 GBM 12 VES-3.
Print-out of parts list for Bosch Cordless Drill 0 601 933 434 GBM 12 VSP-3.
Print-out of parts for Bosch Drill 0 601 130 203 GBM 32-4.
"Buck Request for Adverse Judgment" (filed Jan. 15, 2008), in the matter of *Buck* v. *Milbourne,* USPTO, BPAI, Patent Interference No. 105,570 (SCM) (Technology Center 3700).

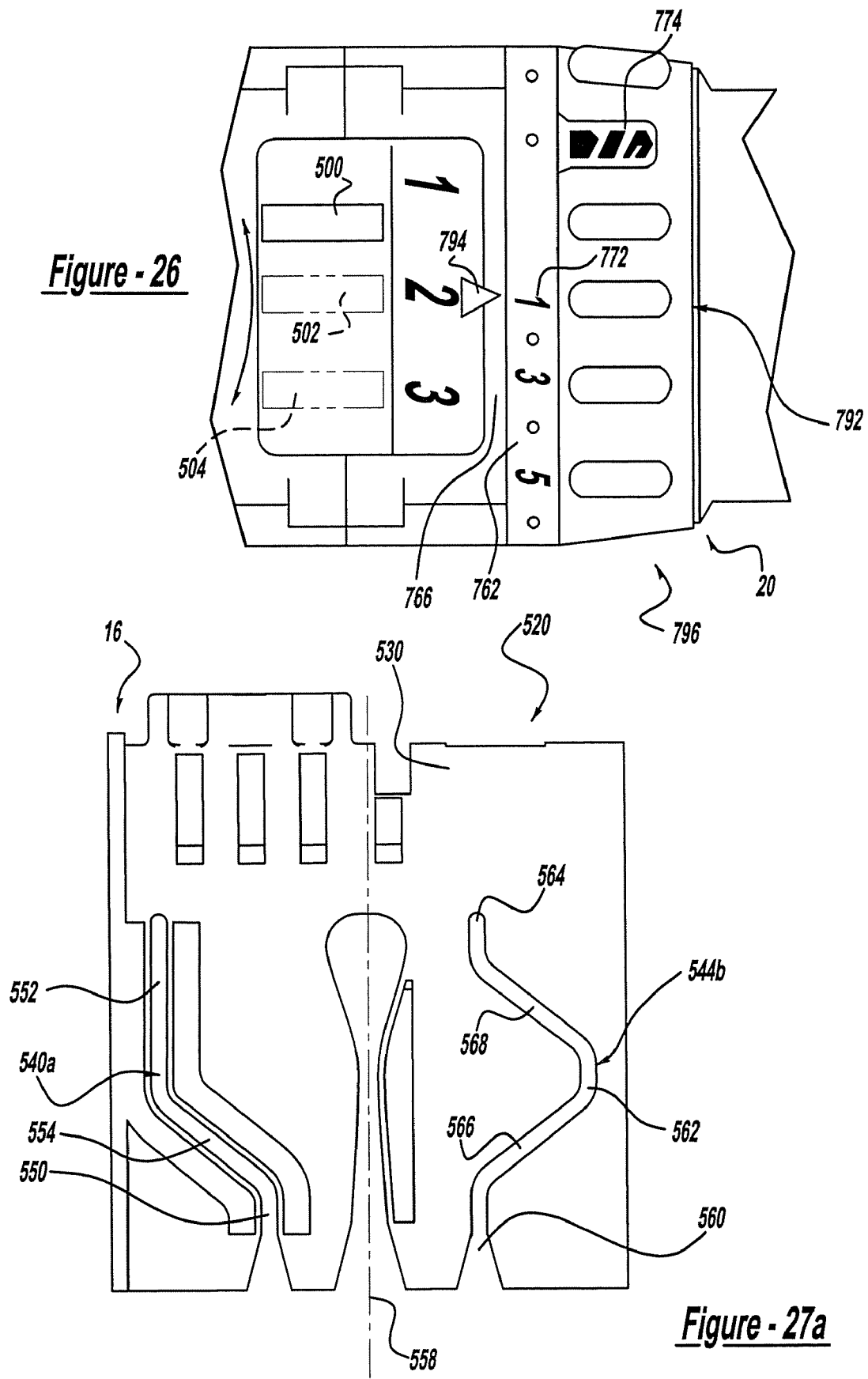

MULTISPEED POWER TOOL TRANSMISSION

PRIORITY & CROSS-REFERENCE TO RELATED APPLICATIONS

This application is a divisional application of U.S. application Ser. No. 11/733,493 filed Apr. 10, 2007, which is a continuation of U.S. application Ser. No. 11/507,060 filed Aug. 18, 2006 (now U.S. Pat. No. 7,223,195 issued May 29, 2007), which is a continuation of U.S. application Ser. No. 10/792,659 filed Mar. 3, 2004 (now U.S. Pat. No. 7,101,300 issued Sep. 5, 2006), which is a continuation-in-part of U.S. application Ser. No. 10/384,809 filed Mar. 10, 2003 (now U.S. Pat. No. 6,984,188 issued Jan. 10, 2006), which is a divisional of U.S. application Ser. No. 09/964,078 filed Sep. 26, 2001 (now U.S. Pat. No. 6,676,557 issued Jan. 13, 2004), which claims the benefit of U.S. Provisional Application No. 60/263,379, filed Jan. 23, 2001. Basis for the classification of the present application as a divisional application within the meaning of 35 U.S.C. §121 and the version of 37 C.F.R. §1.78 in effect at the time of the filing of the present application can be found, for example, in a restriction requirement mailed Jan. 12, 2005 in U.S. application Ser. No. 10/384,809.

Other features of the present disclosure are discussed and claimed in commonly assigned U.S. Pat. No. 6,431,289 (Multi-Speed Power Tool Transmission); U.S. Pat. No. 6,857,983 (First Stage Clutch); U.S. Pat. No. 6,502,648 (360 Degree Clutch Collar); U.S. Pat. No. 6,805,207 (Housing with Functional Overmold Member); and U.S. Pat. No. 6,857,983 (First Stage Clutch) and commonly assigned U.S. application Ser. No. 10/953,699 (Multispeed Power Tool Transmission); and Ser. No. 11/237,112 (Multispeed Power Tool Transmission); Ser. No. 10/931,602 (Housing with Functional Overmold Member); Ser. No. 10/931,604 (Housing with Functional Overmold Member); and Ser. No. 10/915,698 (Housing with Functional Overmold Member).

BACKGROUND OF THE DISCLOSURE

1. Technical Field

The present disclosure relates generally to power tools such as rotatable drills, power screwdrivers, and rotatable cutting devices. More particularly, the present disclosure relates to a transmission for a multi-speed transmission for a power tool.

2. Discussion

Modernly, manufacturers of power tools have introduced power tools that have variable speed motors in an attempt to permit the users of these tools with sufficient control over the output speed of the tool so as to permit them to perform diverse operations without resort to additional, specialized tools. Many of the tools that are commercially available include a three-stage, two-speed transmission that permits even greater control over speeds of these tools.

Typically available transmission arrangements have lacked a transmission arrangement that could produce a wide range of output speeds and torques that would permit the tool to perform diverse operations such as drilling holes with a large diameter hole saw, installing drywall screws or large diameter lag screws, and performing high-speed drilling operations. The single or dual speed transmissions that were generally employed in these tools typically did not have sufficient speed reducing capacity to permit these transmissions to be diversely employed as configuring these tools for high torque operations tended to impair their high speed performance. Furthermore, the rechargeable batteries that were employed in many of the early cordless rotary power tools were not well suited for use in low-speed, high torque operations due to the amount of energy that is consumed and the rate with which the energy is consumed by the power tool during such operations. Consequently, consumers were often forced to purchase two different rotary power tools, a medium-duty tool for "standard" applications such as drilling and fastening, and a heavy-duty tool having a low-speed, high torque output for more demanding tasks.

With the advent of the modern high capacity, high voltage battery, it is now possible to meet the energy demands of a power tool that is used in low-speed, high torque operations. There remains, however, a need in the art for a power tool transmission having a relatively large range in its speed reducing capacity.

SUMMARY OF THE DISCLOSURE

In one form, the present teachings provide a method that includes providing a portable power tool with a housing, a motor, a driven member, a transmission with a plurality of planetary gear sets that transmits rotary power between the motor and the driven member, and a speed selector, the speed selector including a single switch member that forms a portion of an exterior of the portable power tool; positioning the single switch member into a first position to cause the transmission to operate in a first overall speed reduction ratio; and moving the single switch member from the first position through a second position, which is associated with a second overall speed reduction ratio, and into a third position to cause the transmission to operate in a third overall speed reduction ratio; wherein at least three of the plurality of planetary gear sets transmit torque between the motor and the driven member in each of the first, second and third overall speed reduction ratios; and wherein three of the plurality of planetary gear sets perform a speed reduction and torque multiplication function in at least one of the first, second and third overall speed reduction ratios.

In another form, the present teachings provide a method that includes: providing a portable power tool with a housing, a motor, a driven member, a transmission with a plurality of planetary gear sets that transmits rotary power between the motor and the driven member, and a speed selector, the speed selector including a single switch member that forms a portion of an exterior of the portable power tool and an actuator that couples the single switch member to an axially-translatable member of the transmission; moving the single switch member from a first position, which is associated with a first overall speed reduction ratio, through a second position, which is associated with a second overall speed reduction ratio, and into a third position to cause the transmission to operate in a third overall speed reduction ratio; and guiding the actuator with the housing while the single switch member is being moved; wherein at least three of the plurality of planetary gear sets transmit torque between the motor and the driven member in each of the first, second and third overall speed reduction ratios; and wherein three of the plurality of planetary gear sets perform a speed reduction and torque multiplication function in at least one of the first, second and third overall speed reduction ratios.

In yet another form, the present teachings provide a method that includes providing a tool having a transmission with at least two planetary gear sets, each of the planetary gear sets having a movable portion that permits the transmission to be operated in at least three distinct gear ratios; translating the movable portion of at least one of the planetary gear sets from a first position to a second position; and drilling a hole with the tool operating at a speed within a speed range determined by the second position of the translated movable portion; wherein the tool further includes a single switch member and an actuator, the single switch member forming a portion of an exterior of the tool, the actuator coupling the single switch member to the movable portion of the transmission.

BRIEF DESCRIPTION OF THE DRAWINGS

Additional advantages and features of the present disclosure will become apparent from the subsequent description and the appended claims, taken in conjunction with the accompanying drawings, wherein:

FIG. 26 is a top view of a portion of the power tool of FIG. 1 illustrating the speed selector mechanism in greater detail;

FIG. 27a is a side view of the rotary selector cam;

DETAILED DESCRIPTION

Overview

Figure 1:
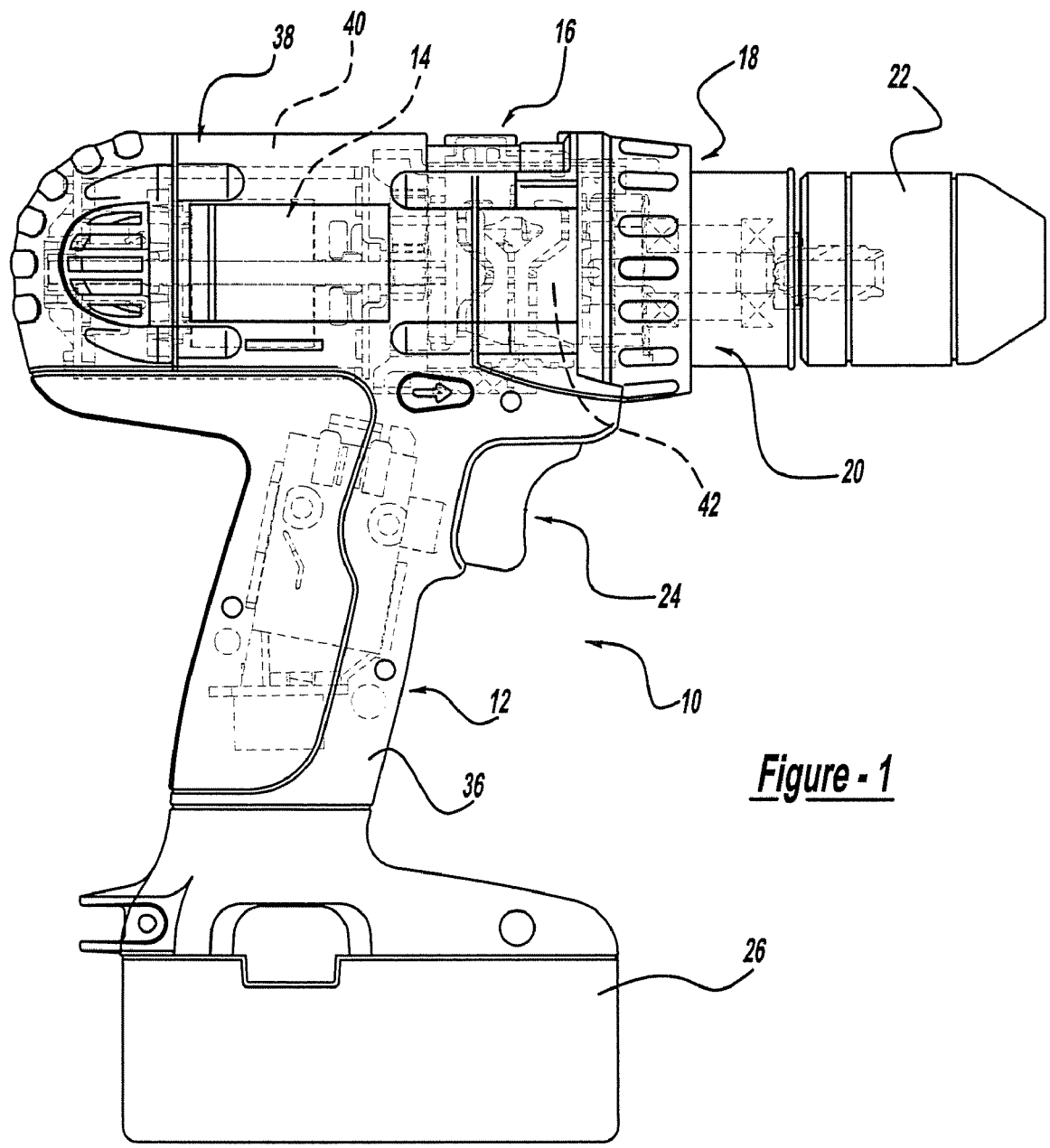
FIG. 1 is a side view of a power tool constructed in accordance with the teaching of the present disclosure.
Figure 2:
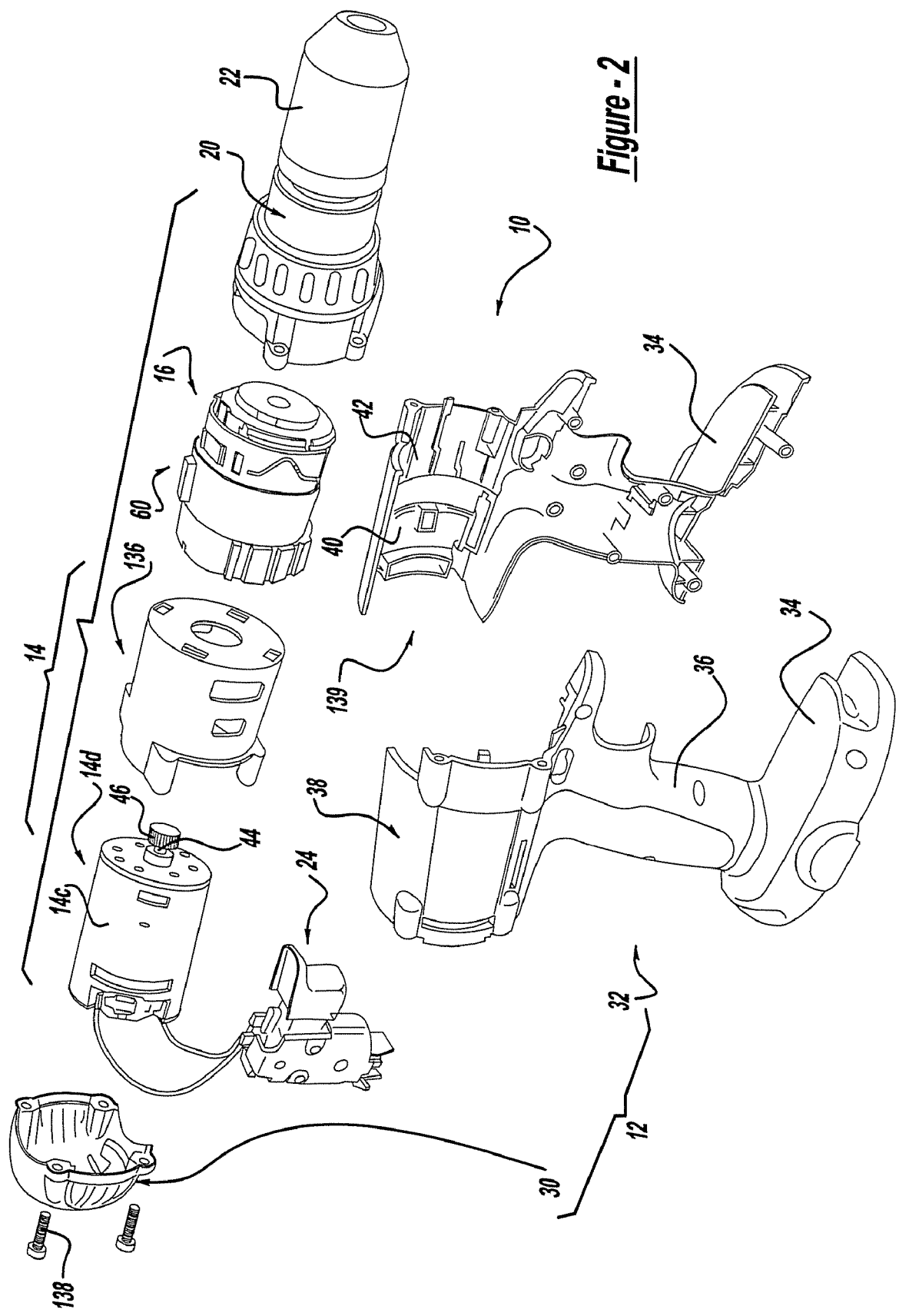
FIG. 2 is an exploded perspective view of a portion of the power tool of FIG. 1.
Figure 3:
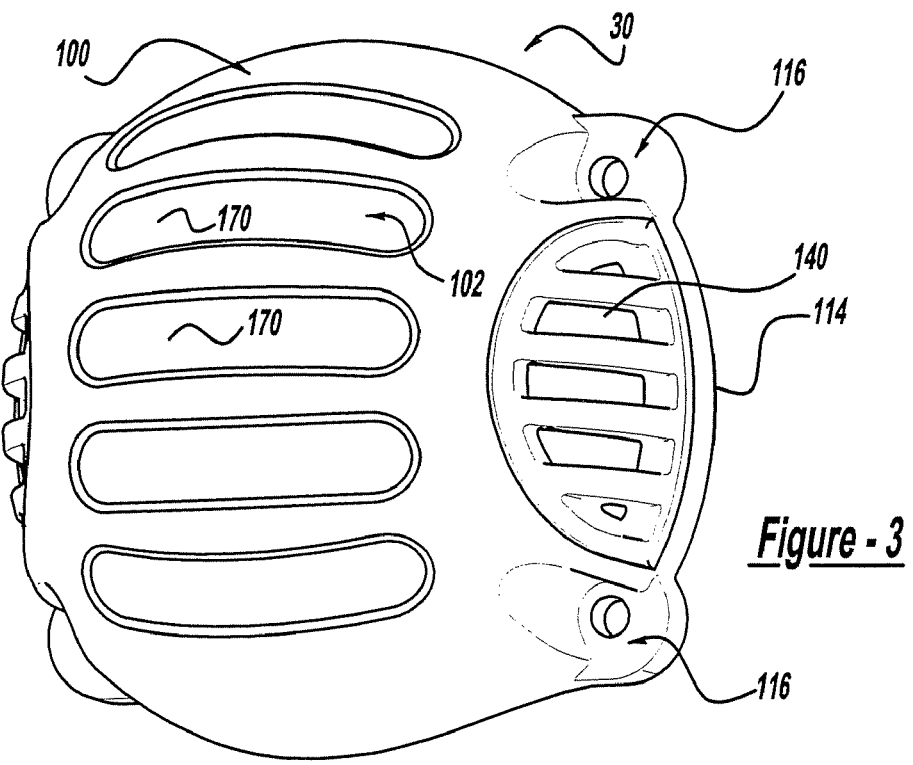
FIG. 3 is a perspective view of a portion of the housing of the power tool of FIG. 1 illustrating the rear of the end cap assembly.
Figure 4:
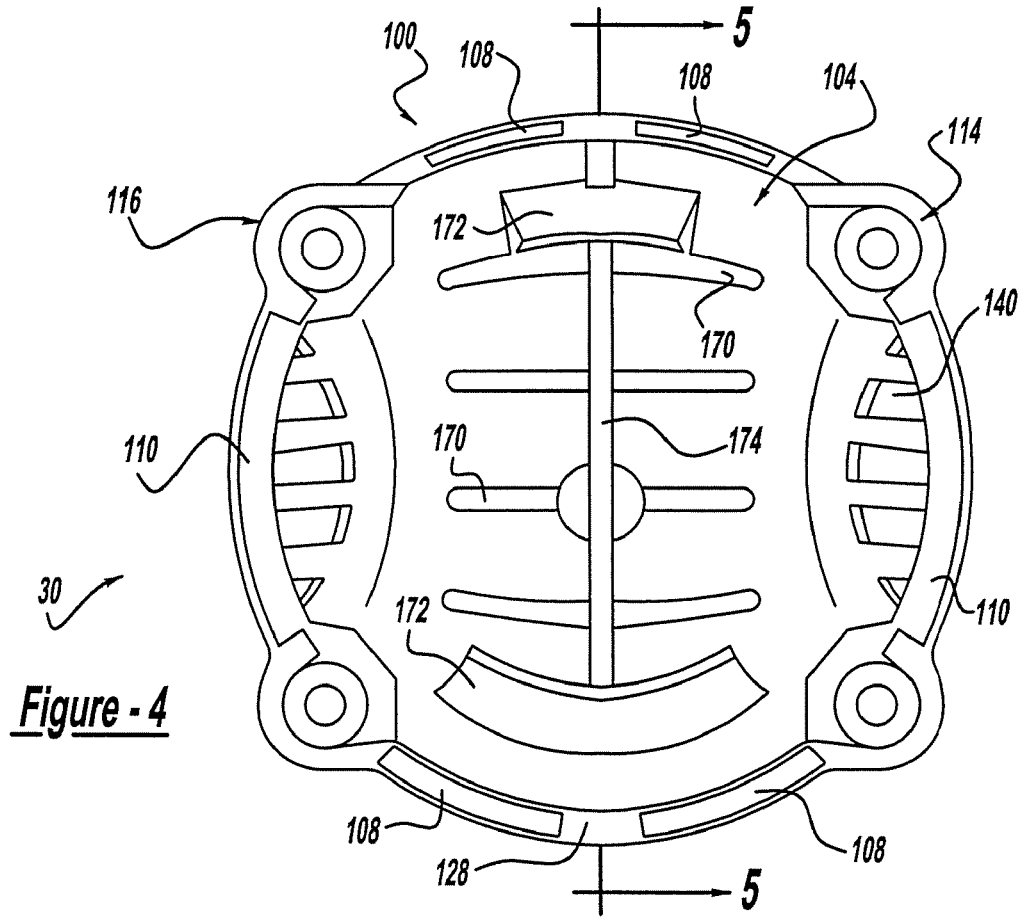
FIG. 4 is a front view of the end cap assembly.
Figure 5:
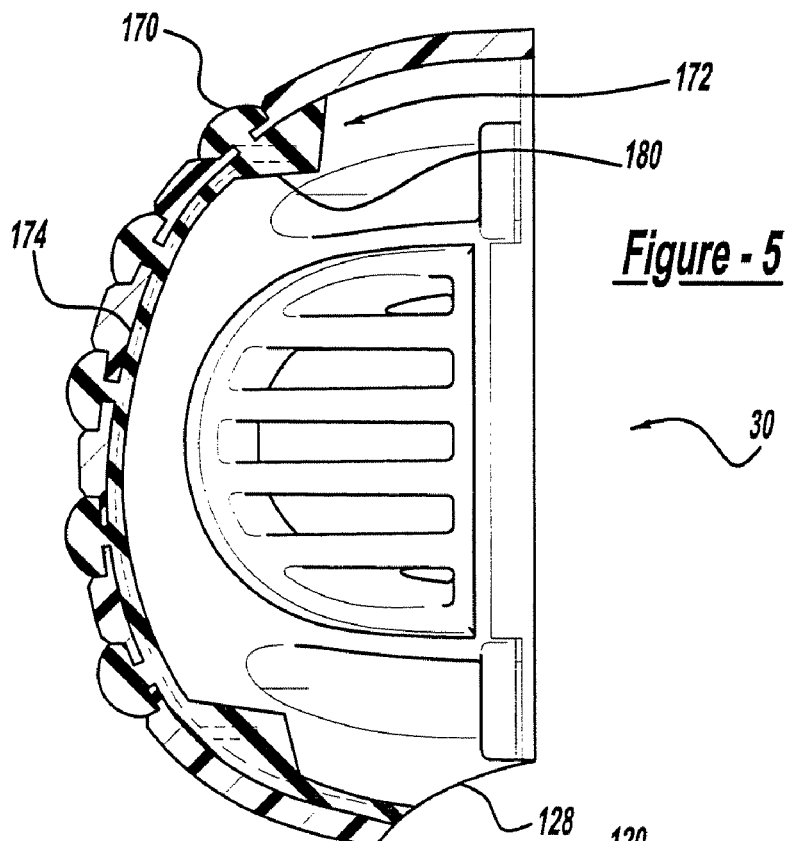
FIG. 5 is a section view taken along the line 5-5 of FIG. 4.
Figure 6:
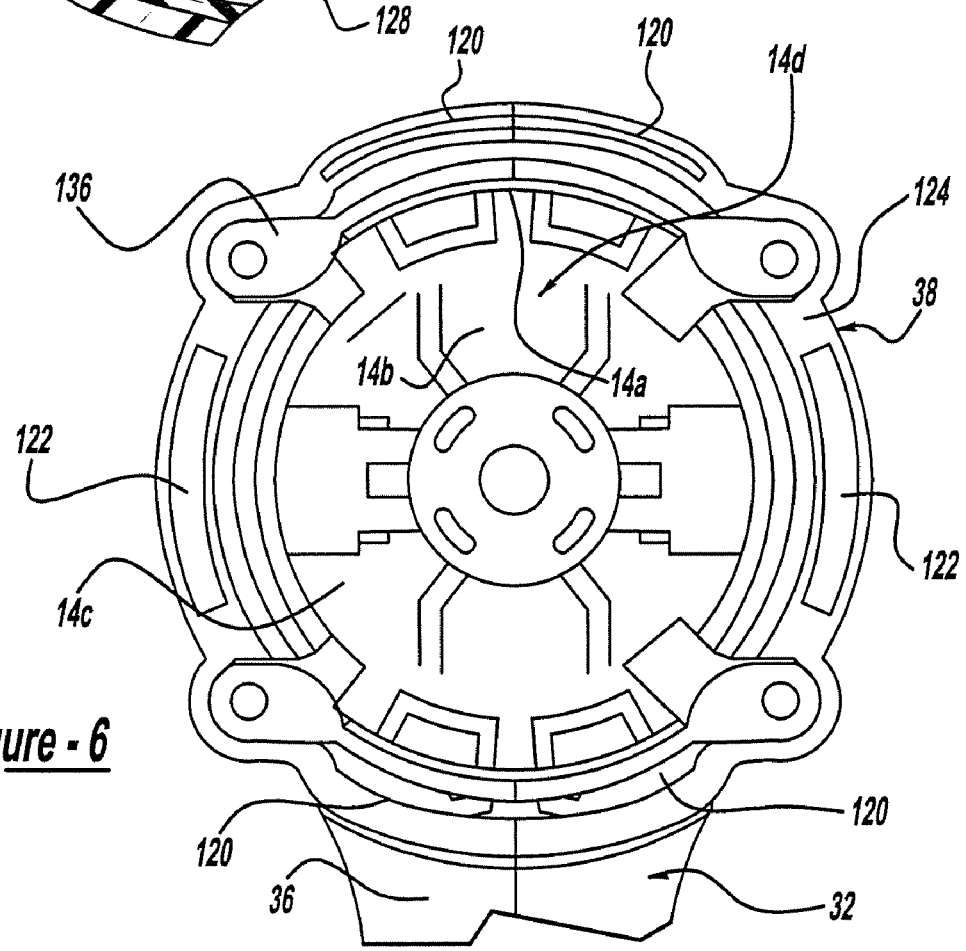
FIG. 6 is a rear view of a portion of the power tool of FIG. 1 with the end cap assembly removed.
Figure 7:
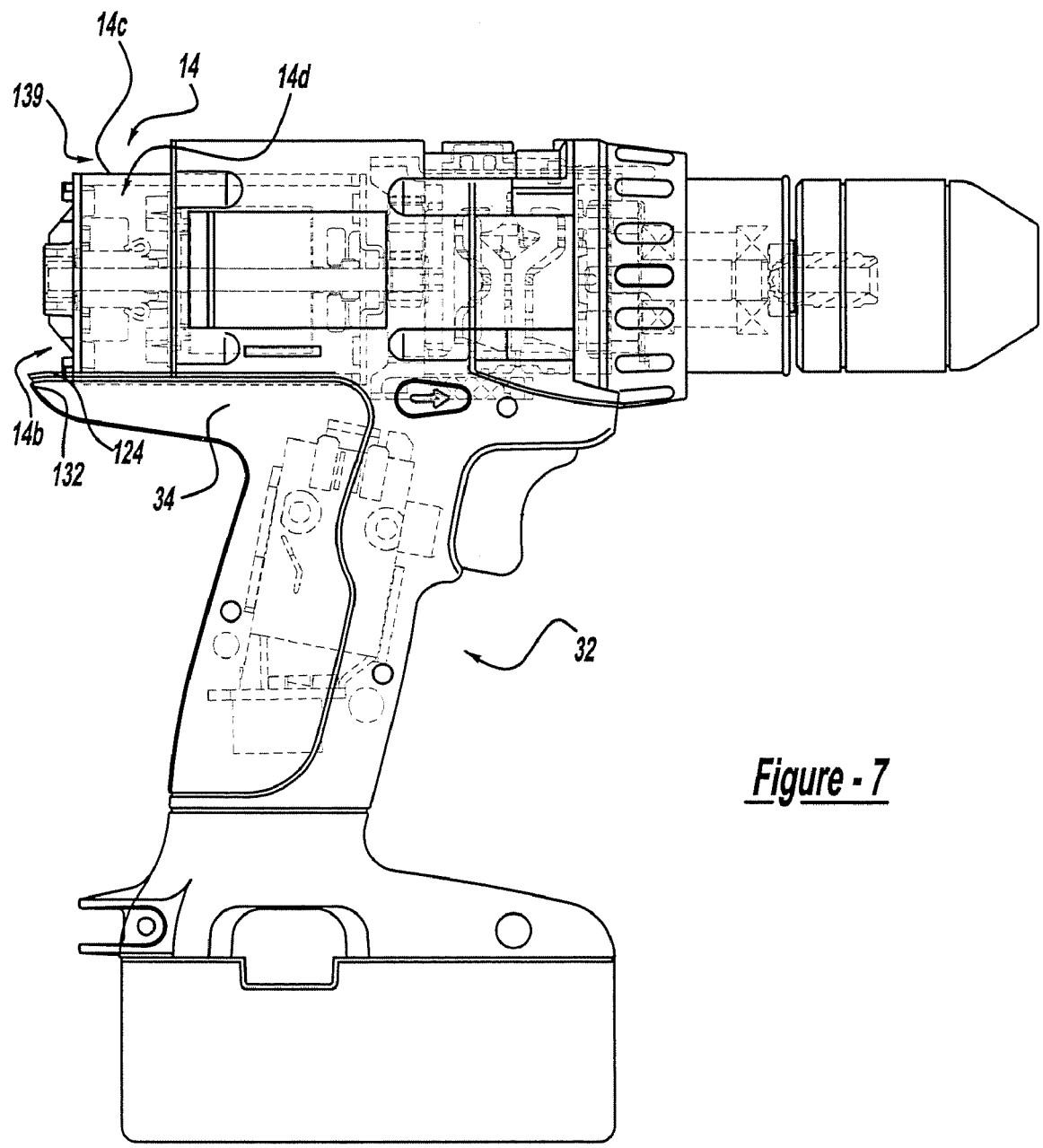
FIG. 7 is a side view of a portion of the power tool of FIG. 1 with the end cap assembly removed.
Figure 8:
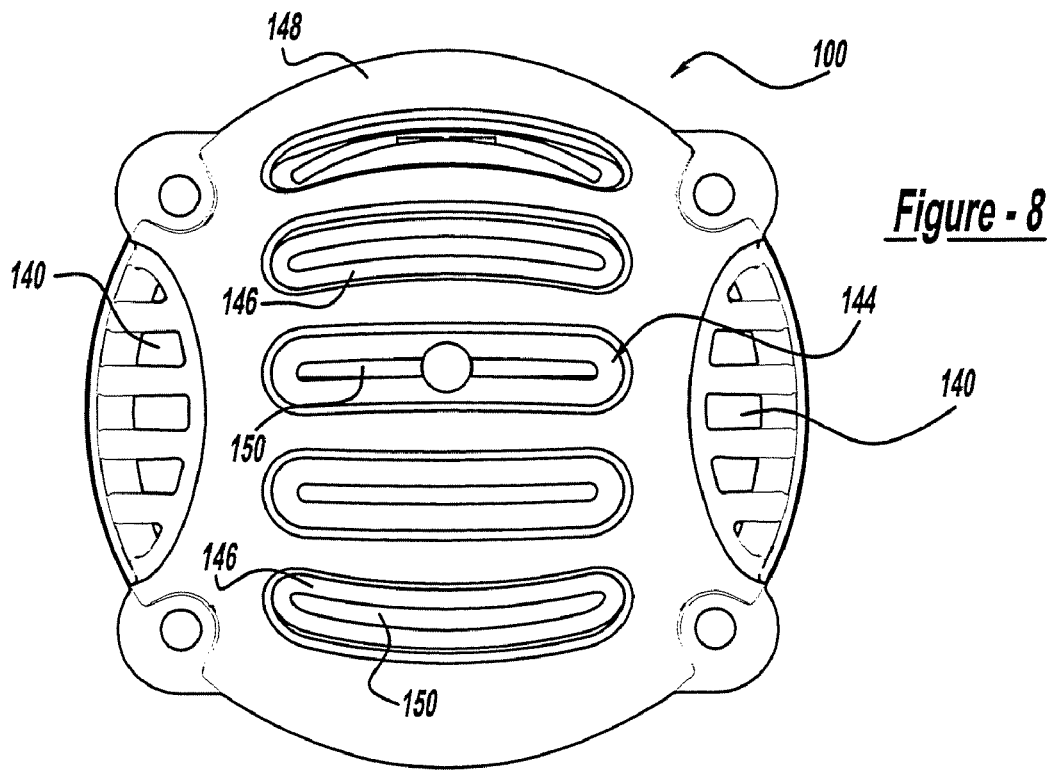
FIG. 8 is a view similar to that of FIG. 4, but illustrating the end cap shell prior to the overmolding operation.
Figure 9:
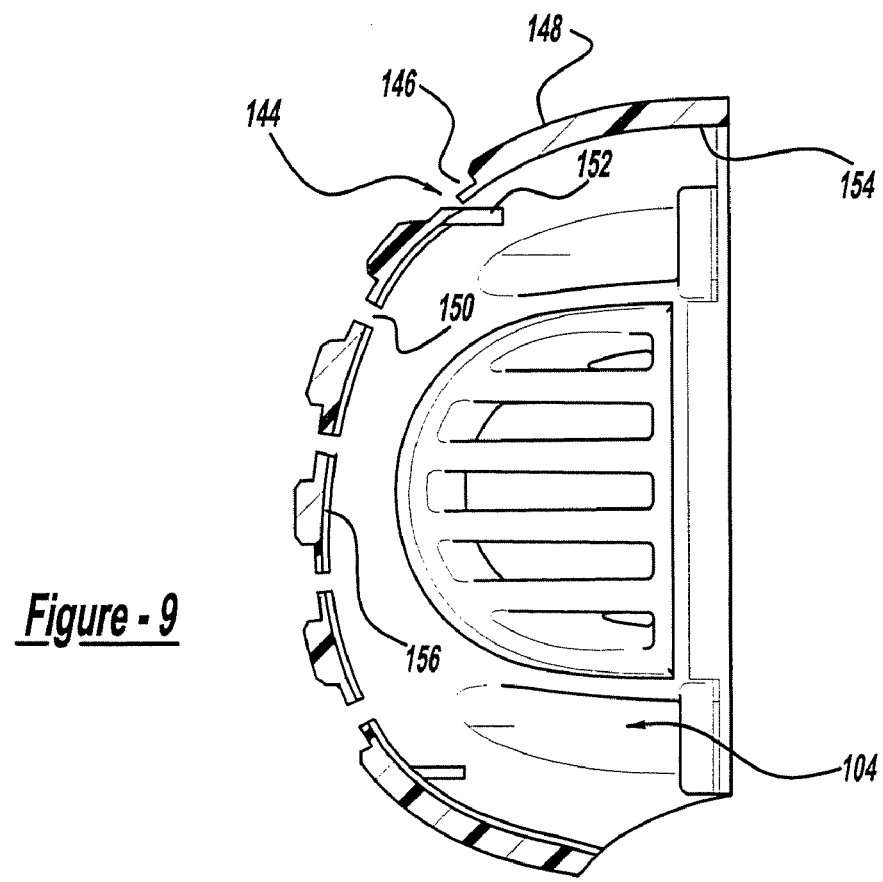
FIG. 9 is a view similar to that of FIG. 5, but illustrating the end cap shell prior to the overmolding operation.

With reference to FIGS. 1 and 2 of the drawings, a power tool constructed in accordance with the teachings of the present disclosure is generally indicated by reference numeral 10. As those skilled in the art will appreciate, the preferred embodiment of the present disclosure may be either a cord or cordless (battery operated) device, such as a portable screwdriver or drill (e.g., drill, hammer drill). In the particular embodiment illustrated, power tool 10 may be a cordless drill having a housing 12, a motor assembly 14, a multi-speed transmission assembly 16, a clutch mechanism 18, an output spindle assembly 20, a chuck 22, a trigger assembly 24 and a battery pack 26. Those skilled in the art will understand that several of the components of power tool 10, such as the chuck 22, the trigger assembly 24 and the battery pack 26, can be conventional in nature and need not be described in significant detail in this application. Reference may be made to a variety of publications for a more complete understanding of the operation of the conventional features of power tool 10. One example of such publications is commonly assigned U.S. Pat. No. 5,897,454 issued Apr. 27, 1999, the disclosure of which is hereby incorporated by reference as if fully set forth herein.

Housing 12 can include an end cap assembly 30 and a handle shell assembly 32 that can include a pair of mating handle shells 34. Handle shell assembly 32 can include a handle portion 36 and a drive train or body portion 38. Trigger assembly 24 and battery pack 26 can be mechanically coupled to handle portion 36 and can be electrically coupled to motor assembly 14. Body portion 38 can include a motor cavity 40 and a transmission cavity 42. Motor assembly 14 may be housed in motor cavity 40 and can include a rotatable output shaft 44, which can extend into transmission cavity 42. A motor pinion 46 having a plurality of gear teeth 48 may be coupled for rotation with output shaft 44. Trigger assembly 24 and battery pack 26 cooperate to selectively provide electric power to motor assembly 14 in a manner that is generally well known in the art so as to control the speed and direction with which output shaft 44 rotates.

Transmission assembly 16 may be housed in transmission cavity 42 and can include a speed selector mechanism 60. Motor pinion 46 can couple transmission assembly 16 to output shaft 44, transmitting a relatively high speed, low torque drive input to transmission assembly 16. Transmission assembly 16 can include a plurality of reduction elements that can be selectively engaged by speed selector mechanism 60 to provide a plurality of speed ratios. Each of the speed ratios can multiply the speed and torque of the drive input in a predetermined manner, permitting the output speed and torque of the transmission assembly 16 to be varied in a desired manner between a relatively low speed, high torque output and a relatively high speed, low torque output. The transmission output may be transmitted to the output spindle assembly 20, to which the chuck 22 may be coupled for rotation, to permit torque to be transmitted to a tool bit (not shown). The clutch mechanism 18 may be coupled to transmission assembly 16 and may be operable for limiting the magnitude of the torque associated with the drive input to a predetermined, selectable torque limit.

Functional Overmold

With specific reference to FIGS. 2 through 9, end cap assembly 30 may include an end cap shell 100 and an overmold member 102. In the example provided, the end cap shell 100 may be injection molded from a plastic material, such as ABS. The end cap shell 100 defines an end cap cavity 104 that may be sized to receive the portion of the motor assembly 14 that extends rearwardly of the handle shell assembly 32. A plurality of first and second radial tab apertures 108 and 110 and the abutting face 128 can be formed into the forward face 114 of the end cap shell 100 and a plurality of screw bosses 116 can be formed into the perimeter of the end cap shell 100. Each of the first and second radial tab apertures 108 and 110 may be sized to receive one of the first radial tabs 120 and second radial tabs 122, respectively, that can be formed into the rearward face 124 of the handle shells 34. The first and second radial tab apertures 108 and 110 can cooperate with the first and second radial tabs 122 to align the end cap shell 100 to the handle shell assembly 32, as well as to inhibit relative rotation therebetween. An arcuate portion 128 of the forward face 114 of the end cap shell 100 may be angled to match the abutting face 132 of the rearward face 124 of the handle shells 34. The screw bosses 116 can be employed to fixedly couple the end cap shell 100 to the motor cover 136 via a plurality of screws 138. The geometry of the motor cover 136 may be such that it is constrained to the handle shells 34. As such, fastening of the end cap shell 100 to the motor cover 136 can fixedly retain the end cap shell 100 against the rearward face 124 of the handle shell assembly 32, as well as to close off the rear handle aperture 139 in the handle shell assembly 32.

A plurality of side apertures 140 can be formed into the sides of the end cap shell 100 to permit air to flow through the handle shell assembly 32 and cool the motor assembly 14 in a manner that is well known in the art. A plurality of rear apertures 144 can be formed into the rear of the end cap shell 100, with each of the rear apertures 144 including a recessed portion 146, which can extend partially into the outer surface 148 of the end cap shell 100, and a through-portion 150 that can extend completely through the end cap shell 100. A pair of retaining tabs 152 can be formed to extend from the interior surface 154 of the end cap shell 100 inwardly into the end cap cavity 104. A channel 156 may be formed into the interior surface 154 of the end cap shell 100 and can intersect each of the rear apertures 144 and the retaining tabs 152.

The overmold member 102 may be formed from a resilient material, such as thermoplastic elastomer (e.g., HYTREL® manufactured by E.I. du Pont de Nemours and Company) and may be simultaneously formed and coupled to the end cap shell 100 in an injection molding operation. In the particular example provided, the overmold member 102 can include a plurality of bumper members 170, a pair of isolators 172 and a linking member 174. Each of the bumper members 170 can extend from a point roughly coincident with the interior surface 154 of the end cap shell 100 to a point rearwardly of the outer surface 148 of the end cap shell 100 by about 0.5 mm to about 1.5 mm and preferably about 0.75 mm. Construction in this manner permits the bumper members 170 to provide a degree of shock absorption which reduces the likelihood of damaging the end cap shell 100 in the event that the tool 10 is dropped. Furthermore, it is sometimes necessary for an operator to apply a relatively high force to the tool 10, as when employing a hole saw to drill large diameter holes. In such situations, the operator is inclined to press onto the rear of the tool 10 to apply a force that is in-line with the axis of the chuck 22. In such situations, the bumper members 170 provide the operator with a relatively soft and comfortable surface which tends to resist slipping as well as attenuate the vibrations that can be transmitted to the operator.

The isolators 172 can be formed about the retaining tabs 152 on the interior surface 154 of the end cap shell 100. In the example provided, each of the isolators 172 can include an annular member 180 that extends forwardly of the interior surface 154 of the end cap shell 100. Construction in this manner permits the end cap shell 100 to engage the isolators 172 to the outer diameter 14a and the rear surface 14b of the motor housing 14c to fixedly retain the motor 14d within the motor cover 136. This can prevent the components of the motor assembly 14 from moving along the longitudinal axis of the tool 10, as well as dampen vibrations that can be created during the operation of the motor assembly 14. The linking member 174 may be fixedly coupled to each of the bumper members 170 and the isolators 172. The linking member 174 can provide a flow path through which the resilient material flows during the formation of the bumper members 170 and the isolators 172. The linking member 174 can also interconnect the bumper members 170 and the isolators 172, thereby rendering their removal from the end cap shell 100 more difficult.

Figure 10:
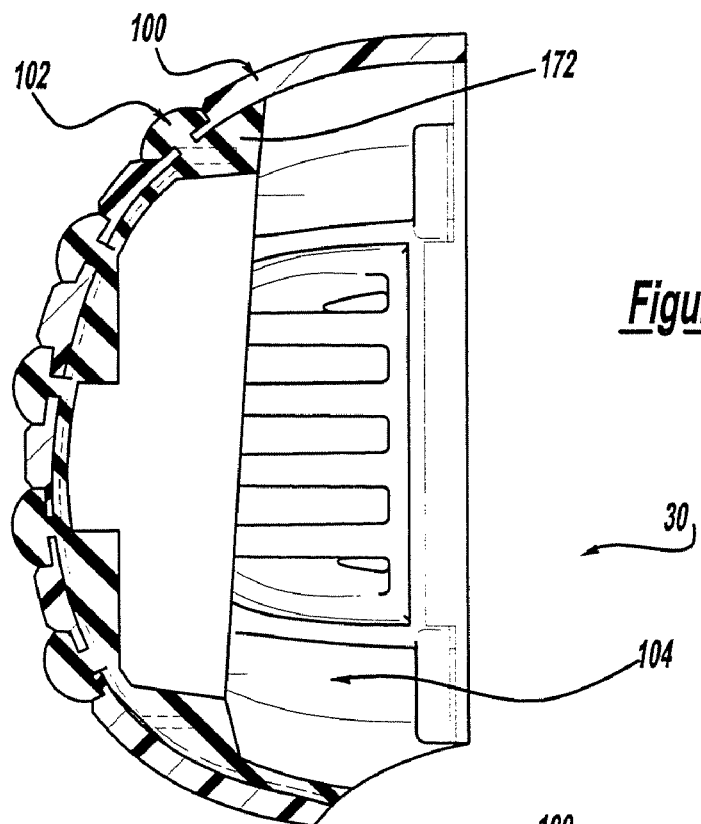
FIG. 10 is a view similar to that of FIG. 4, but illustrating an alternate construction of the overmold member.
Figure 11:
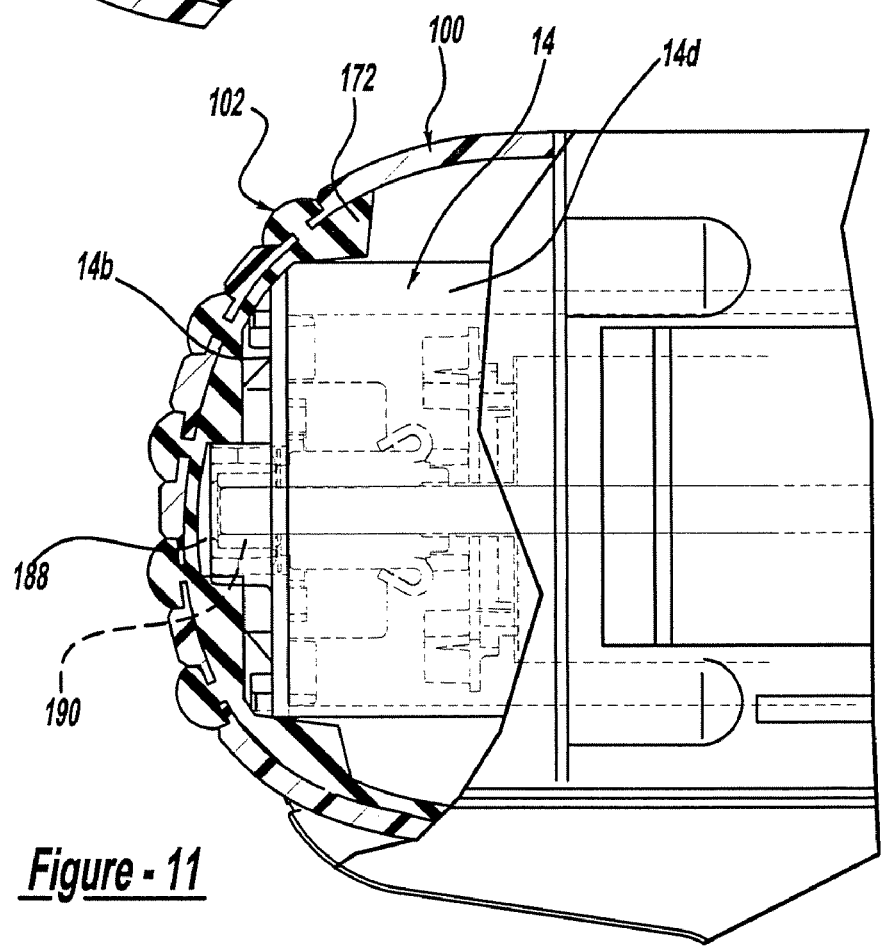
FIG. 11 is a partial sectional view of a portion of a power tool that employs an end cap assembly having an overmold member constructed in the manner illustrated in FIG. 10.

Those skilled in the art will appreciate that this aspect of the present disclosure may be incorporated into various other positions within the handle assembly 32 for sealing between two or more components, dampening vibrations or positioning one component relative to another. One such example is illustrated in FIGS. 10 and 11 where the isolators 172 can be modified to extend around the perimeter of a portion of the end cap cavity 104 and sealingly contact the rear surface 14b of the motor 14d. The isolators 172 seal the interface between the end cap shell 100 and the motor assembly 14, while the bumper members 170 seal the rear apertures 144 in the end cap shell 100. The space 188 defined by the isolators 172 can be filled with grease or another suitable lubricant, which lubricates a motor armature bearing 190.

Transmission Assembly

Figure 12:
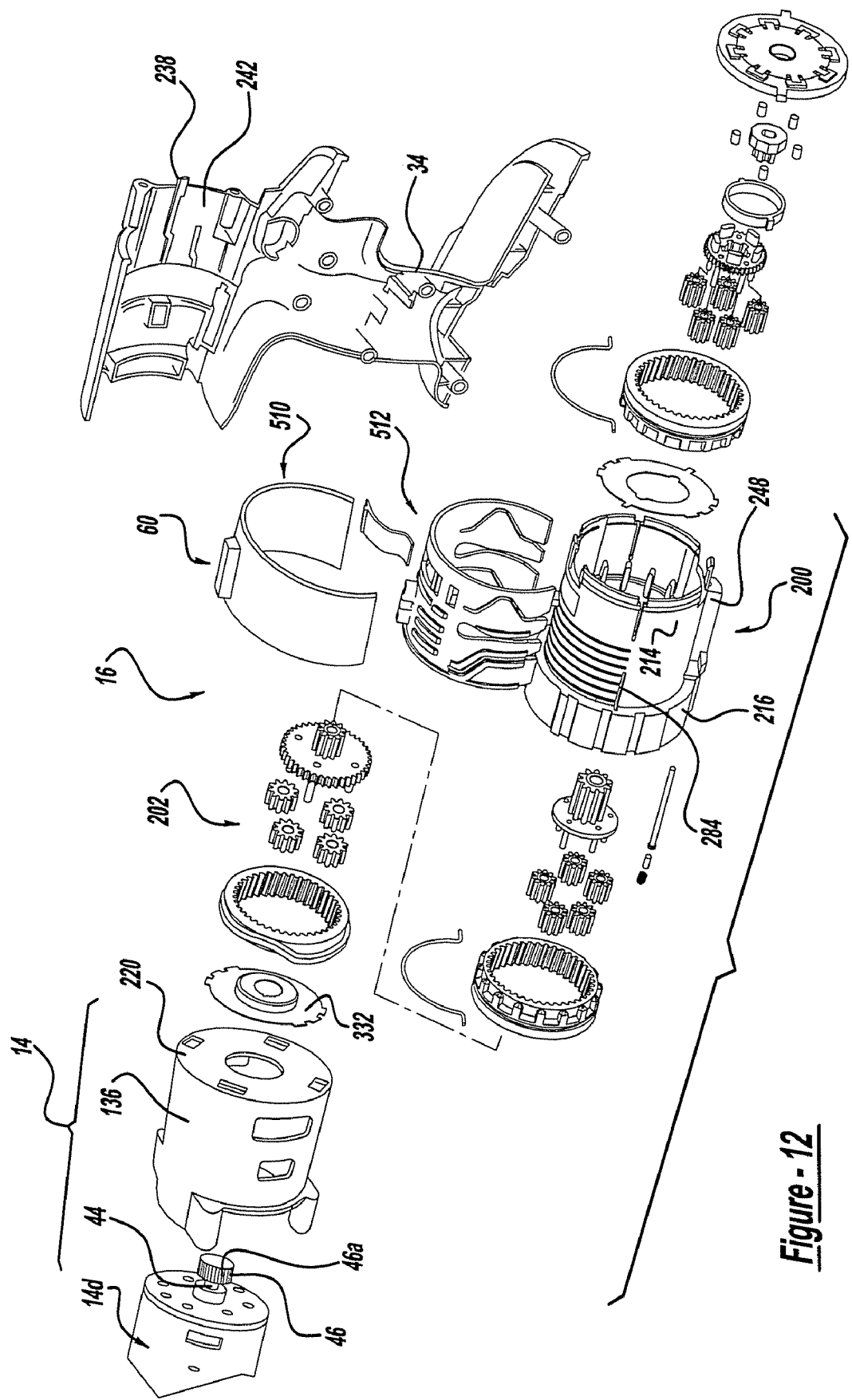
FIG. 12 is an exploded perspective view of a portion of the power tool of FIG. 1, illustrating the transmission assembly in greater detail.

With reference to FIG. 12, the transmission assembly 16 may be a three-stage, three-speed transmission that may include a transmission sleeve 200, a reduction gearset assembly 202 and the speed selector mechanism 60. With additional reference to FIGS. 13 through 17, the transmission sleeve 200 may include a wall member 210 that can define a generally transmission bore or hollow cavity 212 into which the reduction gearset assembly 202 may be disposed. The transmission sleeve 200 can include a body 214 and a base 216. The body 214 of the transmission sleeve 200 may be fairly uniform in diameter and can be generally smaller in diameter than the base 216. The inside diameter of the base 216 may be sized to receive the cylindrical nose portion 220 of the motor cover 136.

A plurality of raised lands 226 can be formed into the base 216. The raised lands 226 can define a plurality of first grooves 228 in the outer surface 230 of the base 216 and a plurality of second grooves 232 in the inner surface 234 of the base 216. The first grooves 228 can be configured to receive the alignment ribs 238 that can be formed into the inner surface 242 of the handle shells 34 to align the transmission sleeve 200 to the handle shells 34 and inhibit relative rotation between the transmission sleeve 200 and the housing 12. The first grooves 228 and alignment ribs 238 can be configured in a manner that the transmission sleeve 200 can only be assembled to the handle shells 34 in one orientation (i.e., the configuration of the first grooves 228 and alignment ribs 238 prevents the transmission sleeve 200 from being rotated 180° out of position relative to the handle shells 34). The second grooves 232 will be discussed in greater detail, below.

The body 214 of the transmission sleeve 200 may include a cylindrical body portion 246 and a pin housing portion 248. In the particular embodiment illustrated, the cylindrical body portion 246 can include a selector cam guide 250, a plurality of lubricant grooves 252 and first and second sets of ring engagement teeth 254 and 256, respectively. The selector cam guide 250 may be generally rectangular in cross section, extending outwardly from the top of the outer surface 258 of the body portion 246. The lubricant grooves 252 can be formed concentrically around the upper half of the perimeter of the body portion 246. The lubricant grooves 252 have a depth of about 0.01 inch to about 0.030 inch to hold a lubricant, such as grease, on the upper half of the perimeter of the body portion 246. The operation of the selector cam guide 250 and the lubricant grooves 252 will be discussed in detail, below.

A raised bead 264 can segregate the interior of the body portion 246 into first and second housing portions 260 and 262, respectively. The first set of ring engagement teeth 254 can be formed onto the inner surface 266 of the body portion 246 and can extend rearwardly from the raised bead 264 toward the base 216. The second set of ring engagement teeth 256 can be also formed into the inner surface of the body portion 246 and can extend forwardly from the raised bead 264. The teeth 268 of the first and second sets of ring engagement teeth 254 and 256 can be uniformly spaced around the inner surface 266 of the body portion 246. The configuration of each tooth 268 in the first and second sets of ring engagement teeth 254 and 256 can be similar in that each tooth can extend from the raised bead 264, can have a pair of parallel engagement surfaces 270 and can terminate at a tip portion 272. The tip portion 272 of each tooth 268 may be both rounded and tapered to enhance the ability with which it will mesh with a portion of the reduction gearset assembly 202 as will be described in detail, below.

The pin housing portion 248 can extend downwardly from the body portion 246 over a portion of the length of the body portion 246. An actuator aperture 274 may be formed into the pin housing portion 248 and can extend rearwardly through the base 216 of the transmission sleeve 200. In the particular embodiment illustrated, the actuator aperture 274 may be stepped, having a first portion 276 with a first diameter at the rear of the transmission sleeve 200 and a second portion 278 with a smaller second diameter at the front of the transmission sleeve 200. In the example shown, the first portion 276 of the actuator aperture 274 breaks through the wall of the first housing portion 260 and forms a groove 280 into the inner surface 234 of the base 216. The pin housing portion 248 will be discussed in further detail, below.

A pair of first clip slots 284 and a pair of second clip slots 286 can be formed into the transmission sleeve 200, extending along the sides of the transmission sleeve 200 in a manner that may be parallel the longitudinal axis of the transmission sleeve 200. The first pair of clip slots 284 may be formed through the sides of the body portion 246 rearwardly of the raised bead 264 and extends rearwardly toward the base 216. The depth of the first pair of clip slots 284 may be such that they do not extend through the portion of the wall member 210 that defines the base 216. The second pair of clip slots 286 can be also formed through the sides of the body portion 246 beginning forwardly of the raised bead 264 and extending through the front face 288 of the transmission sleeve 200.

With reference to FIGS. 12, 13, 18 and 23, the reduction gearset assembly 202 may include a first reduction gear set 302, a second reduction gear set 304 and a third reduction gear set 306. The first, second and third reduction gear sets 302, 304 and 306 can be operable in an active mode and in the particular example provided, the second and third reduction gear sets 304 and 306 may also be operable in an inactive mode. Operation in the active mode causes the reduction gear set to perform a speed reduction and torque multiplication operation, while operation of the reduction gear set in an inactive mode for causes the reduction gear set to provide an output having a speed and torque that may be about equal to the speed and torque of the rotary input provided to that reduction gear set. In the particular embodiment illustrated, each of the first, second and third reduction gear sets 302, 304 and 306 can be planetary gear sets. Those skilled in the art will understand, however, that various other types of reduction gear sets that can be well known in the art may be substituted for one or more of the reduction gear sets forming the reduction gearset assembly 202.

As shown, the first reduction gear set 302 may include a first reduction element or ring gear 310, a first set of planet gears 312 and a first planet or reduction carrier 314. The first ring gear 310 may be an annular structure, having a plurality of gear teeth 310a formed along its interior diameter. A clutch face 316 may be formed into the outer perimeter of the front face 318 of the first ring gear 310 and will be discussed in greater detail, below. The first ring gear 310 may be disposed within the portion of the hollow cavity 212 defined by the base 216; the front face 318 of the first ring gear 310 contacts a step 320 formed into the transmission sleeve 200, thereby limiting the ability of the first ring gear 310 to move forwardly into the hollow cavity 212.

The first reduction carrier 314 may be formed in the shape of a flat cylinder, having plurality of pins 322 that extend from its rearward face 324. A plurality of gear teeth 314a can be formed into almost the entire outer perimeter of the first reduction carrier 314, with a valley 314b being formed between each pair of adjacent gear teeth 314a. Due to the spacing of the gear teeth 314a, one of the valleys (i.e., valley 314b') is relatively larger than the remaining valleys 314b due to the omission of a tooth 314a in the outer perimeter of the first reduction carrier 314. In the particular embodiment illustrated, the gear teeth 314a of the first reduction carrier 314 can be configured so as not to be meshingly engagable with the gear teeth 310a of the first ring gear 310.

Figure 19:
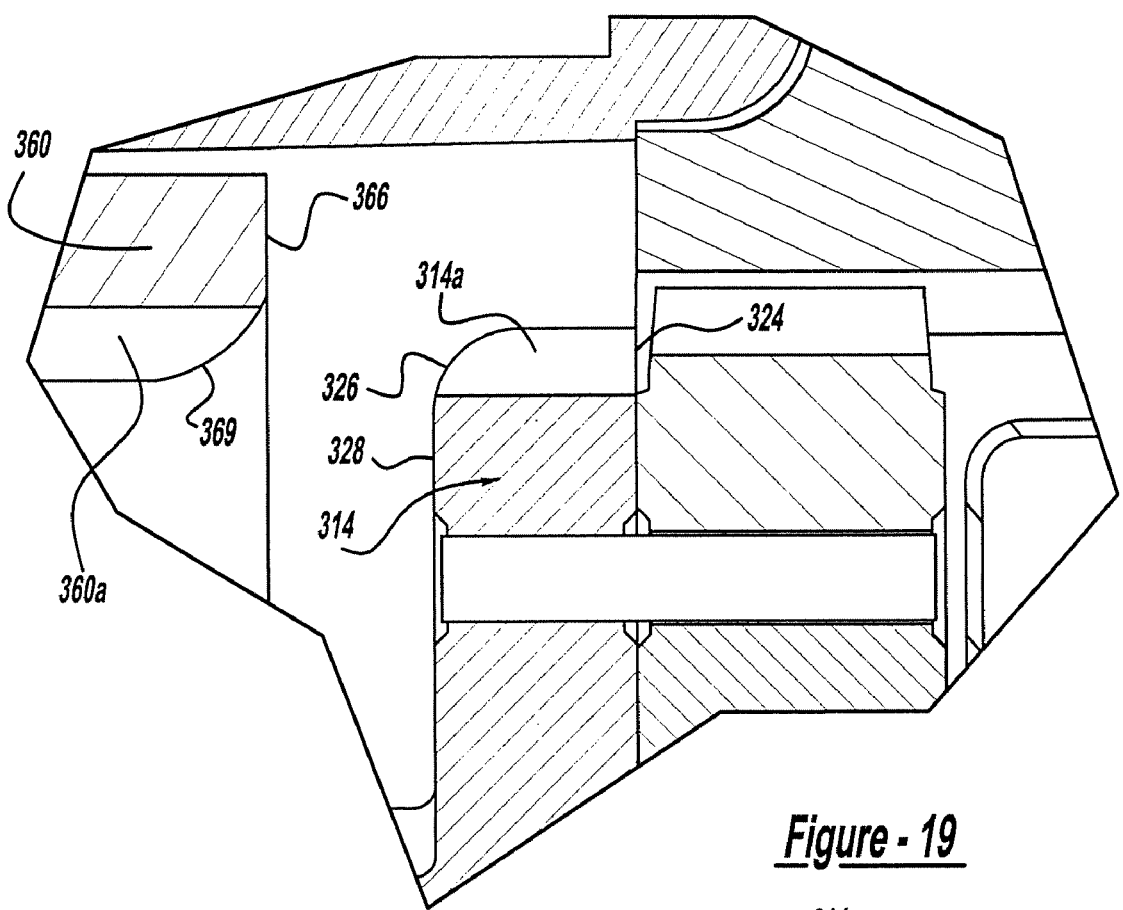
FIG. 19 is a sectional view taken along a longitudinal axis of the power tool of FIG. 1 illustrating a portion of the reduction gearset assembly in greater detail.
Figure 20:
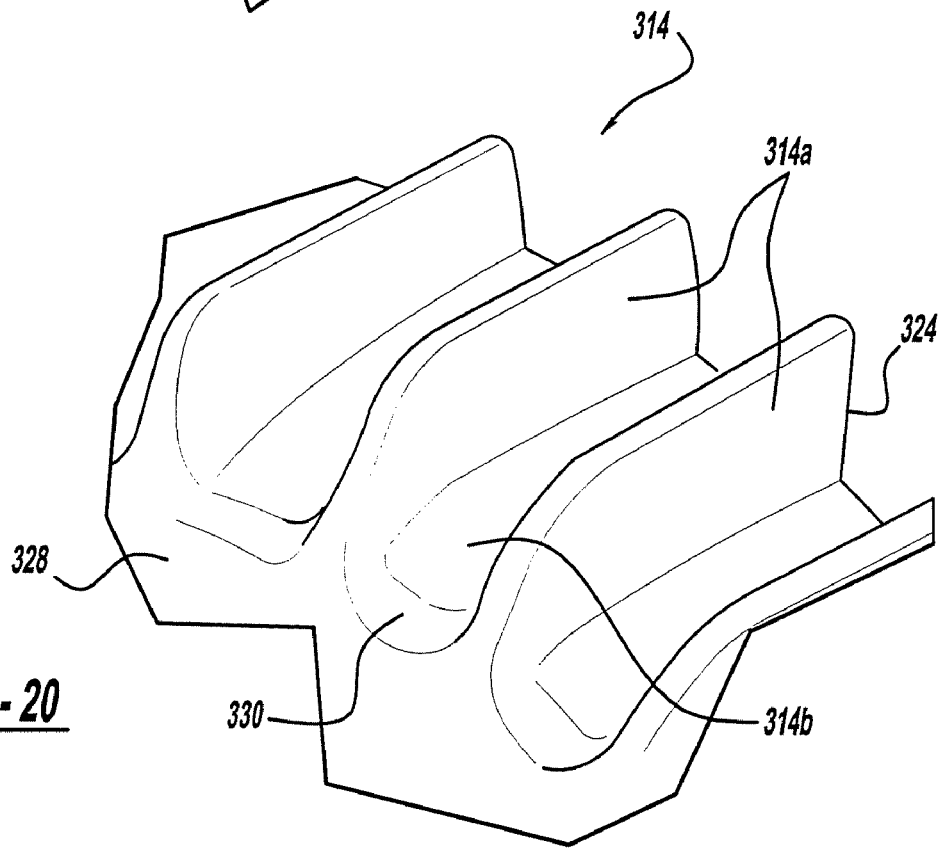
FIG. 20 is a front view of a portion of the first reduction carrier.

With specific reference to FIGS. 19 and 20, the profile of the gear teeth 314a is illustrated in greater detail. As shown, each gear tooth 314a terminates at a gradual radius 326 at the forward face 328 of the first reduction carrier 314 but terminates abruptly at the rearward face 324 of the first reduction carrier 314. A radius 330 is also formed on the valleys 314b between the gear teeth 314a.

Returning to FIGS. 12, 13, 15, 18 and 23, a first thrust washer 332 having a first annular portion 334, a second annular portion 336 and a plurality of retaining tabs 338 may be positioned rearwardly of the first reduction gear set 302. The retaining tabs 338 engage the second grooves 232 in the base 216 of the transmission sleeve 200 and as such, relative rotation between the first thrust washer 332 and the transmission sleeve 200 may be inhibited. The inside diameter of the base 216 may be sized to receive the motor cover 136 and as such, the front face 340 of the motor cover 136 inhibits the axial movement of the first thrust washer 332. The first annular portion 334 contacts the rear face 342 of the first ring gear 310, providing a wear surface and controlling the amount by which the first ring gear 310 is able to move in an axial direction. The second annular portion 336 may be spaced axially apart from the first annular portion 334, extending forwardly of the first annular portion 334 to provide a wear surface for the first set of planet gears 312 that also controls the amount by which they can move in an axial direction.

The first set of planet gears 312 may include a plurality of planet gears 344, each of which being generally cylindrical in shape, having a plurality of gear teeth 344a formed into its outer perimeter and a pin aperture 346 formed its their center.

Each planet gear 344 may be rotatably supported on an associated one of the pins 322 and the first reduction carrier 314 and may be positioned such that its teeth 344a meshingly engage the teeth 314a of the first ring gear 310. A raised portion 348 may be formed into the front and rear face 350 and 352 of each planet gear 344 that inhibits the teeth 344a from rubbing on the first reduction carrier 314 and the first thrust washer 332 and creating dust or chips that would impair the performance of the transmission assembly 16 and reduce its operating life. As the teeth 46a of the motor pinion 46 on the output shaft 44 can be also meshingly engaged with the teeth 344a of the planet gears 344, the motor pinion 46 serves as a sun gear for the first reduction gear set 302.

The second reduction gear set 304 may be disposed within the portion of the hollow cavity 212 defined by the first housing portion 260 and may include a second sun gear 358, a second reduction element or ring gear 360, a second set of planet gears 362 and a second planet or reduction carrier 364. The second sun gear 358 may be fixed for rotation with the first reduction carrier 314. The second sun gear 358 can include a plurality of gear teeth 358a that extend forwardly of the forward face 328 of the first reduction carrier 314.

The second ring gear 360 may be an annular structure, having a plurality of gear teeth 360a formed along its interior diameter. The gear teeth 360a may be heavily chamfered at the rear face 366 of the second ring gear 360 but terminate abruptly at the front face 368. More preferably, a heavy radius 369 may be formed onto the rear face 366 and the sides of each of the gear teeth 360a, with the heavy radius 369 being employed rather than the heavy chamfer as the heavy radius 369 on the gear teeth 360a provides for better engagement between the second ring gear 360 and the first reduction carrier 314.

A plurality of sleeve engagement teeth 370 can be formed into the outer perimeter of the second ring gear 360; the sleeve engagement teeth 370 extend forwardly toward the front face 368 of the second ring gear 360 and terminate at a tip portion 372 that may be rounded and tapers forwardly and inwardly. An annular clip groove 374 may also formed into the outer perimeter of the second ring gear 360. In the example illustrated, the clip groove 374 may be a rectangular slot having a pair of sidewalls 376. The clip groove 374 will be discussed in greater detail, below.

The second reduction carrier 364 may be formed in the shape of a flat cylinder, having plurality of pins 378 that extend from its rearward face 380. The second set of planet gears 362 may include a plurality of planet gears 382. Each planet gear 382 may be generally cylindrical in shape, having a plurality of gear teeth 382a formed into its outer perimeter and a pin aperture 384 formed its center. Each planet gear 382 may be rotatably supported on an associated one of the pins 378 and the second reduction carrier 364 may be positioned such that the gear teeth 382a of the planet gears 382 meshingly engage the gear teeth 360a of the second ring gear 360. The gear teeth 358a of the second sun gear 358 can be also meshingly engaged with the gear teeth 382a of the planet gears 382.

The third reduction gear set 306 may be disposed within the portion of the hollow cavity 212 defined by the second housing portion 262 and may include a third sun gear 398, a third reduction element or ring gear 400, a third set of planet gears 402 and a third planet or reduction carrier 404. The third sun gear 398 may be fixed for rotation with the second reduction carrier 364. The third sun gear 398 can include a plurality of gear teeth 398a that extend forwardly of the front face 406 of the second reduction carrier 364.

The third ring gear 400 may be an annular structure, having a plurality of gear teeth 400a formed along its interior diameter. The gear teeth 400a may be heavily chamfered at the front face 412 of the third ring gear 400, but terminate abruptly at the rear face 414. More preferably, a heavy radius 407 may be formed onto the front face 412 and the sides of each of the gear teeth 400a, with the heavy radius 407 being employed rather than the heavy chamfer as the heavy radius 407 on the gear teeth 400a provides for better engagement between the third ring gear 400 and the third reduction carrier 404. A plurality of sleeve engagement teeth 418 can be formed into the outer perimeter of the third ring gear 400; the sleeve engagement teeth 418 extend rearward toward the rear face 414 of the third ring gear 400 and terminate at a tip portion 420 that may be rounded and taper both rearwardly and inwardly. An annular clip groove 422 may also be formed into the outer perimeter of the third ring gear 400. In the example illustrated, the clip groove 422 may be a rectangular slot having a pair of sidewalls 424. The clip groove 422 will be discussed in greater detail, below.

The third reduction carrier 404 may be formed in the shape of a flat cylinder, having plurality of pins 428 that extend from its rearward face 430. A plurality of gear teeth 404a can be formed into almost the entire outer perimeter of the third reduction carrier 404, with a valley 404b being formed between each pair of adjacent teeth 404a. Due to the spacing of the teeth 404a, one of the valleys 404b (i.e., valley 404b') is relatively larger than the remaining valleys 404b due to the omission of a tooth 404a in the outer perimeter of the third reduction carrier 404. In the particular embodiment illustrated, the gear teeth 404a of the third reduction carrier 404 can be configured so as not to be meshingly engagable with the gear teeth 382a of the second planet gears 382.

Figures 21, 22:
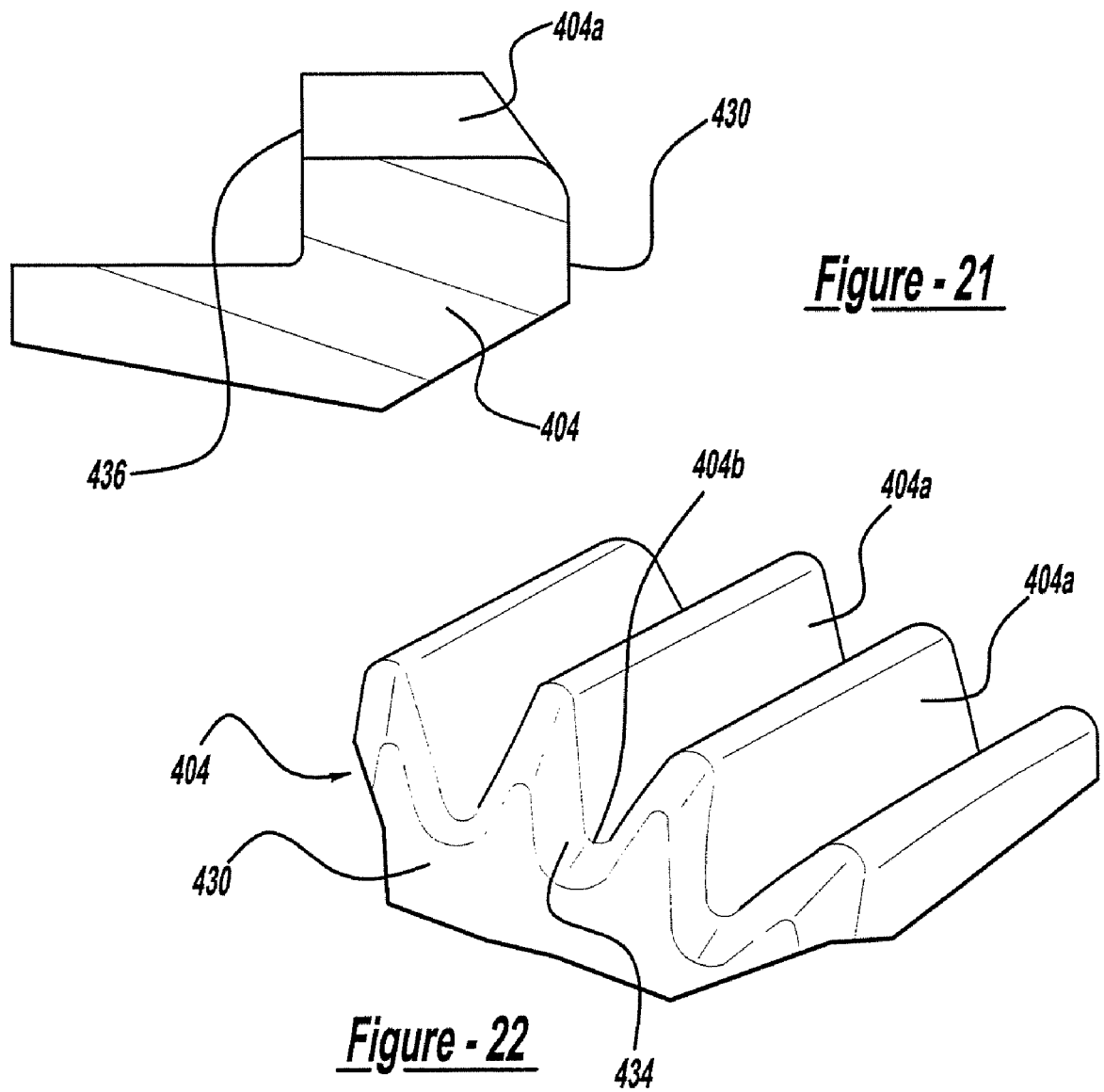
FIG. 21 is a sectional view taken along a longitudinal axis of the power tool of FIG. 1 illustrating a portion of the reduction gearset assembly in greater detail.
FIG. 22 is a rear view of a portion of the third reduction carrier.

With brief additional reference to FIGS. 21 and 22, the profile of the gear teeth 404a is illustrated in greater detail. As shown, the rear face 430 of the third reduction carrier 404 may be chamfered and a heavy radius 434 may be formed into each of sides of the teeth 404a and valleys 404b. Each gear tooth 404a terminates abruptly at the forward face 436 of the third reduction carrier 404.

Returning back to FIGS. 12, 13, 15, 18 and 23, the third set of planet gears 402 may include a plurality of planet gears 438. Each planet gear 438 may be generally cylindrical in shape, having a plurality of gear teeth 438a formed into its outer perimeter and a pin aperture 440 formed through its center. Each planet gear 438 may be rotatably supported on an associated one of the pins 428 and the third reduction carrier 404 may be positioned such that the gear teeth 438a of the planet gears 438 meshingly engage the gear teeth 400a of the third ring gear 400. A raised portion 442 may be formed into each of the front and rear faces of the planet gears 438 which inhibits the gear teeth 438a from rubbing on the third reduction carrier 404 and creating dust or chips that would impair the performance of the transmission assembly 12 and reduce its operating life. A second thrust washer 450 may be disposed around the third sun gear 398 and the teeth 398a of the third sun gear 398 can be meshingly engaged with the gear teeth 438a of the planet gears 438. The second thrust washer 450 may include a plurality of retaining tabs 452 that can be configured to engage corresponding tab grooves 454 (FIG. 13) that can be formed in the inner surface 266 of body portion 246 of the transmission sleeve 200. The retaining tabs 452 and the tab grooves 454 cooperate to inhibit relative rotation between the second thrust washer 450 and the transmission sleeve 200.

The output spindle assembly 20 may include a transmitting means 458 for coupling a spindle 460 for rotation with the third reduction carrier 404 so as to transmit drive torque from the reduction gearset assembly 202 to the chuck 22. Such transmitting means 458 are well known in the art and easily adapted to the transmission assembly of the present disclosure. Accordingly, a detailed discussion of the transmitting means 458 need not be included herein.

With reference to FIGS. 13, 13a, 13b, 16, 17, 18 and 23 through 28, the speed selector mechanism 60 may be movable between a first position 500, a second position 502 and a third position 504 and can include a switch portion 510 for receiving a speed change input and an actuator portion 512 for manipulating the reduction gearset assembly 202 in accordance with the speed change input. The actuator portion 512 may be operatively coupled to the reduction gearset assembly 202 and moves the second and third reduction gear sets 304 and 306 between the active and inactive modes in response to movement of the switch portion 510 between the first, second and third positions 500, 502 and 504. In the particular embodiment illustrated, the actuator portion 512 can include a rotary selector cam 520, a plurality of wire clips 522 and a spring member 523. Each of the wire clips 522 may be formed from a round wire which may be bent in the shape of a semi-circle 524 with a pair of tabs 526 extending outwardly from the semi-circle 524 and positioned on about the centerline of the semi-circle 524. The semi-circle 524 may be sized to fit within the clip grooves 374 and 422 in the second and third ring gears 360 and 400, respectively. In this regard, the semi-circle 524 neither extends radially outwardly of an associated one of the ring gears (360, 400), nor binds against the sidewalls (376, 424) of the clip grooves (374, 422). In the example provided, the sidewalls (376, 424) of the clip grooves (374, 422) are spaced apart about 0.05 inch and the diameter of the wire forming the wire clips 522 may be about 0.04 inch.

The tabs 526 of the wire clips 522 extend outwardly of the hollow cavity 212 into an associated one of the clip slots (284, 286) that may be formed into the transmission sleeve 200. The tabs 526 can be long enough so that they extend outwardly of the outer surface 258 of the body 214 of the transmission sleeve 200, but not so far as to extend radially outwardly of the portion of the first clip slots 284 in the base 216 of the transmission sleeve 200. Configuration of the wire clips 522 in this manner facilitates the assembly of the transmission assembly 16, permitting the wire clips 522 to be installed to the second and third ring gears 360 and 400, after which these assemblies can be inserted into the hollow cavity 212 along the longitudinal axis of the transmission sleeve 200.

With specific reference to FIGS. 13 and 27a through 27c, the rotary selector cam 520 may include an arcuate selector body 530, a switch tab 532 and a plurality of spacing members 534. A pair of first cam slots 540a and 540b, a pair of second cam slots 544a and 544b, a spring aperture 546 and a guide aperture 548 can be formed through the selector body 530. The selector body 530 may be sized to engage the outside diameter of the body portion 246 of the transmission sleeve 200 in a slip-fit manner. The guide aperture 548 may be generally rectangular in shape and sized to engage the front and rear surfaces of the selector cam guide 250. The guide aperture 548 may be considerably wider than the width of the selector cam guide 250, being sized in this manner to permit the rotary selector cam 520 to be rotated on the transmission sleeve 200 between a first rotational position, a second rotational position and a third rotational position. The selector cam guide 250 and cooperates with the guide aperture 548 to limit the amount by which the rotary selector cam 520 can be rotated on the transmission sleeve 200, with a first lateral side of the selector cam guide 250 contacting a first lateral side of the guide aperture 548 when the rotary selector cam 520 is positioned in the first rotational position, and a second lateral side of the selector cam guide 250 contacting a second lateral side of the guide aperture 548 when the rotary selector cam 520 is positioned in the third rotational position.

Each of the first cam slots 540a and 540b may be sized to receive one of the tabs 526 of the wire clip 522 that is engaged to the second ring gear 360. In the particular embodiment illustrated, first cam slot 540a can include a first segment 550, a second segment 552 and an intermediate segment 554. The first segment 550 may be located a first predetermined distance away from a reference plane 558 that may be perpendicular to the longitudinal axis of the rotary selector cam 520 and the second segment 552 may be located a second distance away from the reference plane 558. The intermediate segment 554 couples the first and second segments 550 and 552 to one another. The configuration of first cam slot 540b is identical to that of first cam slot 540a, except that it is rotated relative to the rotary selector cam 520 such that each of the first, second and intermediate segments 550, 552 and 554 in the first cam slot 540b can be located 180° apart from the first, second and intermediate segments 550, 552 and 554 in the first cam slot 540a.

Each of the second cam slots 544a and 544b may be sized to receive one of the tabs 526 of a corresponding one of the wire clips 522. In the particular embodiment illustrated, second cam slot 544a can include a first segment 560, a second segment 562, a third segment 564 and a pair of intermediate segments 566 and 568. The first and third segments 560 and 564 can be located a third predetermined distance away from the reference plane and the second segment 562 may be located a fourth distance away from the reference plane 558. The intermediate segment 566a couples the first and second segments 560 and 562 to one another and the intermediate segment 568 couples the second and third segments 562 and 566 together. The configuration of second cam slot 544b is identical to that of second cam slot 544a, except that it is rotated relative to the rotary selector cam 520 such that each of the first, second, third and intermediate segments 560, 562, 564 and 566 and 568 in the second cam slot 544b can be located 180° apart from the first, second, third and intermediate segments 560, 562, 564 and 566 and 568 in the second cam slot 544a.

With the tabs 526 of the wire clips 522 engaged to the first cam slots 540a and 540b and the second cam slots 544a and 544b, the rotary selector cam 520 may be rotated on the transmission sleeve 200 between the first, second and third positions 500, 502 and 504 to selectively engage and disengage the second and third ring gears 360 and 400 from the first and third reduction carriers 314 and 404, respectively. During the rotation of the rotary selector cam 520, the first cam slots 540a and 540b and the second cam slots 544a and 544b confine the wire tabs 526 of their associated wire clip 522 and cause the wire tabs 526 to travel along the longitudinal axis of the transmission sleeve 200 in an associated one of the first and second clip slots 284 and 286. Accordingly, the rotary selector cam 520 may be operative for converting a rotational input to an axial output that causes the wire clips 522 to move axially in a predetermined manner. A lubricant (not specifically shown) may be applied to the lubricant grooves 252 formed into body portion 246 of the transmission sleeve 200 may be employed to lubricate the interface between the transmission sleeve 200 and the rotary selector cam 520.

Figure 23:
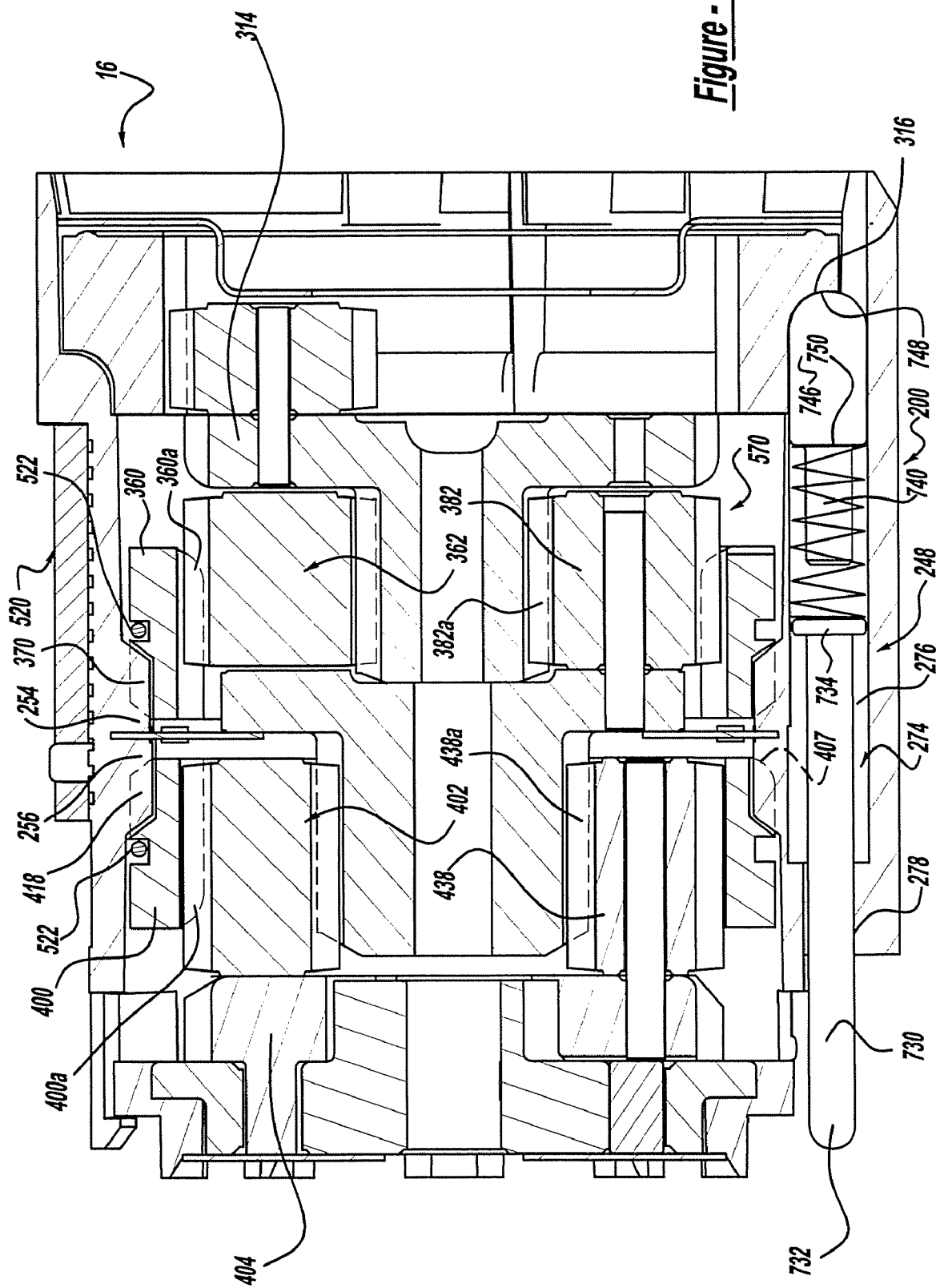
FIG. 23 is an sectional view taken along the longitudinal axis of the power tool of FIG. 1 and illustrating the transmission assembly as positioned in the first speed ratio.

Positioning the rotary selector cam 520 in the first rotational position 500 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the first segment 560 of the second cam slots 544a and 544b. Accordingly, positioning of the rotary selector cam 520 in the first rotational position causes the second and third ring gears 360 and 400 to be positioned in meshing engagement with the second and third planet gears 362 and 402, respectively. Simultaneously with the meshing engagement of the second and third ring gears 360 and 400 with the second and third planet gears 362 and 402, the sleeve engagement teeth 370 and 418 of the second and third ring gears 360 and 400, respectively, can be positioned in meshing engagement with the first and second sets of ring engagement teeth 254 and 256, respectively, to inhibit relative rotation between the second and third ring gears 360 and 400 and the transmission sleeve 200 to thereby providing the transmission assembly 16 with a first overall gear reduction or speed ratio 570 as shown in FIG. 23. Those skilled in the art will understand that the tip portion 272 of the teeth 268 of the first and second sets of ring engagement teeth 254 and 256 and the tip portions 372 and 420 of the sleeve engagement teeth 370 and 418, respectively, can be rounded and tapered so as to improve their capability for meshing engagement in response to axial repositioning along a longitudinal axis of the transmission assembly 16.

Figure 24:
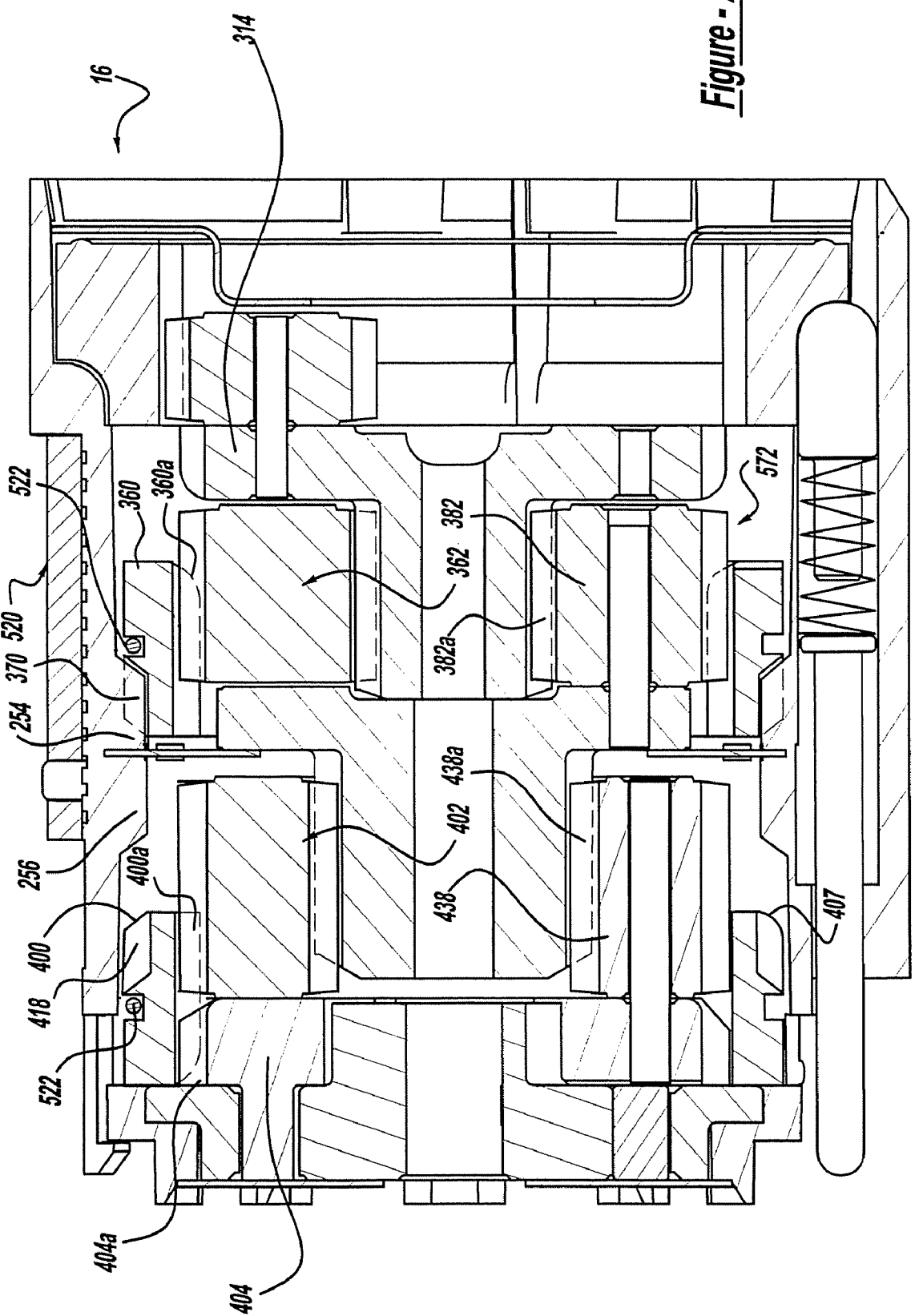
FIG. 24 is a sectional view similar to that of FIG. 23 but illustrating the transmission assembly as positioned in the second speed ratio.
Figure 25:
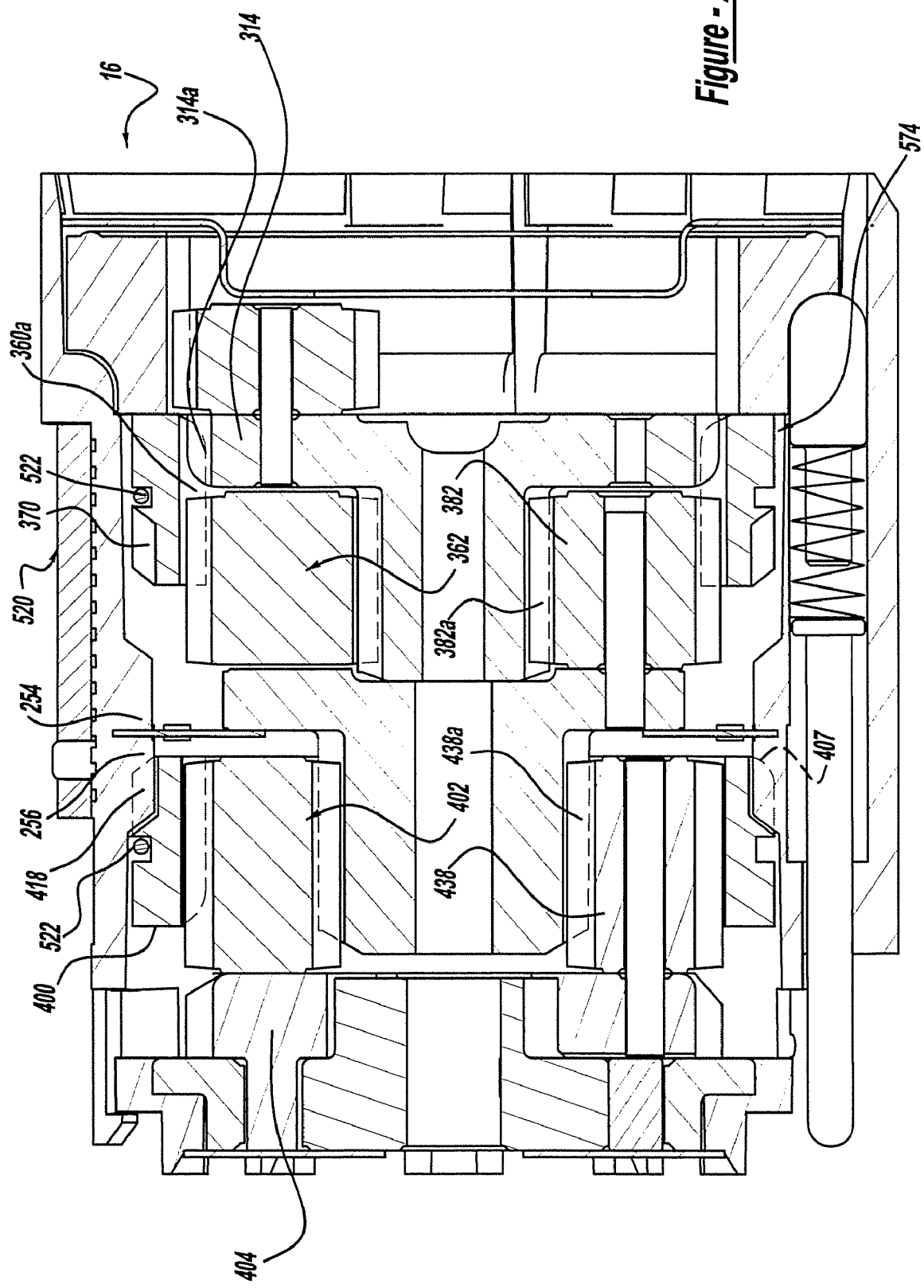
FIG. 25 is a sectional view similar to that of FIG. 23 but illustrating the transmission assembly as positioned in the third speed ratio.

Positioning the rotary selector cam 520 in the second rotational position 502 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the second segment 562 of the second cam slots 544a and 544b. Accordingly, positioning of the rotary selector cam 520 in second rotational position causes the second ring gear 360 to be in meshing engagement with the second planet gears 362 and the third ring gear 400 in meshing engagement with both the third planet gears 402 and the third reduction carrier 404. Positioning of the rotary selector cam 520 in the second rotational position 502 also positions the sleeve engagement teeth 370 of the second ring gear 360 in meshing engagement with the first set of ring engagement teeth 254 while the sleeve engagement teeth 418 of the third ring gear 400 can be not meshingly engaged with the second set of ring engagement teeth 256. As such, relative rotation between the second ring gear 360 and the transmission sleeve 200 is inhibited, while relative rotation between the third ring gear 400 and the transmission sleeve 200 is permitted to thereby provide the transmission assembly 16 with a second overall gear reduction or speed ratio 572 as illustrated in FIG. 24.

Positioning the rotary selector cam 520 in the third rotational position 504 causes the tabs 526 of the wire clip 522 that is engaged to the second ring gear 360 to be positioned in the second segment 552 of the first cam slots 540a and 540b and the tabs 526 of the wire clip 522 that is engaged to the third ring gear 400 to be positioned in the third segment 564 of the second cam slots 544a and 544b. Accordingly, positioning of the rotary selector cam 520 in the third rotational position causes the second ring gear 360 to be in meshing engagement with both the second planet gears 362 and the first reduction carrier 314 while the third ring gear 400 in meshing engagement with only the third planet gears 402. Positioning the rotary selector cam 520 in the third rotation position 504 also positions the sleeve engagement teeth 370 on the second ring gear 360 out of meshing engagement with the first set of ring engagement teeth 254 and the sleeve engagement teeth 418 on the third ring gear 400 in meshing engagement with the second sets of ring engagement teeth 256 to inhibit relative rotation between the second ring gear 360 and the transmission sleeve 200 and permit relative rotation between the third ring gear 400 and the transmission sleeve 200 to provide the transmission assembly 16 with a third overall gear reduction or speed ratio 574.

Figure 13:
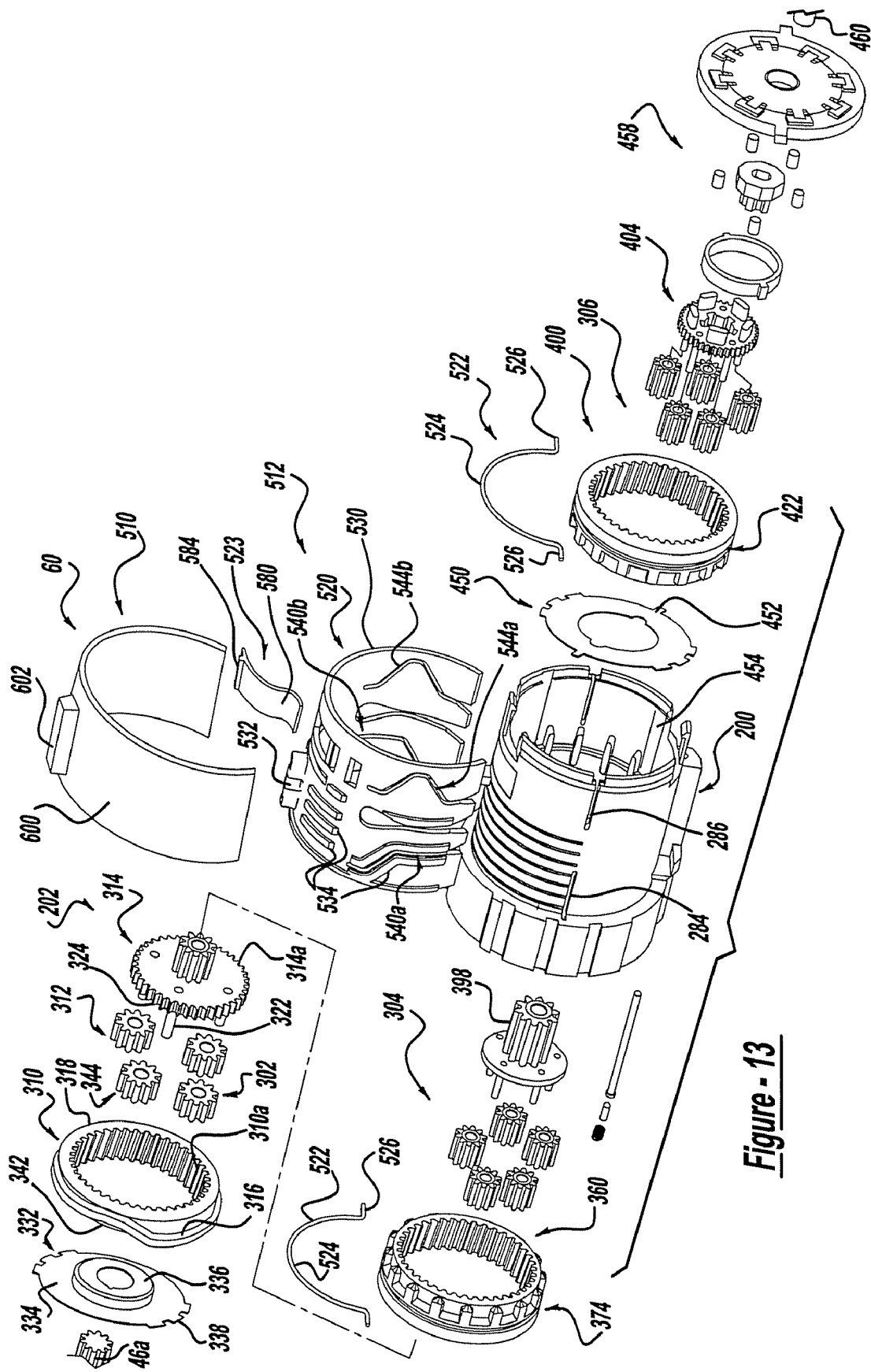
FIG. 13 is an exploded perspective view of a portion of the power tool of FIG. 1, illustrating the reduction gearset assembly, the transmission sleeve, a portion of the housing and a portion of the clutch mechanism in greater detail.
Figure 13A:
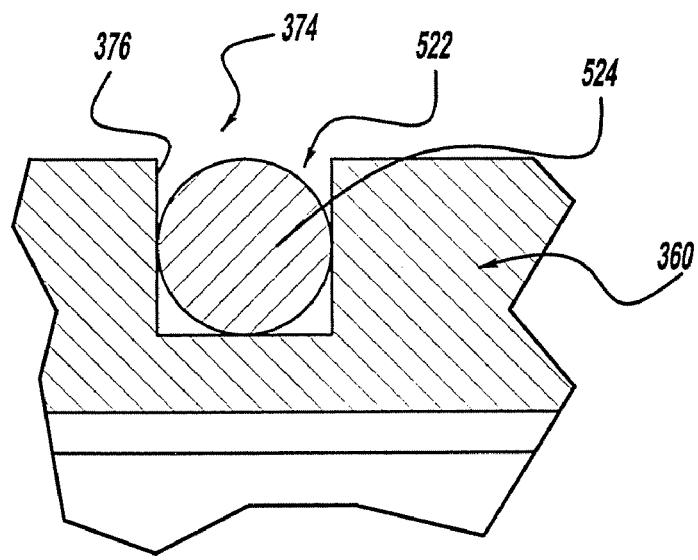
FIG. 13a is a sectional view taken along a longitudinal axis of the second ring gear.
Figure 13B:
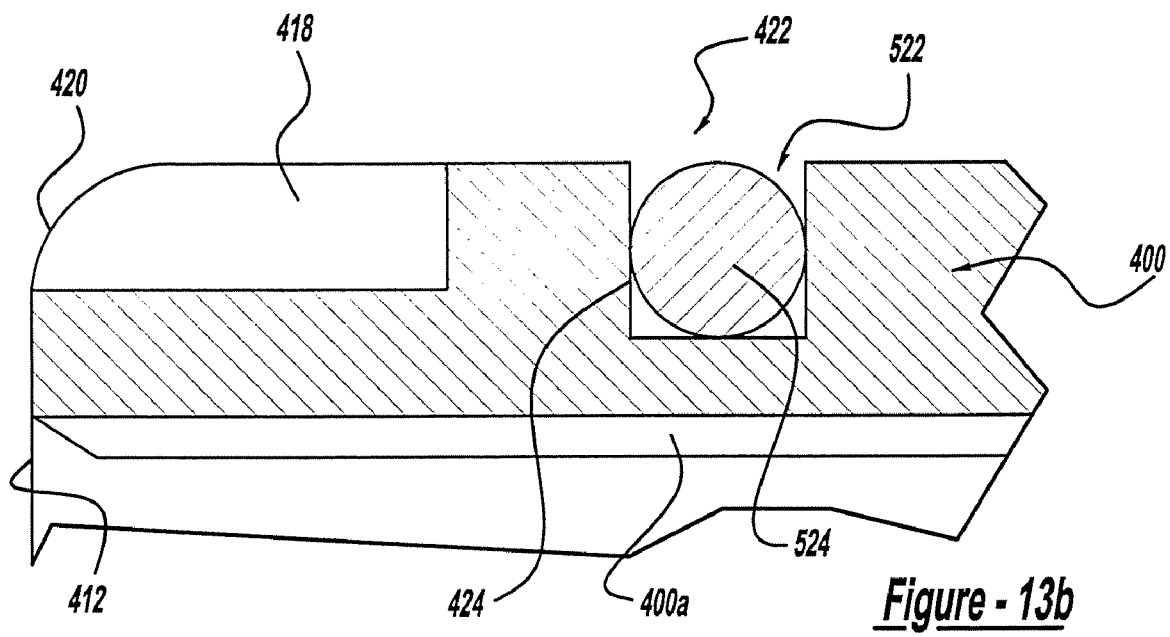
FIG. 13b is a sectional view taken along a longitudinal axis of the third ring gear.
Figure 14:
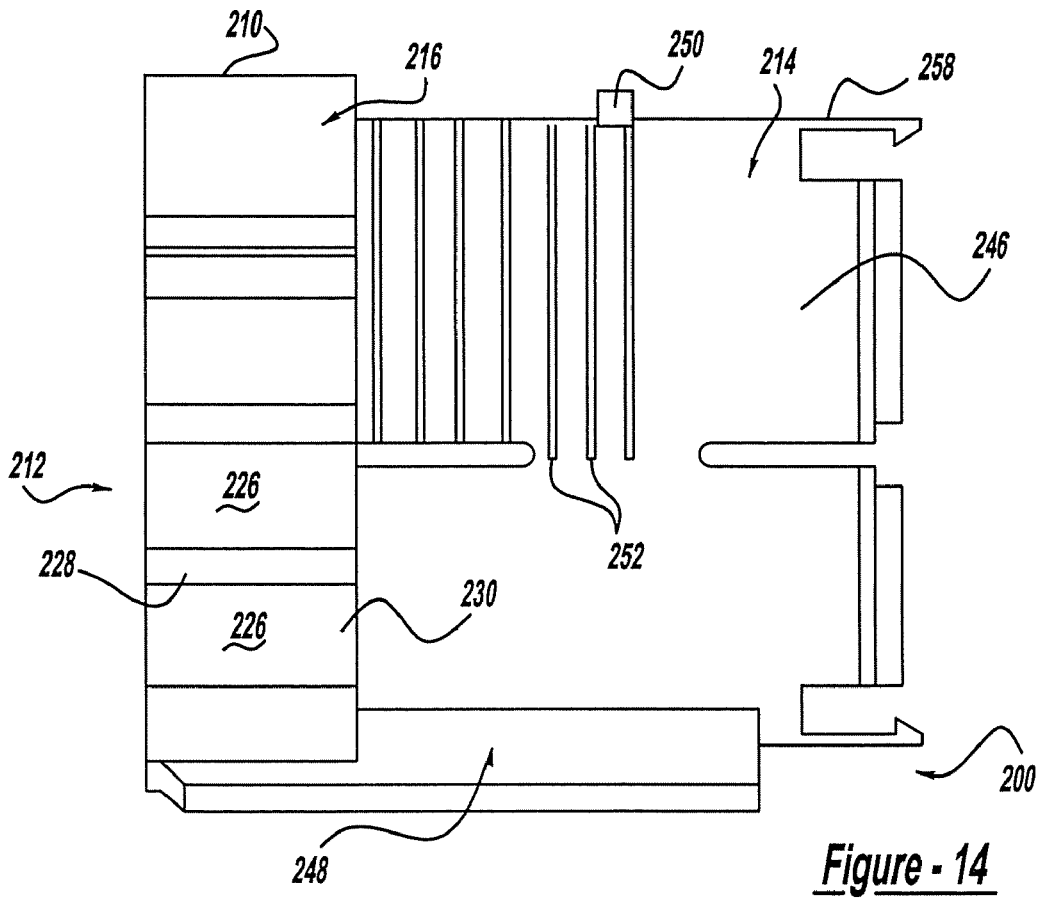
FIG. 14 is a side view of the transmission sleeve.
Figure 15:
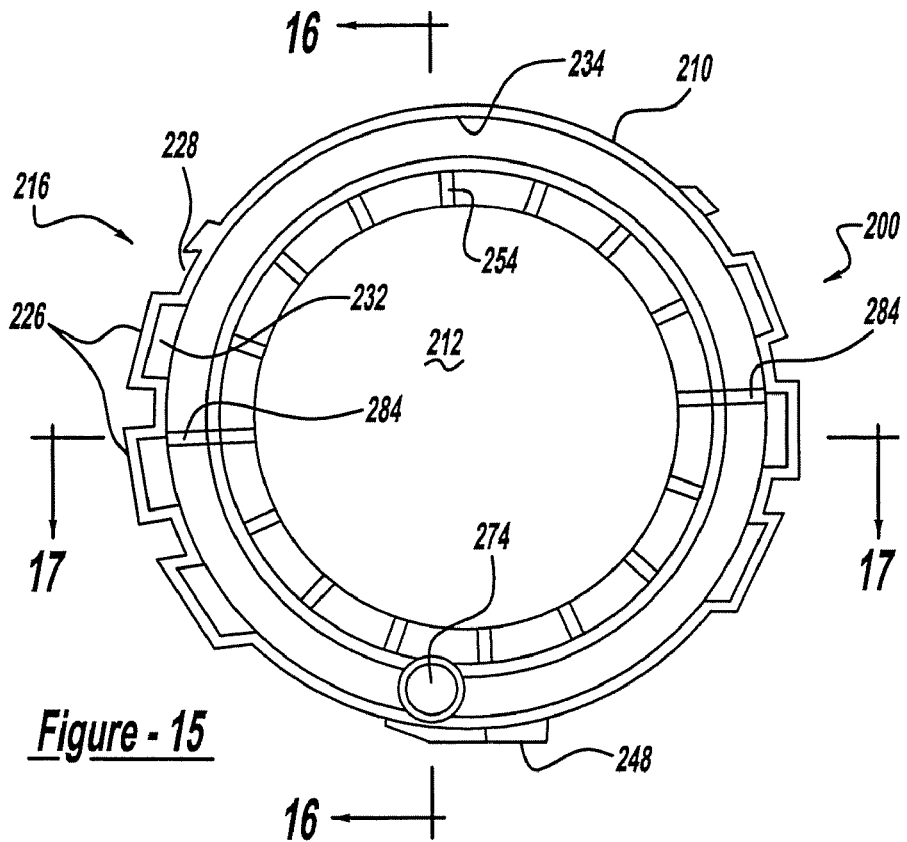
FIG. 15 is a rear view of the transmission sleeve.
Figure 16:
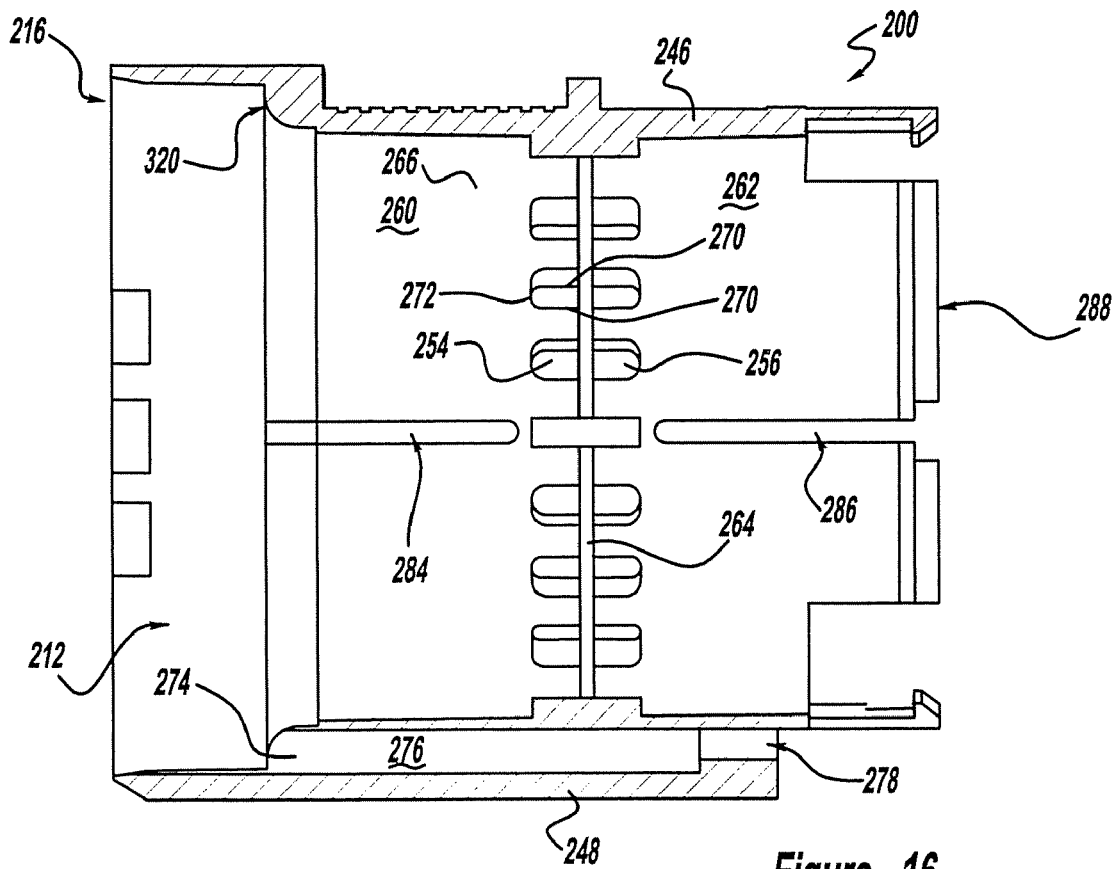
FIG. 16 is a sectional view taken along the line 16-16 of FIG. 15.
Figure 17:
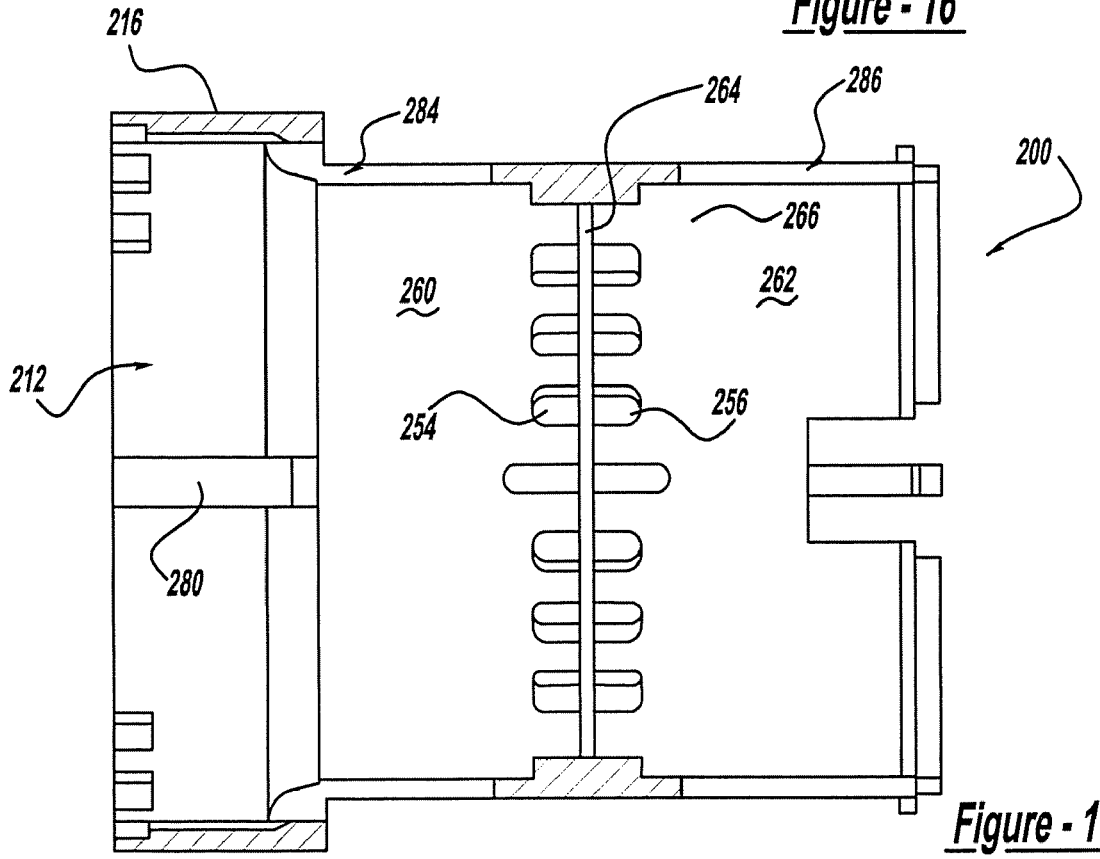
FIG. 17 is a sectional view taken along the line 17-17 of FIG. 15.
Figure 18:
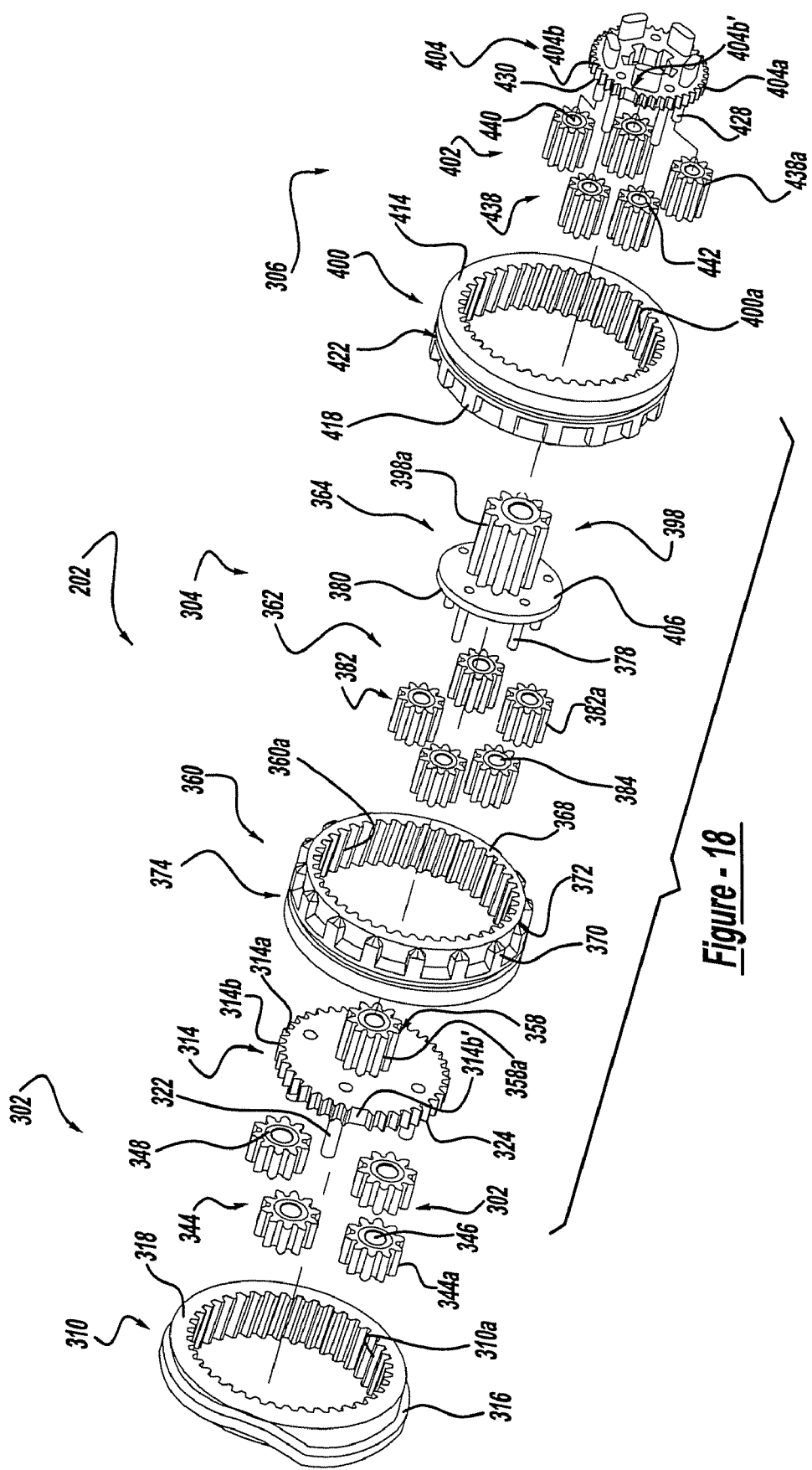
FIG. 18 is an exploded view of the reduction gearset assembly.
Figure 27B:
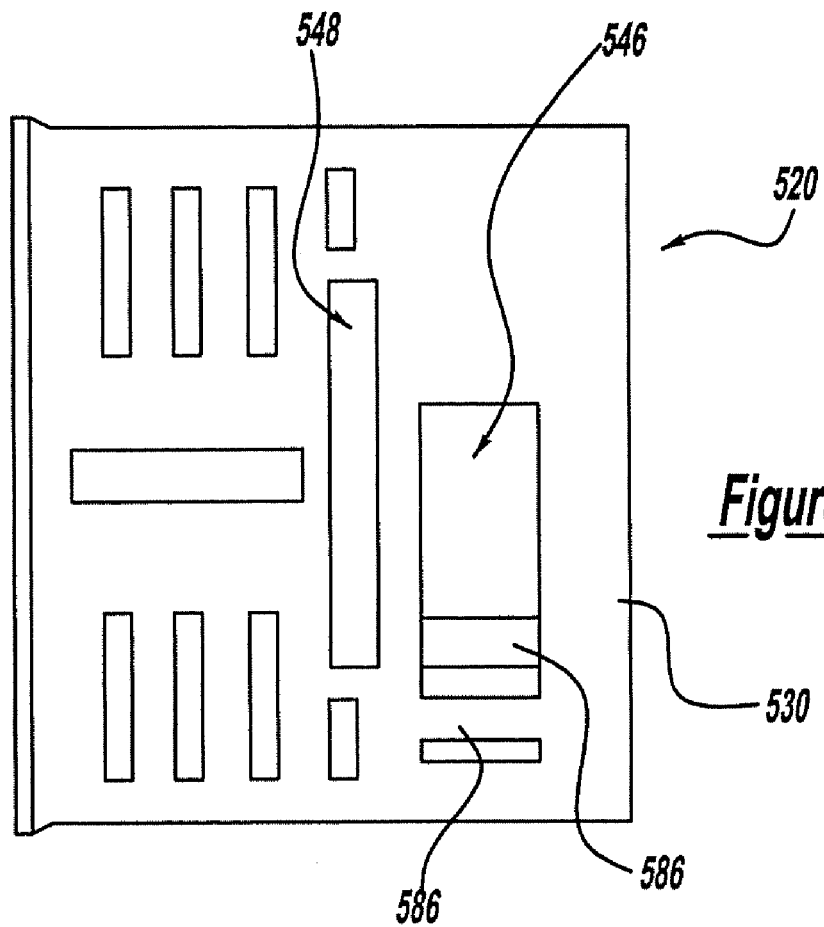
FIG. 27b is a top view of the rotary selector cam.
Figure 28:
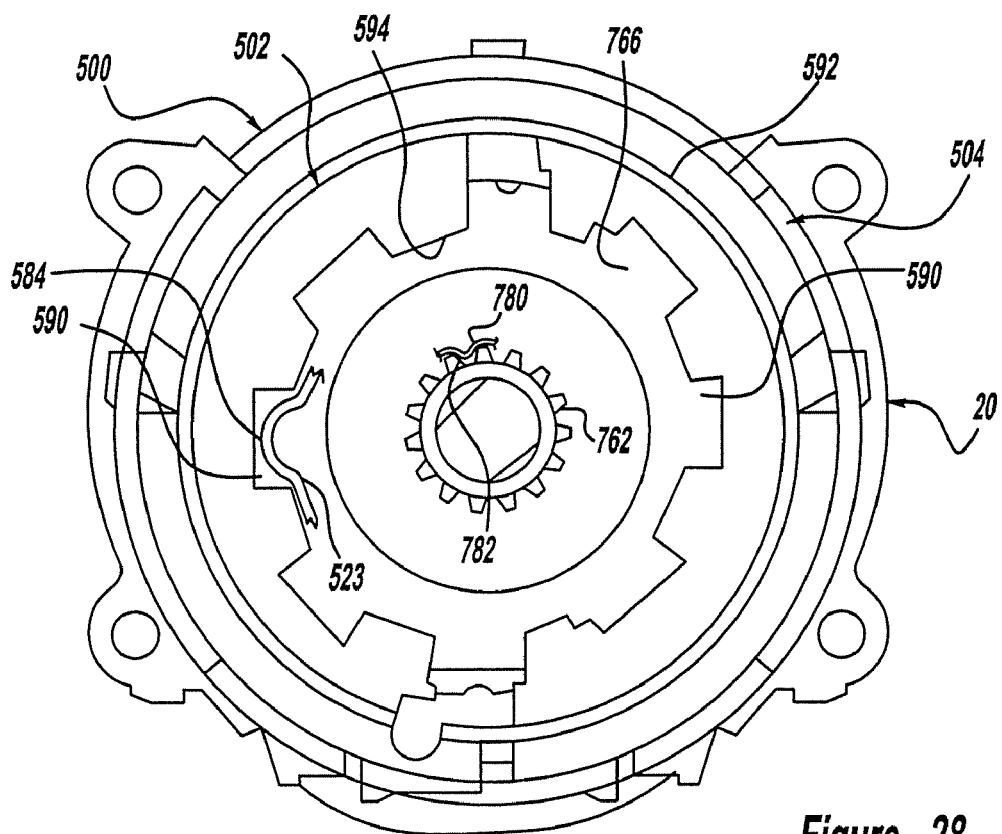
FIG. 28 is a rear view of the output spindle assembly.

In the example shown in FIGS. 13, 27b and 28, the spring member 523 may be formed from a flat rectangular piece of spring steel and can include a flattened Z-shaped portion 580 and a raised portion 584. The flattened Z-shaped portion 580 may be configured to wrap around two reinforcement bars 586 that extend into the spring aperture 546, thereby permitting the raised portion 584 to be maintained at a predetermined position and also to transmit a spring force between the rotary selector cam 520 and the spring member 523. With additional reference to FIG. 28, the raised portion 584 of the spring member 523 may be sized to engage internal notches 590 formed in the housing 592 of the output spindle assembly 20. Lands 594 that can be circumferentially spaced from the rotary selector cam 520 can be formed between the notches 590. When the output spindle assembly 20 is positioned over the transmission assembly 16 and the speed selector mechanism 60 is positioned in one of the first, second and third rotational positions 500, 502 and 504, the raised portion 584 of the spring member 523 engages an associated one of the notches 590. The force that is generated by the spring member 523 when the raised portion 584 is moved downwardly toward the rotary selector cam 520 in response to contact between the raised portion 584 and the land 594 acts to inhibit unintended rotation of the speed selector mechanism 60. Furthermore, placement of the raised portion 584 in a notch 590 provides the user with a tactile indication of the positioning of the rotary selector cam 520.

Figure 27C:
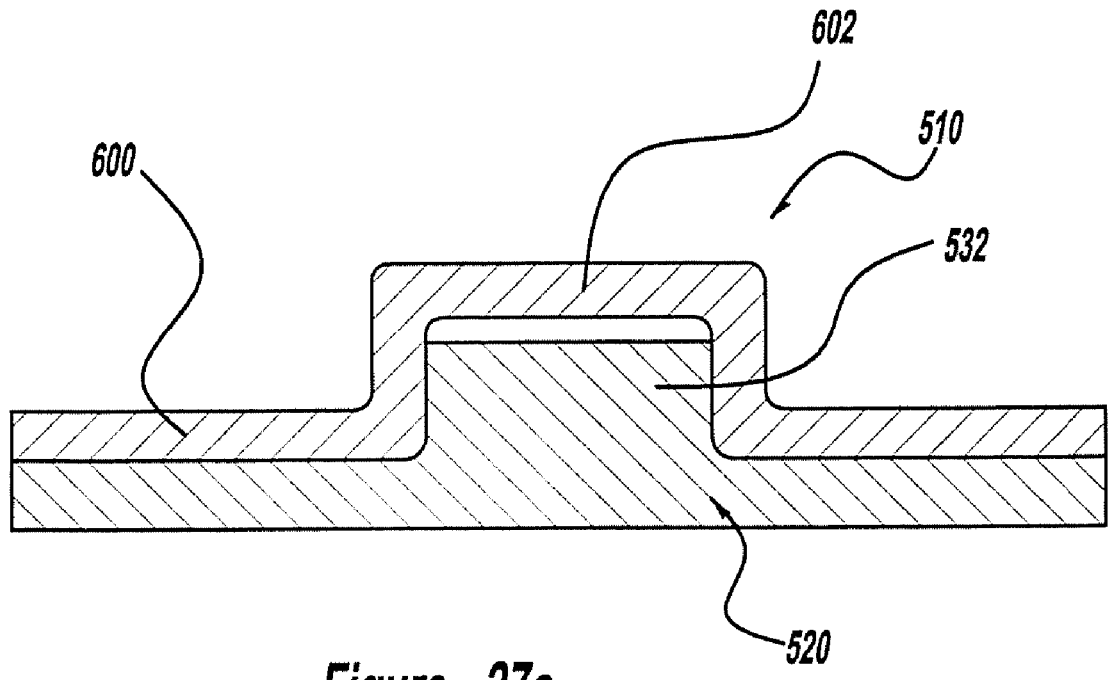
FIG. 27c is a sectional view taken through along the central axis of the speed selector mechanism.

In the particular embodiment illustrated in FIGS. 13 and 27c, switch portion 510 may include an arcuate band 600 having a raised hollow and rectangular selector button 602 formed therein. The arcuate band 600 may be formed from a plastic material and may be configured to conform to the outer diameter of the rotary selector cam 520. The open end of the selector button 602 may be configured to receive the switch tab 532, thereby permitting the switch portion 510 and the rotary selector cam 520 to be coupled to one another in a fastenerless manner. The plurality of spacing members 534 can be raised portions formed into the rotary selector cam 520 that can be concentric to and extend radially outwardly from the selector body 530. The spacing members 534 elevate the arcuate band 600 to prevent the arcuate band from contacting the wire tabs 526 in the first cam slots 540a and 540b. The spacing members 534 may also be employed to selectively strengthen areas of the rotary selector cam 520, such as in the areas adjacent the first cam slots 540a and 540b.

Those skilled in the art will understand that the rotary selector cam 520 (i.e., the first cam slots 540a and 540b and the second cam slots 544a and 544b) could be configured somewhat differently so as to cause the second ring gear 360 meshingly engages both the second planet gears 362 and the first reduction carrier 314 while the third ring gear 400 meshingly engages both the third planet gears 402 and the third reduction carrier 404 to thereby providing the transmission assembly 16 with a fourth overall gear reduction or speed ratio.

Those skilled in the art will also understand that selector mechanisms of other configurations may be substituted for the selector mechanism 60 illustrated herein. These selector mechanisms may include actuators that can be actuated via rotary or sliding motion and may include linkages, cams or other devices that are well known in the art to slide the second and third ring gears 360 and 400 relative to the transmission sleeve 200. Those skilled in the art will also understand that as the second and third ring gears 360 and 400 can be independently movable between the active and inactive modes (i.e., the placement of one of the second and third ring gears 360 and 400 does not dictate the positioning of the other one of the second and third ring gears 360 and 400), the switch mechanism 60 could also be configured to position the second and third ring gears 360 and 400 independently of one another.

Clutch Mechanism

Figure 29:
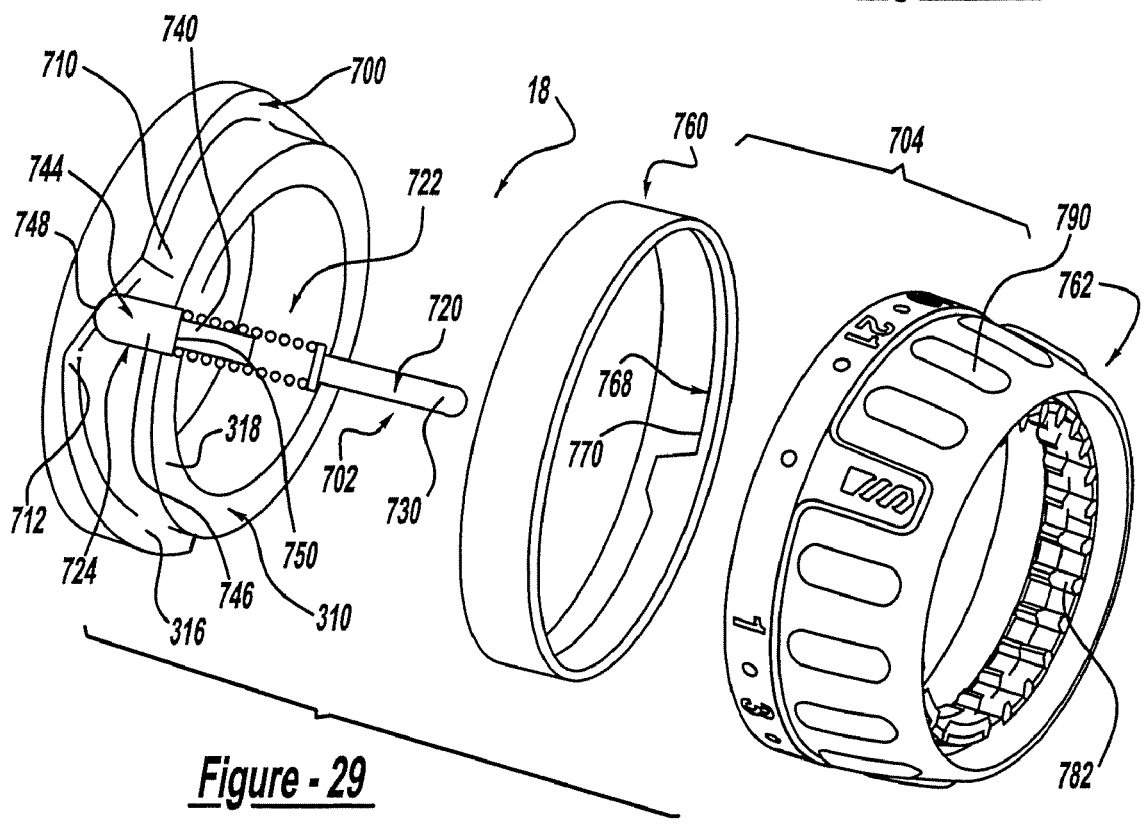
FIG. 29 is an exploded perspective view of the clutch mechanism.
Figure 29A:
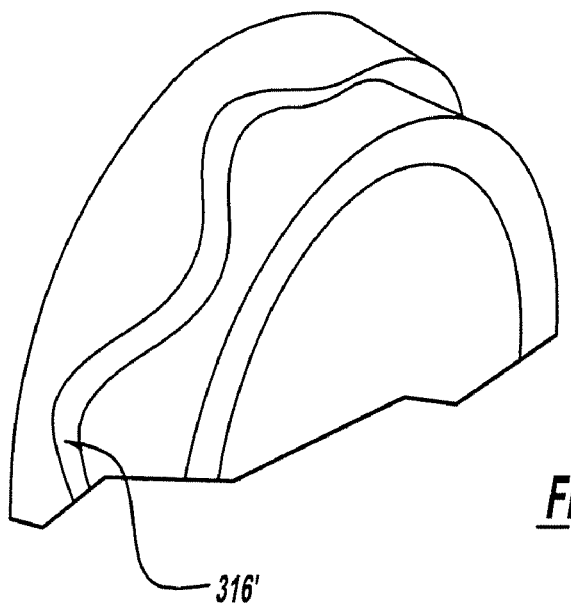
FIG. 29a is a perspective view of a portion of the clutch mechanism illustrating another configuration of the clutch member.

In FIGS. 23, 26 and 28 through 30, the clutch mechanism 18 may include a clutch member 700, an engagement assembly 702 and an adjustment mechanism 704. The clutch member 700 may be an annular structure that may be fixed to the outer diameter of the first ring gear 310 and which extends radially outwardly therefrom. The clutch member 700 may include a clutch face 316 that may be formed into the front face 318 of the first ring gear 310. The outer diameter of the clutch member 700 may be sized to rotate within the portion of the hollow cavity 212 that is defined by the base 216 of the transmission sleeve 200. With specific brief reference to FIG. 29, the clutch face 316 of the example illustrated is shown to be defined by a plurality of peaks 710 and valleys 712 that can be arranged relative to one another to form a series of ramps that can be defined by an angle of about 18°. Those skilled in the art will understand, however, that other clutch face configurations may also be employed, such as a sinusoidally shaped clutch face 316' (FIG. 29a).

Figure 29B:
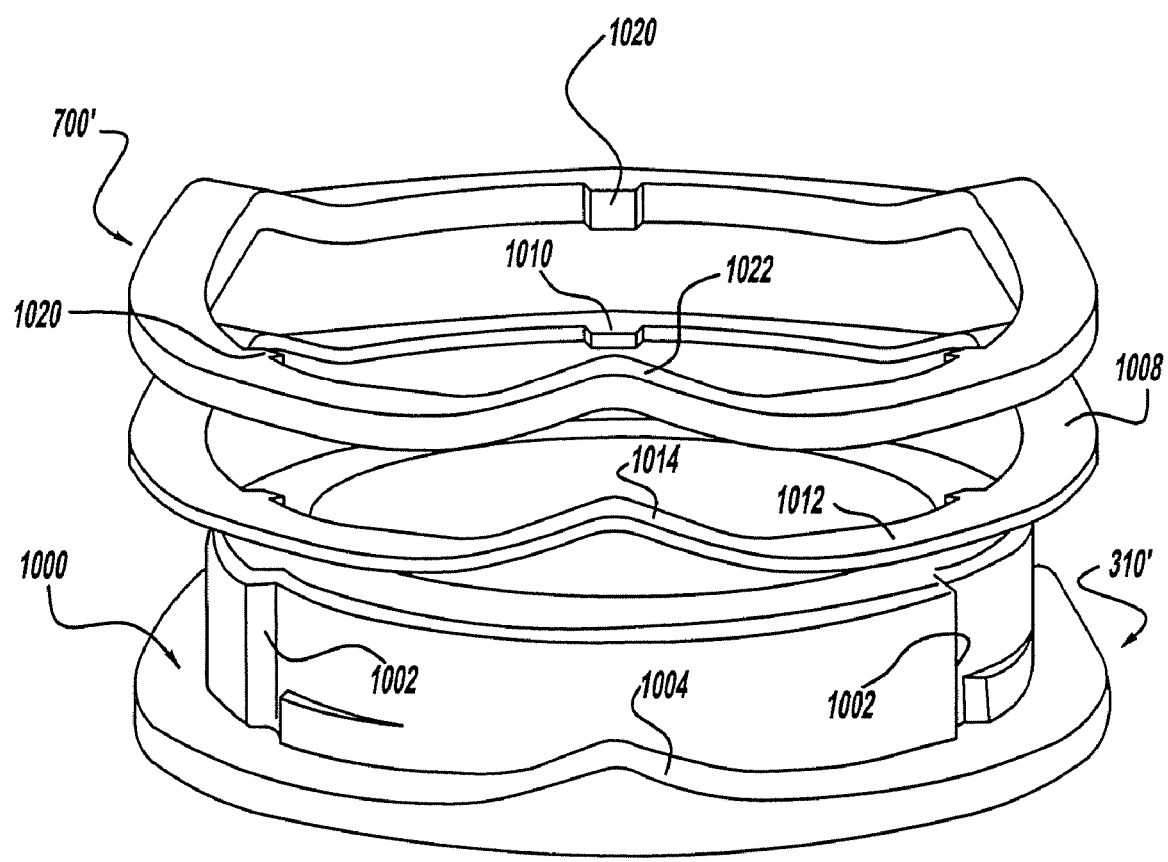
FIG. 29b is an exploded perspective view illustrating a multi-piece construction for the first ring gear and clutch member.
Figure 30:
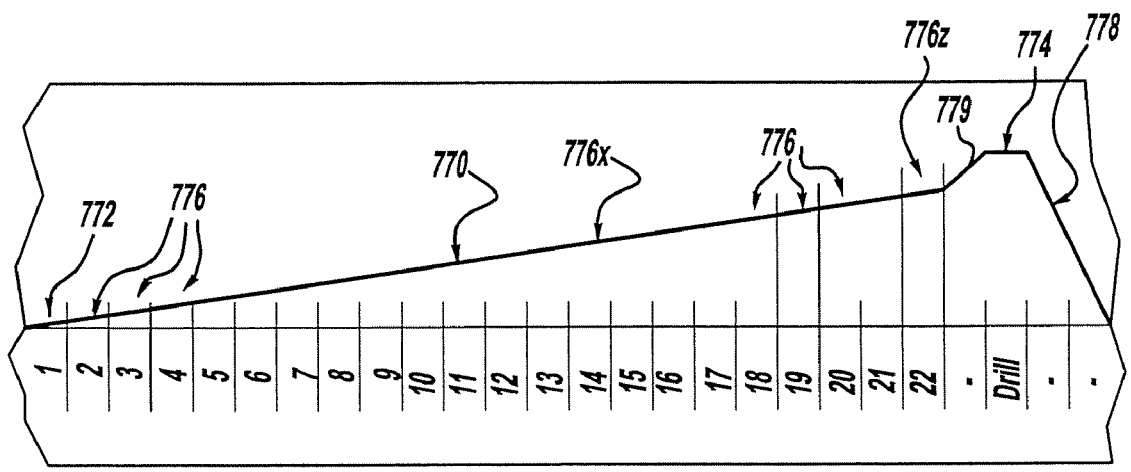
FIG. 30 is a schematic illustration of the adjustment structure in an "unwrapped" state.

While the first ring gear 310 and the clutch member 700 have been illustrated as a one piece (i.e., unitarily formed) construction, those skilled in the art will understand that they may be constructed otherwise. One such embodiment is illustrated in FIG. 29b wherein the first ring gear 310' may include an annular collar 1000 and a plurality of tab apertures 1002. The annular collar 1000 may include a plurality of ramps 1004 that have dual sloping sides, but is otherwise flat. The first ring gear 310' is otherwise identical to the first ring gear 310. An annular damper 1008 abuts the annular collar 1000 and can include a plurality of tab members 1010 that engage the tab apertures 1002 in the first ring gear 310' to prevent the damper 1008 from rotating relative to the first ring gear 310'. The damper 1008 can include a body portion 1012 that may be configured to match the contour of the annular collar 1000 and as such, can include a plurality of mating ramped portions 1014 that can be configured to engage each of the ramps 1004. The damper 1008 may be formed from a suitable impact dampening material, such as acetyl. The clutch member 700', which may be an annular member that may be formed from a wear resistant material, such as hardened 8620 steel, may be disposed over the damper 1008. Like the damper 1008, the clutch member 700' can include a plurality of tab members 1020, which lock into the tab apertures 1002 to prevent rotation relative to the first ring gear 310', and a plurality of mating ramped portions 1022. The mating ramped portions 1022 of the clutch member 700', however, matingly engage the mating ramped portions 1014 of the damper 1008. While the construction in this manner is more expensive relative to the previously described embodiment, it is more tolerant of high impact forces that can be associated with the operation of the clutch mechanism 18.

In the particular embodiment illustrated, the engagement assembly 702 can include a pin member 720, a follower spring 722 and a follower 724. The pin member 720 can include a cylindrical body portion 730 having an outer diameter that may be sized to slip-fit within the second portion 278 of the actuator aperture 274 that is formed into the pin housing portion 248 of the transmission sleeve 200. The pin member 720 also can include a tip portion 732 and a head portion 734.

The tip portion 732 may be configured to engage the adjustment mechanism 704 and in the example shown, is formed into the end of the body portion 730 of the pin member 720 and defined by a spherical radius. The head portion 734 may be coupled to the end of the body portion 730 opposite the tip portion 732 and may be shaped in the form of a flat cylinder or barrel that is sized to slip fit within the first portion 276 of the actuator aperture 274. Accordingly, the head portion 734 prevents the pin member 720 from being urged forwardly out of the actuator aperture 274.

The follower spring 722 may be a compression spring whose outside diameter may be sized to slip fit within the first portion 276 of the actuator aperture 274. The forward end of the follower spring 722 contacts the head portion 734 of the pin member 720, while the opposite end of the follower spring 722 contacts the follower 724. The end portion 740 of the follower 724 may be cylindrical in shape and sized to slip fit within the inside diameter of the follower spring 722. In this regard, the end portion 740 of the follower acts as a spring follower to prevent the follower spring 722 from bending over when it is compressed. The follower 724 also can include a follower portion 744 having a cylindrically shaped body portion 746, a tip portion 748 and a flange portion 750. The body portion 746 may be sized to slip fit within the first portion 276 of the actuator aperture 274. The tip portion 748 may be configured to engage the clutch face 316 and in the example shown, is formed into the end of the body portion 746 of the follower 724 and defined by a spherical radius. The flange portion 750 may be formed at the intersection between the body portion 746 and the end portion 740. The flange portion 750 may be generally flat and configured to receive a biasing force that may be exerted by the follower spring 722.

The adjustment mechanism 704 may also include an adjustment structure 760 and a setting collar 762. The adjustment structure 760 may be shaped in the form of a generally hollow cylinder that may be sized to fit a housing portion 766 of the output spindle assembly 20. The adjustment structure 760 can include an annular face 768 into which an adjustment profile 770 may be formed. The adjustment profile 770 can include a first adjustment segment 772, a last adjustment segment 774, a plurality of intermediate adjustment segments 776 and a ramp section 778 between the first and last adjustment segments 772 and 774. In the embodiment illustrated, a second ramp section 779 is included between the last intermediate adjustment segment 776z and the last adjustment segment 774. Also in the particular embodiment illustrated, the portion of the adjustment profile 770 from the first adjustment segment 772 through the last one of the intermediate adjustment segments 776z is formed as a ramp having a constant slope. Accordingly, a follower 780 that is coupled to the housing portion 766 of the output spindle assembly 20 may be biased radially outwardly toward the inside diameter of the adjustment structure 760 where it acts against the plurality of detents 782 that can be formed into the adjustment mechanism 704 (e.g., in the setting collar 762). The follower 724 and plurality of detents 782 cooperate to provide the user of tool 10 with a tactile indication of the position of the adjustment profile 770 as well as inhibit the free rotation of the adjustment structure 760 so as to maintain the position of the adjustment profile 770 at a desired one of the adjustment segments 772, 774 and 776.

The setting collar 762 may be coupled to the exterior of the adjustment structure 760 and may include a plurality of raised gripping surfaces 790 that permit the user of the tool 10 to comfortably rotate both the setting collar 762 and the adjustment structure 760 to set the adjustment profile 770 at a desired one of the adjustment segments 772, 774 and 776. A setting indicator 792 may be employed to indicate the position of the adjustment profile 770 relative to the housing portion 766 of the output spindle assembly 20. In the example provided, the setting indicator 792 can include an arrow 794 formed into the housing portion 766 of the output spindle assembly 20 and a scale 796 that is marked into the circumference of the setting collar 762.

During the operation of the tool 10, an initial drive torque is transmitted by the motor pinion 46 from the motor assembly 14 to the first set of planet gears 312 causing the first set of planet gears 312 to rotate. In response to the rotation of the first set of planet gears 312, a first intermediate torque is applied against the first ring gear 310. Resisting this torque is a clutch torque that is applied by the clutch mechanism 18. The clutch torque inhibits the free rotation of the first ring gear 310, causing the first intermediate torque to be applied to the first reduction carrier 314 and the remainder of the reduction gearset assembly 202 so as to multiply the first intermediate torque in a predetermined manner according to the setting of the switch mechanism 60. In this regard, the clutch mechanism 18 biases the first reduction gear set 302 in the active mode.

The magnitude of the clutch torque is dictated by the adjustment mechanism 704, and more specifically, the relative height of the adjustment segment 772, 774 or 776 that is in contact with the tip portion 732 of the pin member 720. Positioning of the adjustment mechanism 704 at a predetermined one of the adjustment segments 772, 774 or 776 pushes the pin member 720 rearwardly in the actuator aperture 274, thereby compressing the follower spring 722 and producing the a clutch force. The clutch force is transmitted to the flange portion 750 of the follower 724, causing the tip portion 748 of the follower 724 to engage the clutch face 316 and generating the clutch torque. Positioning of the tip portion 748 of the follower 724 in one of the valleys 712 in the clutch face 316 operates to inhibit rotation of the first ring gear 310 relative to the transmission sleeve 200 when the magnitude of the clutch torque exceeds the first intermediate torque. When the first intermediate torque exceeds the clutch torque, however, the first ring gear 310 is permitted to rotate relative to the transmission sleeve 200. Depending upon the configuration of the clutch face 316, rotation of the first ring gear 310 may cause the clutch force to increase a sufficient amount to resist further rotation. In such situations, the first ring gear 310 will rotate in an opposite direction when the magnitude of the first intermediate torque diminishes, permitting the tip portion 748 of the follower 724 to align in one of the valleys 712 in the clutch face 316. If rotation of the first ring gear 310 does not cause the clutch force to increase sufficiently so as to fully resist rotation of the first ring gear 310, the first reduction gearset 302 will rotate so as to limit the transmission of torque to the first reduction carrier 314.

Configuration of the clutch mechanism 18 in this manner is highly advantageous in that the clutch torque is sized to resist the first intermediate torque, as opposed to the output torque of the tool 10 that is generated by the multi-reduction transmission assembly 16 and transmitted through the chuck 22. In this regard, the clutch mechanism 18 may be sized in a relatively small manner, thereby improving the ability with which it may be incorporated or packaged into the tool 10. Furthermore, as the speed or gear ratios can be changed after or down stream of the first ring gear 310, the clutch mechanism 18 is operable over a relatively large span of output torques. In comparison with conventional clutch mechanisms that operate to limit the output torque of a transmission, these devices can be typically operable over a relatively narrow torque band, necessitating a change in their clutch spring if a considerable shift in the magnitude of the output torque is desired. In contrast, the clutch mechanism 18 of the present disclosure can accommodate a considerable shift in the magnitude of the output torque of the tool 10 by simply operating the transmission assembly 16 in a different (i.e., lower or higher) gear ratio.

In the operation of rotary power tools such as tool 10, it is frequently desirable to change between two clutch settings, as when the tool 10 is used to both drill a hole and thereafter install a screw in that hole. Accordingly, the adjustment mechanism 704 may be rotated relative to the output spindle assembly 20 to position the adjustment mechanism 704 at a desired one of the adjustment segments 772, 774 and 776 to perform the first operation and thereafter rotated to a second one of the adjustment segments 772, 774 and 776 to perform the second operation. In contrast to the known clutch arrangements, the adjustment mechanism 704 of the present disclosure is configured such that the adjustment structure 760 and the setting collar 762 can be rotatable through an angle of 360°. Assuming the adjustment structure 760 to be positioned at an intermediate adjustment segment 776x, rotation of the adjustment mechanism 704 through an angle of 360° would rotate the adjustment structure 760 past the other intermediate adjustment segments 776, as well as the first and last adjustment segments 772 and 774 and the ramp section 778 such that the adjustment structure 760 would again be positioned at the intermediate adjustment segment 776x. The feature is especially convenient when it is necessary to change the clutch setting between a relatively high clutch setting and a relatively low clutch setting. In this regard, the ramp section 778 permits the setting collar 762 (and adjustment structure 760) to be rotated from highest clutch setting, corresponding to the last adjustment segment, to the lowest clutch setting, corresponding to the first clutch setting, without positioning the clutch mechanism 18 in one of the intermediate clutch settings. Accordingly, the user of the tool 10 is able to vary the clutch setting from its maximum setting to its minimum setting (and vice versa) by rotating the setting collar 762 a relatively small amount.

Figure 31:
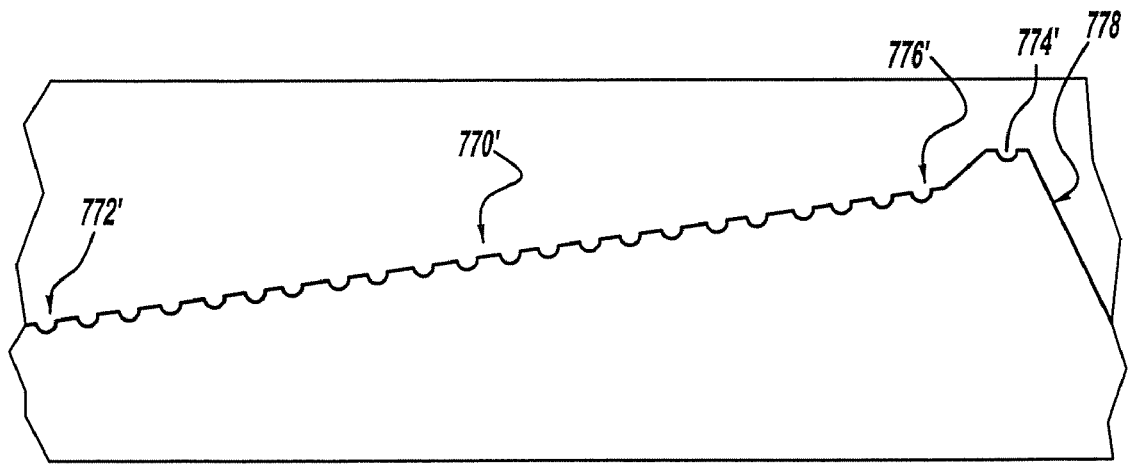
FIG. 31 is a schematic illustration similar to that of FIG. 30 but showing an alternate construction of the adjustment profile.

While the adjustment profile 770 has been described thus far as having a constant slope, those skilled in the art will appreciate that the disclosure, in its broader aspects, may be constructed somewhat differently. For example, the adjustment profile 770' may be formed such that each of the first, last and intermediate adjustment segments 772', 774' and 776' is detented as illustrated in FIG. 31. In this arrangement, the detents 782 in the adjustment structure 760 and the follower 780 in the housing portion 766 of the output spindle assembly 20 can be unnecessary as the adjustment segments 772', 774' and 776' will cooperate with the engagement 702 to provide the user of the tool 10 with a tactile indication of the position of the adjustment profile 770', as well as inhibit the free rotation of the adjustment structure 760.

Figure 32:
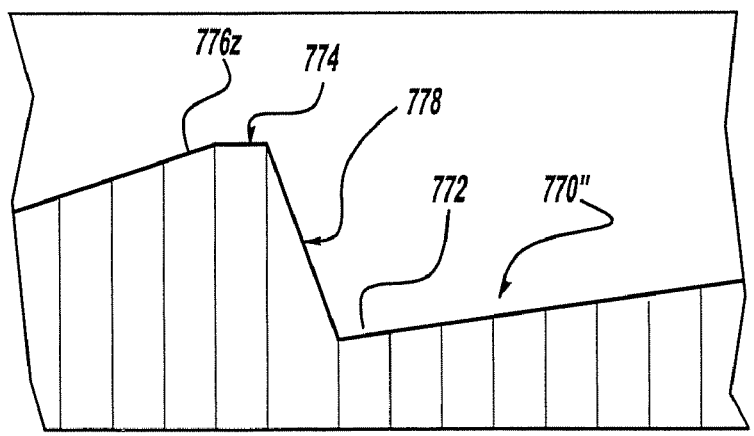
FIG. 32 is a schematic illustration similar to that of FIG. 30 but showing a portion of another alternate construction of the adjustment profile.

Another example is illustrated in FIG. 32 wherein the adjustment profile 770" is generally similar to the adjustment profile 770 except that the ramp section 779 has been omitted so that the last intermediate adjustment segment 776z is immediately adjacent the last adjustment segment 774.

While the transmission assembly 16 has been described thus far as including a three-stage, three speed transmission, those of ordinary skill in the art will appreciate from this disclosure that the disclosure, in its broader aspects, may be constructed somewhat differently. For example, another (i.e., fourth) or different speed ratio may be provided by operating two of the reduction gear sets (e.g., both the second and third reduction gear sets 304 and 306) in the inactive mode. Those of ordinary skill in the art will also appreciate from this disclosure that the second reduction gear set 304 may be placed in the inactive mode by coupling the second ring gear 360 to the second planet carrier 364 (rather than to the first planet carrier 314) and/or that the third reduction gear set 306 may be placed in the inactive mode by coupling the third ring gear 400 to the second planet carrier 364 (rather than to the third planet carrier 404).

Other transmission assemblies constructed in accordance with the teachings of the present disclosure are illustrated in FIGS. 33 through 56. Generally speaking, these configurations are similar to that which is described above and illustrated in detail in FIGS. 23 through 25. Accordingly, similar or corresponding elements of the alternately constructed transmission assemblies are identified by similar reference numerals as were used to describe the transmission assembly 16.

Figure 33:
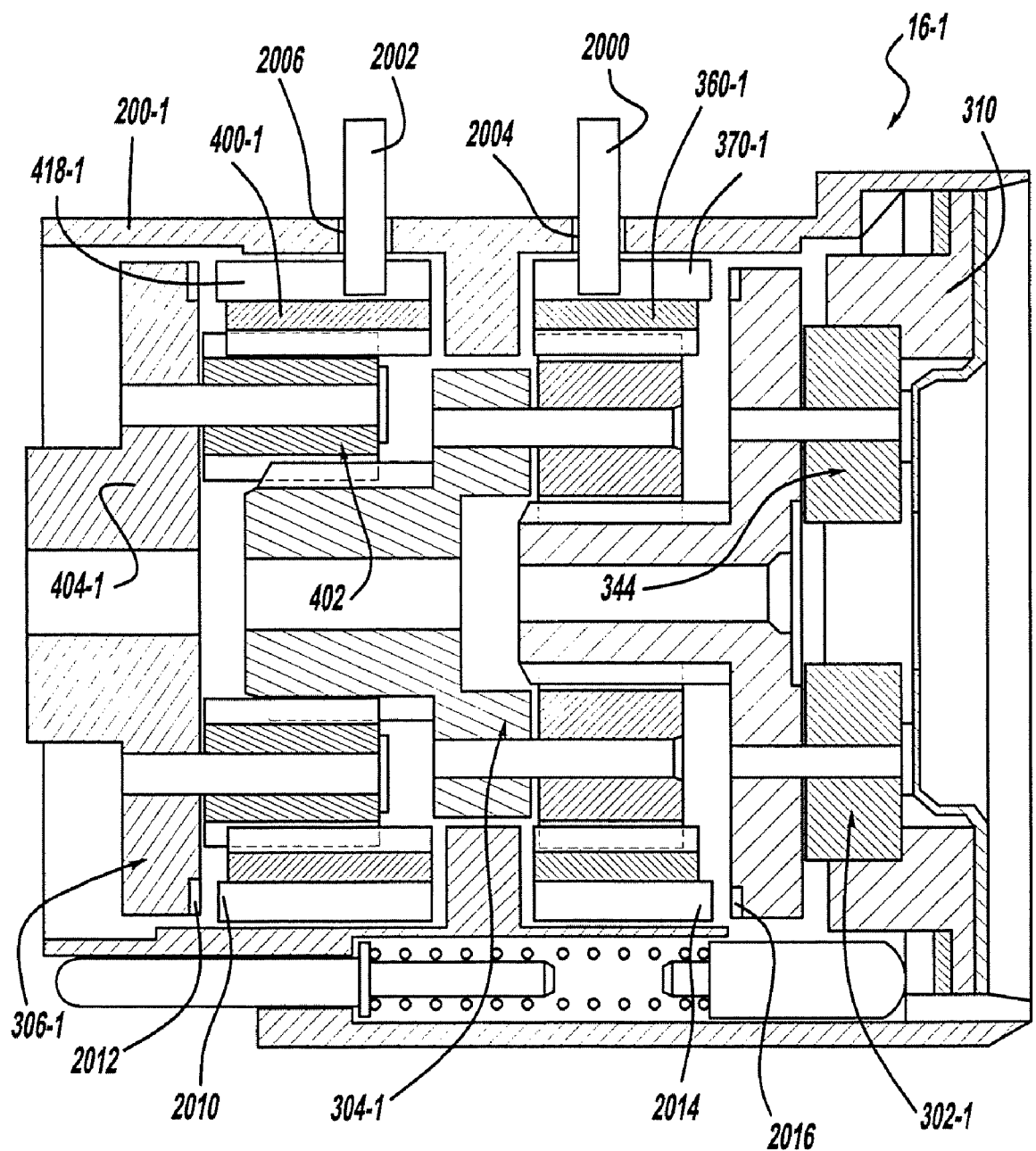
FIGS. 33 through 35 are sectional views similar to FIGS. 23 through 25, respectively, taken along the longitudinal axis of a second transmission constructed in accordance with the teachings of the present disclosure.
Figure 34:
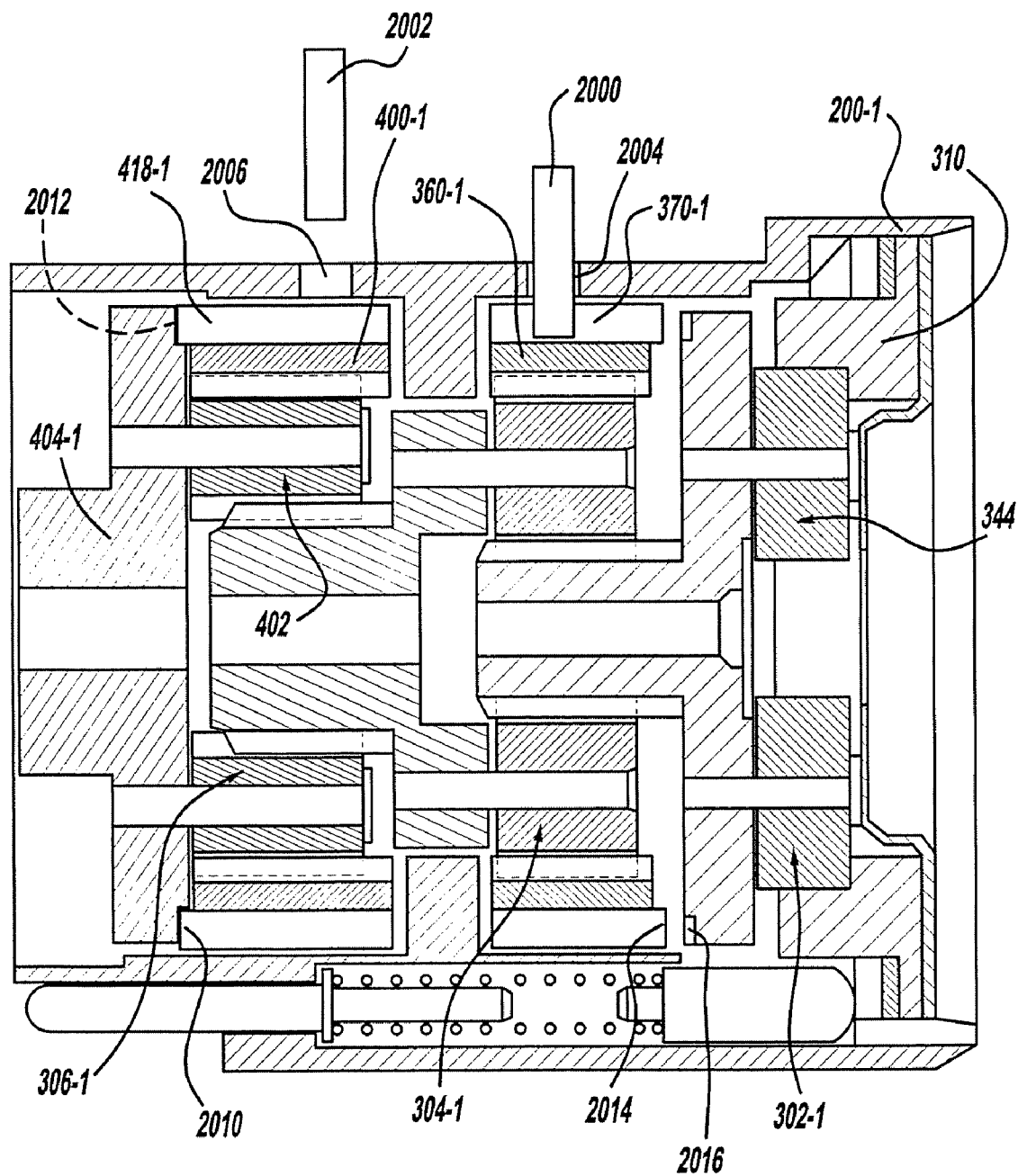
Figure 35:
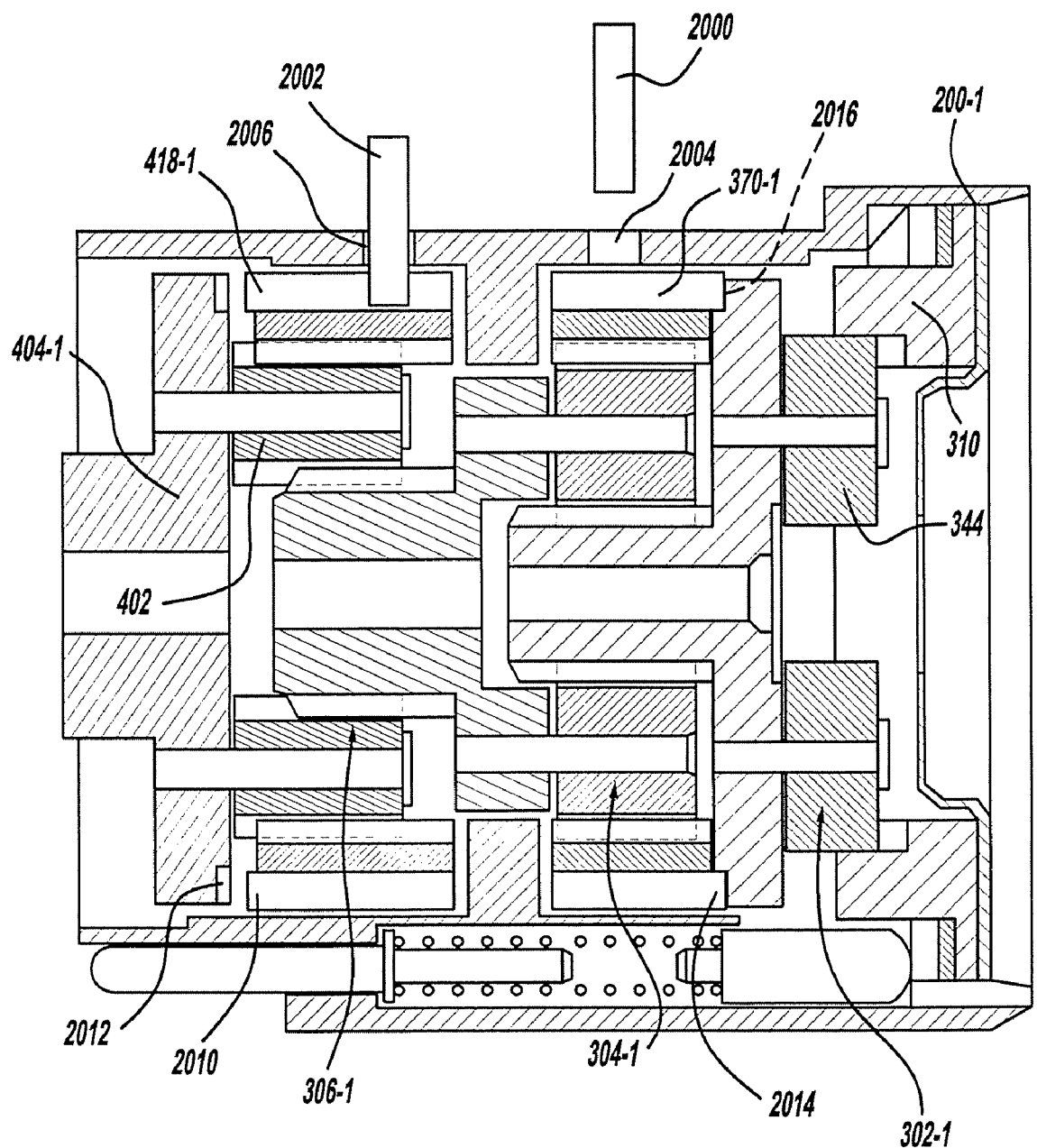

In the example of FIGS. 33 through 35, the transmission assembly 16-1 may include one or more movable elements which may be employed to selectively couple the ring gears 360-1 and 400-1 of the second and third reduction gear sets 304-1 and 306-1, respectively, to the transmission sleeve 200-1. The movable elements, which may be pins 2000 and 2002, may be housed in the transmission sleeve 200-1 and extend through corresponding apertures 2004 and 2006, respectively, in the transmission sleeve 200-1 and may be translated into and out of engagement with a respective one of the ring gears (i.e., ring rears 360-1 and 400-1). In the example provided, each of the ring gears 360-1 and 400-1 can include teeth 370-1 and 418-1, respectively, (similar to teeth 370 and 418, respectively, that are shown in FIG. 23) that are spaced apart by a sufficient distance to receive the pins 2000 and 2002, respectively, therebetween. With the ring gears 360-1 and 400-1 locked to the transmission sleeve 200-1 as shown in FIG. 33, the transmission assembly 16-1 operates in a manner that is similar to that which is described in conjunction with FIG. 23, above.

In FIG. 34, the transmission assembly 16-1 is shown in a second overall speed or gear reduction ratio, wherein the first and second reduction gear sets 302-1 and 304-1 are in an active condition and the third reduction gear set 306-1 is in an inactive condition. The third reduction gear set 306-1 may be inactivated by moving (e.g., translating) the pin 2002 out of engagement with the teeth 418-1 of the ring gear 400-1 and engaging the third planet carrier 404-1 to the third ring gear 400-1. This latter task may be accomplished, for example, by sliding the third planet carrier 404-1 toward and into engagement with the third ring gear 400-1. Any appropriate means may be employed to engage the third planet carrier 404-1 and the third ring gear 400-1 to one another, including friction (i.e., frictional engagement), or features, such as pins or teeth, that may be formed on one or both of the third planet carrier 404-1 and the third ring gear 400-1. In the example provided, teeth 2010, which are formed on the third ring gear 400-1, engage mating teeth 2012 that are formed on the planet carrier 404-1.

In FIG. 35, the transmission assembly 16-1 is shown in a third overall speed or gear reduction ratio, wherein the first and third reduction gear sets 302-1 and 306-1 are in an active condition and the second reduction gear set 304-1 is in an inactive condition. The second reduction gear set 304-1 may be inactivated by moving (e.g., translating) the pin 2000 out of engagement with the teeth 370-1 of the ring gear 360-1 and engaging the first planet carrier 314-1 to the second ring gear 360-1.

This latter task may be accomplished, for example, by sliding the first planet carrier 314-1 toward and into engagement with the second ring gear 360-1. Any appropriate means may be employed to engage the first planet carrier 314-1 and the second ring gear 360-1 to one another, including friction (i.e., frictional engagement), or features, such as pins or teeth, that may be formed on one or both of the first planet carrier 314-1 and the second ring gear 360-1. In the example provided, teeth 2014, which are formed on the second ring gear 360-1, engage mating teeth 2016 that are formed on the first planet carrier 314-1.

Those skilled in the art will appreciate that although the movable elements (e.g., pins 2000 and 2002) have been illustrated as translating in a direction that is generally perpendicular to the longitudinal axis of the transmission assembly 16-1, the disclosure in its broadest aspects, however, may be configured somewhat differently. For example, each of the movable elements may be translated in a direction that is generally parallel to the longitudinal axis of the transmission 16-1 between a first position, which permits the movable element to engage a feature on a respective one of the ring gears, and a second position, which aligns the movable element to an annular groove or a smooth, featureless portion on the respective ring gear so that the movable element does not inhibit the rotation of the respective ring gear.

Figure 36:
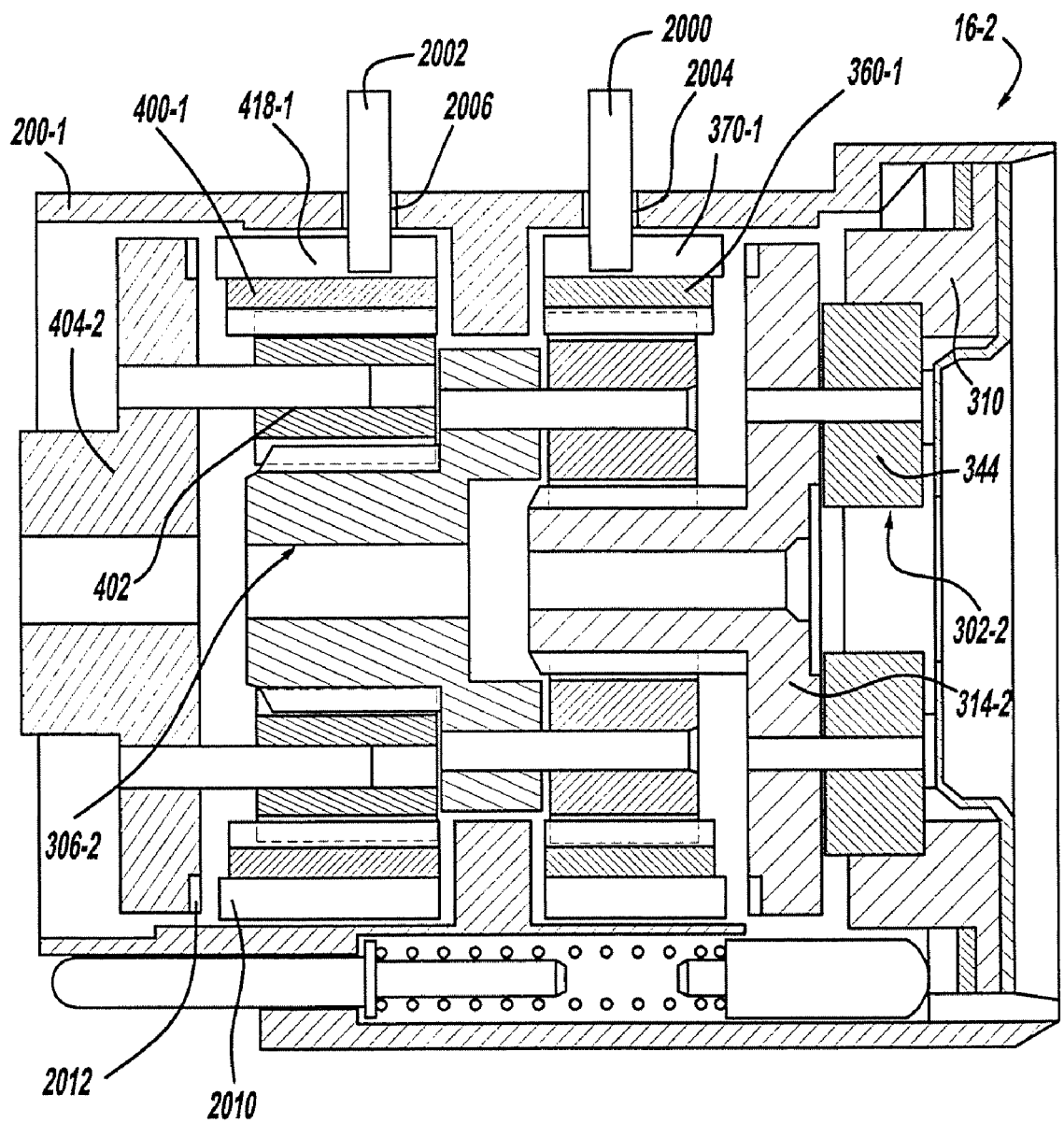
FIGS. 36 through 38 are sectional views similar to FIGS. 23 through 25, respectively, taken along the longitudinal axis of a third transmission constructed in accordance with the teachings of the present disclosure.
Figure 37:
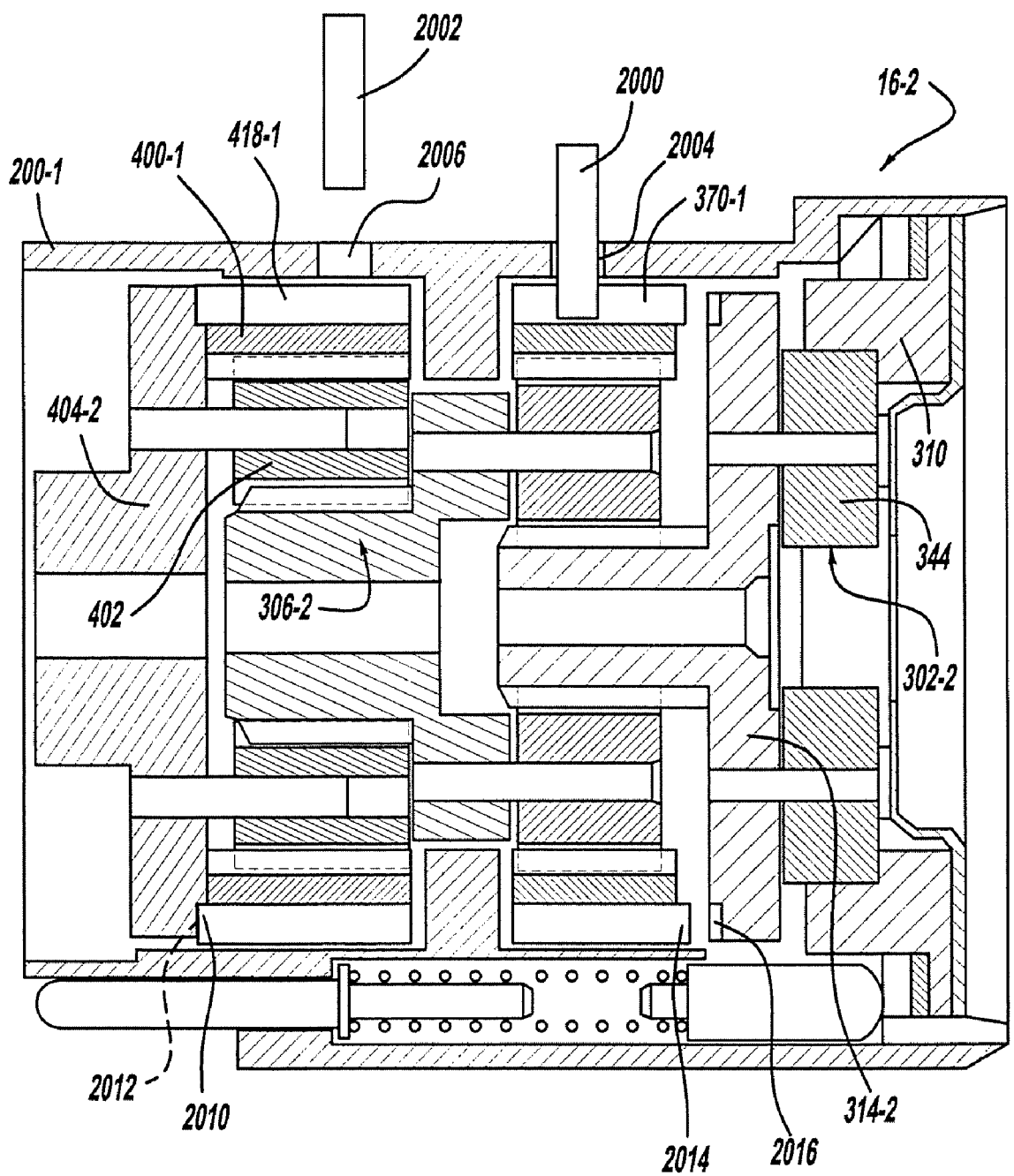
Figure 38:
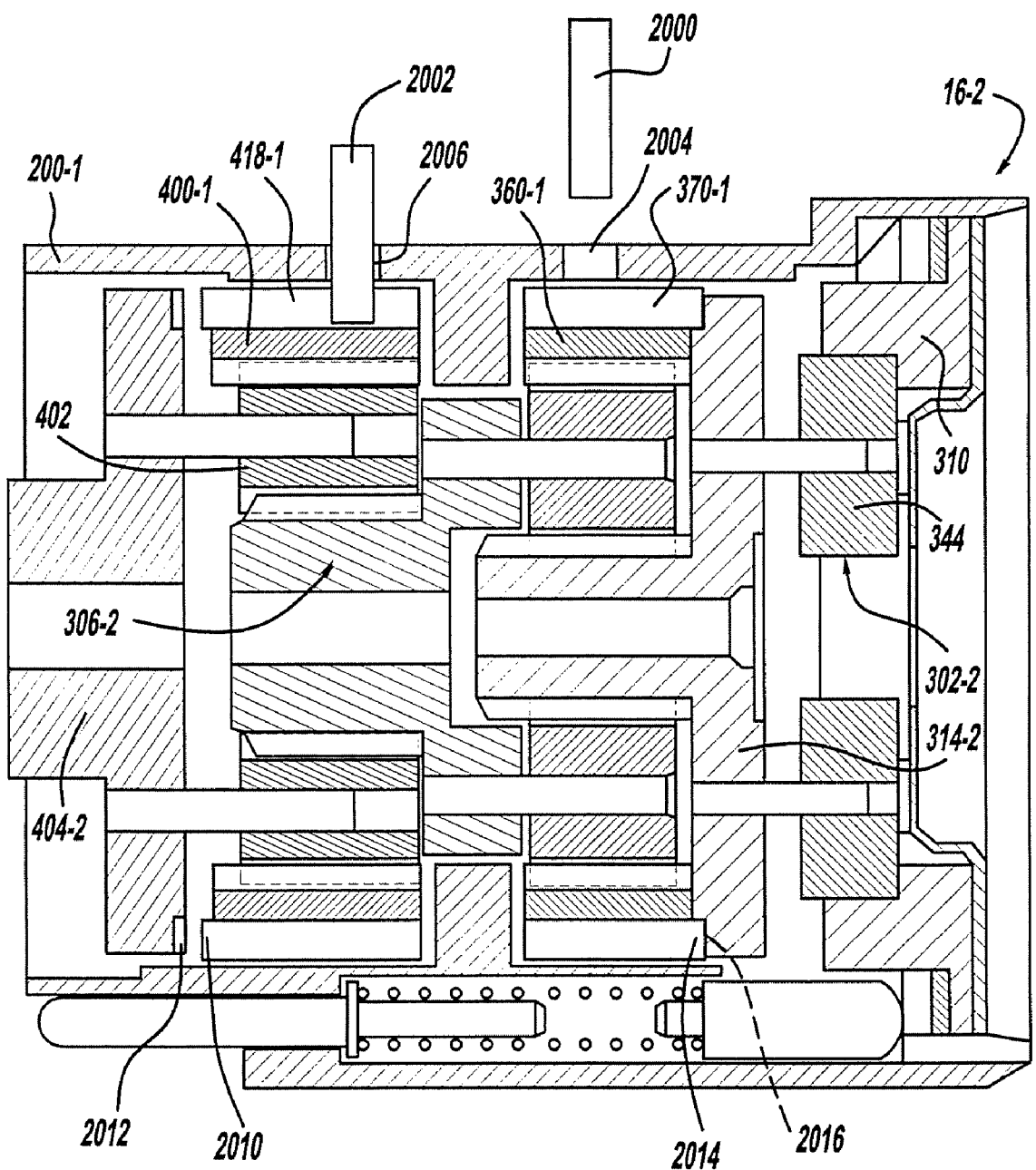

The transmission assembly 16-2 of FIGS. 36 through 38 is generally similar to the embodiment of FIGS. 33 through 35, except that the first set of planet gears 344 of the first reduction gear set 302-2 and the third set of planet gears 402 of the third reduction gear set 306-2 remain in a fixed position relative to the first and third ring gears 310 and 400-1, respectively, regardless of the position of the first and third planet carriers 314-2 and 404-2, respectively. In contrast, the first set of planet gears 344 and the third set of planet gears 402 slide with the first and third planet carriers 314-1 and 404-1, respectively, in the embodiment of FIGS. 33 through 35.

Figure 39:
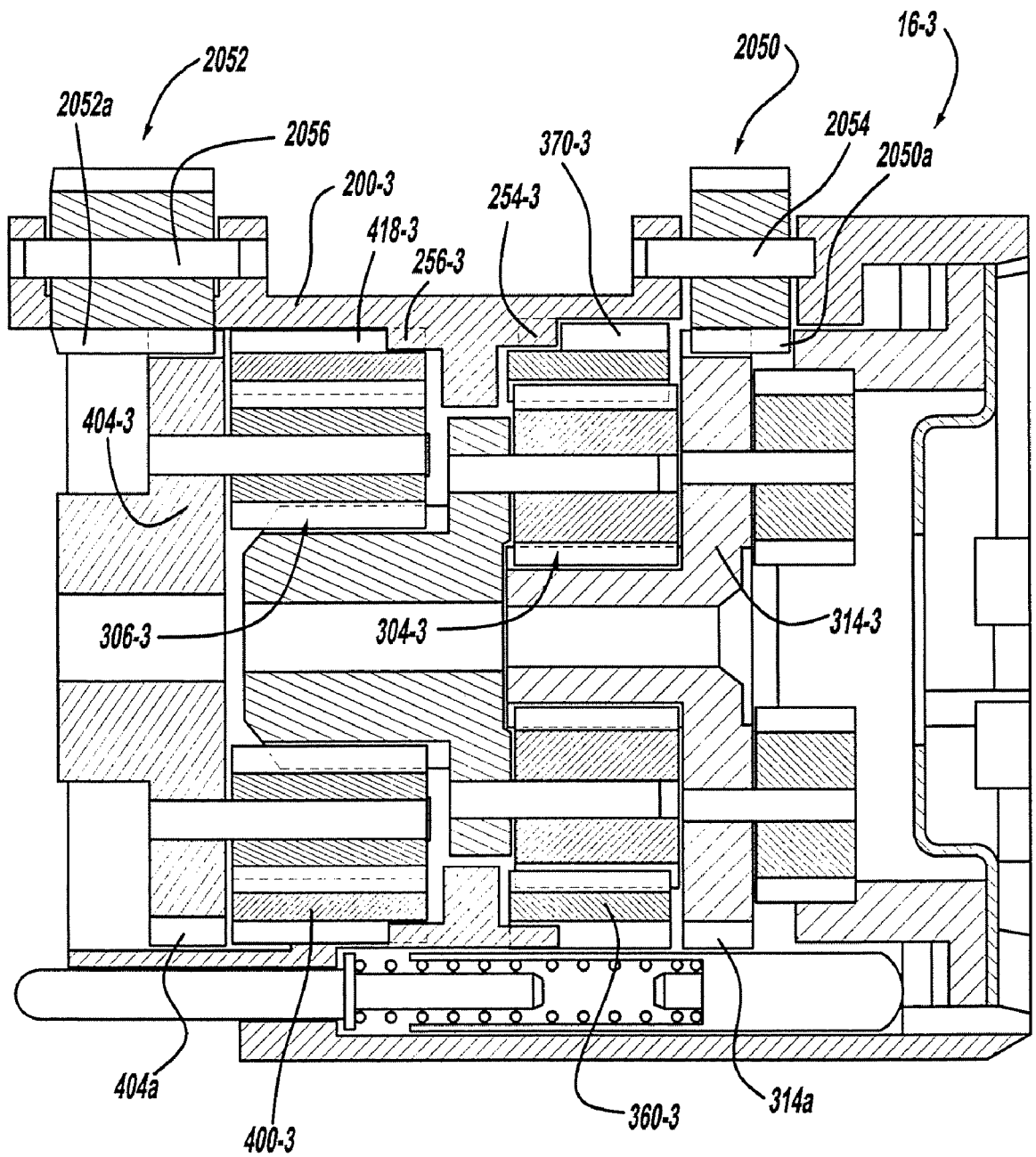
FIGS. 39 through 41 are sectional views similar to FIGS. 23 through 25, respectively, taken along the longitudinal axis of a fourth transmission constructed in accordance with the teachings of the present disclosure.
Figure 40:
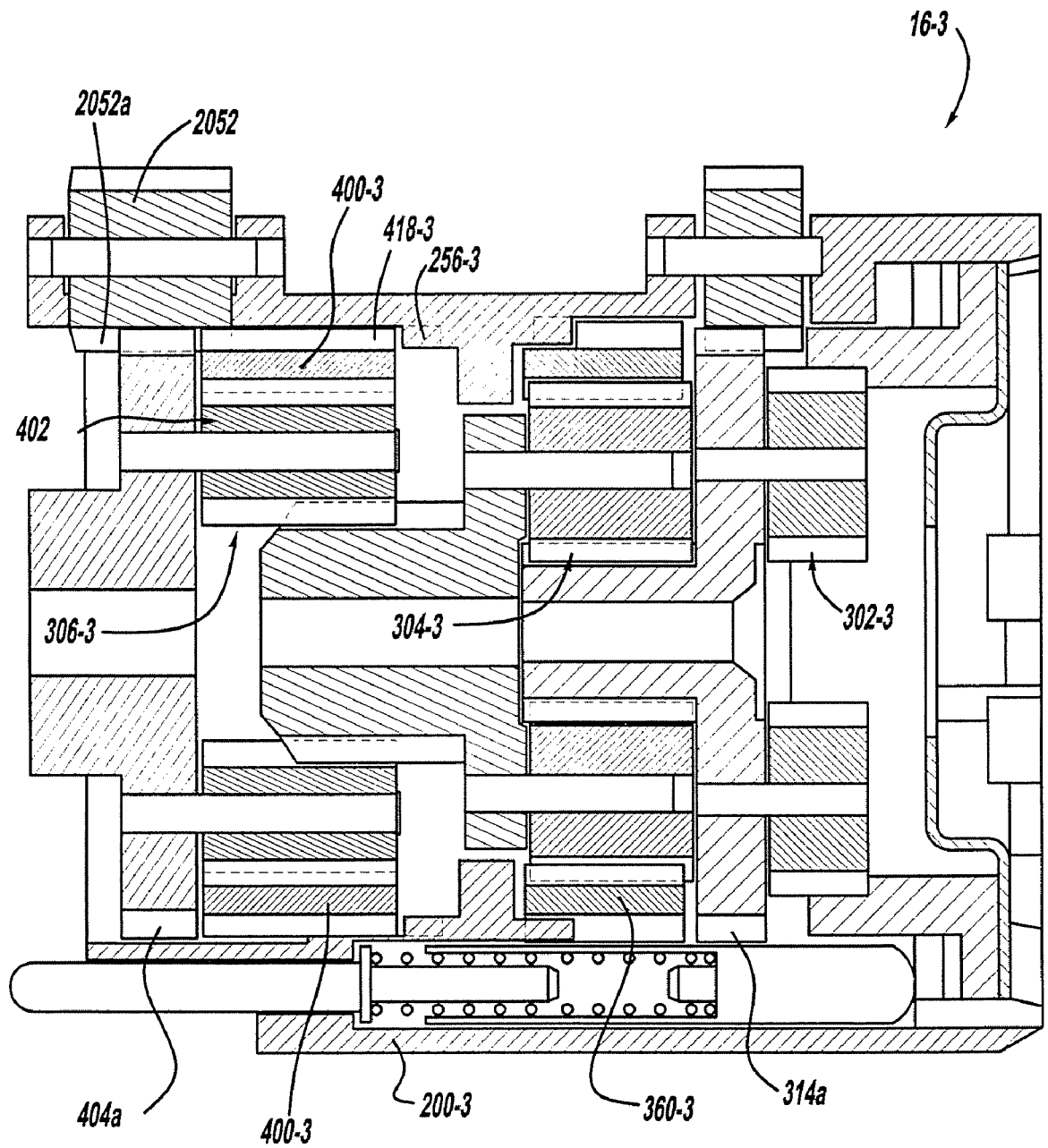
Figure 41:
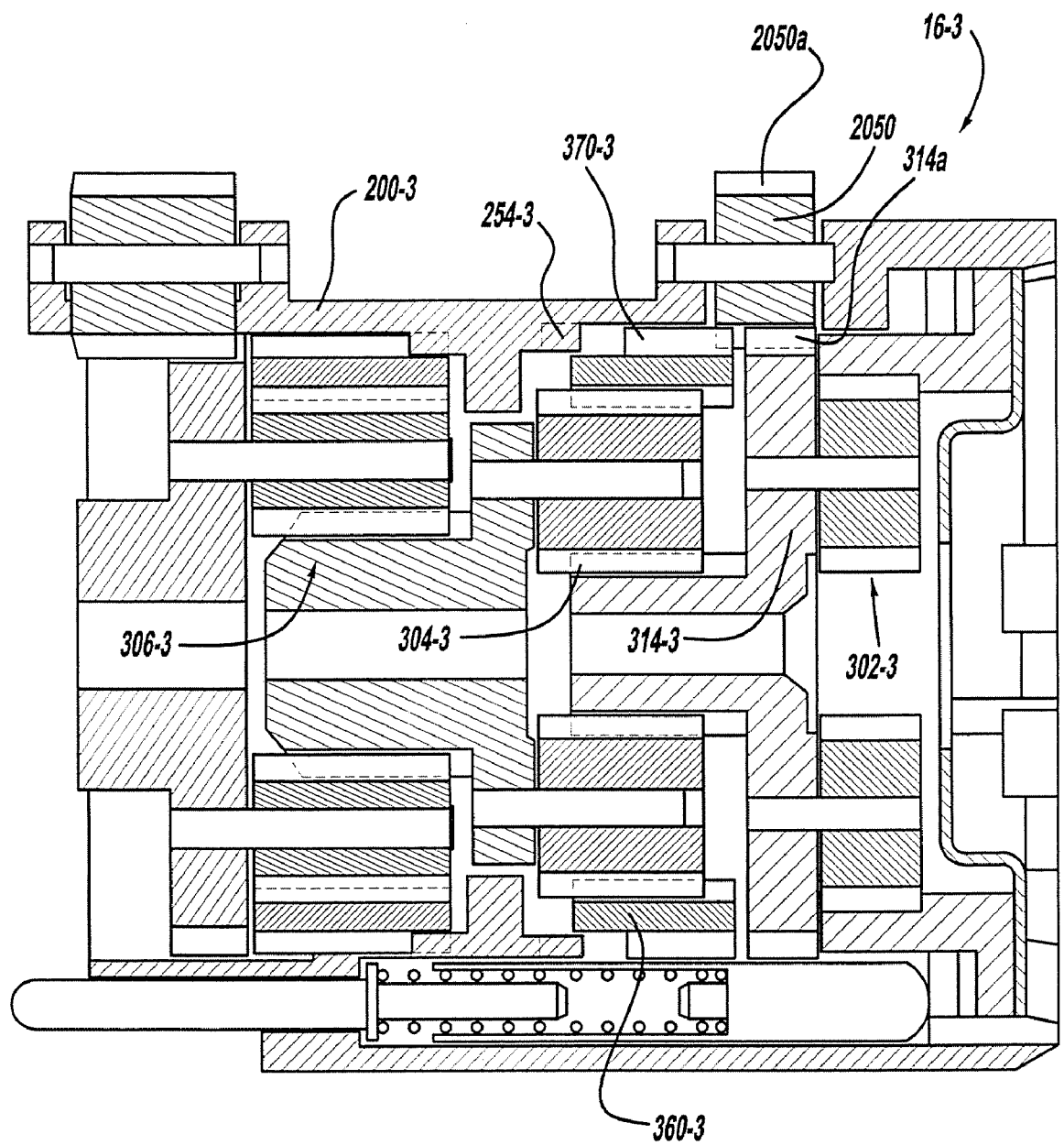

With reference to FIGS. 39 through 41, the transmission assembly 16-3 may include one or more locking elements that may be selectively employed to lock the second and third ring gears 360-3 and 400-3 to the first and third planet carriers 314-3 and 404-3, respectively. The locking elements may include, for example first and second idler gears 2050 and 2052, for example, that may have teeth 2050a and 2052a, respectively, that may be meshingly engaged to teeth 314a and 404a, respectively, that are formed on the first and third planet carriers 314-3 and 404-3, respectively. The locking elements 2050 and 2052 may be rotatably supported on pins 2054 and 2056, respectively, that may be mounted to another portion of the power tool, such as the transmission sleeve 200-3. In a first speed reduction ratio, which is illustrated in FIG. 39, the second and third ring gears 360-3 and 400-3 are fixed to the transmission sleeve 200-3, for example by teeth 370-3 and 418-3, respectively, on the outer diameter of the ring gears 360-3 and 400-3, respectively, and mating teeth 254-3 and 256-3, respectively, that are formed on the interior of the transmission sleeve 200-3.

In FIG. 40, the transmission assembly 16-3 is shown in a second overall speed or gear reduction ratio, wherein the first and second reduction gear sets 302-3 and 304-3 are in an active condition and the third reduction gear set 306-3 is in an inactive condition. The third reduction gear set 306-3 may be inactivated by translating the third ring gear 400-3 such that the teeth 418-3 are not engaged with the mating teeth 256-3 on the transmission sleeve 200-3 but rather with the teeth 2052a of the second idler gear 2052. Translation of the third ring gear 400-3 may also cause the third planet carrier 404-3 to slide on the second idler gear 2052 and/or the third set of planet gears 402 to slide relative to the transmission sleeve 200-3.

In FIG. 41, the transmission assembly 16-3 is shown in a third overall speed or gear reduction ratio, wherein the first and third reduction gear sets 302-3 and 306-3 are in an active condition and the second reduction gear set 304-3 is in an inactive condition. The second reduction gear set 304-3 may be inactivated by translating the second ring gear 360-3 such that the teeth 370-3 are not engaged with the mating teeth 254-3 on the transmission sleeve 200-3 but rather with the teeth 2050a of the first idler gear 2050. Translation of the second ring gear 360-3 may also cause the first planet carrier 314-3 to slide on the first idler gear 2050 and/or the first set of planet gears 344 to slide relative to the transmission sleeve 200-3.

Figure 42:
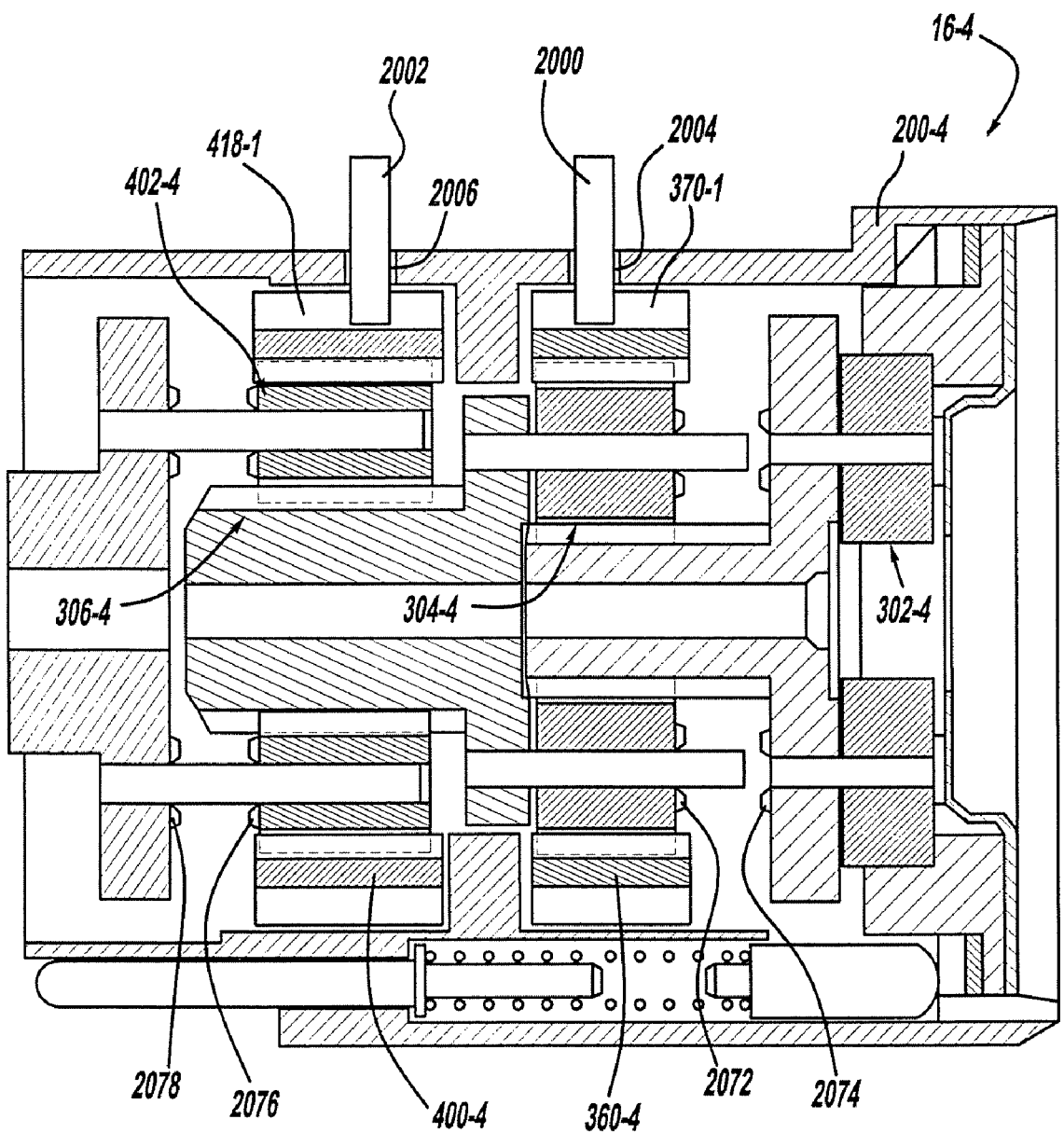
FIGS. 42 through 44 are sectional views similar to FIGS. 23 through 25, respectively, taken along the longitudinal axis of a fifth transmission constructed in accordance with the teachings of the present disclosure.
Figure 43:
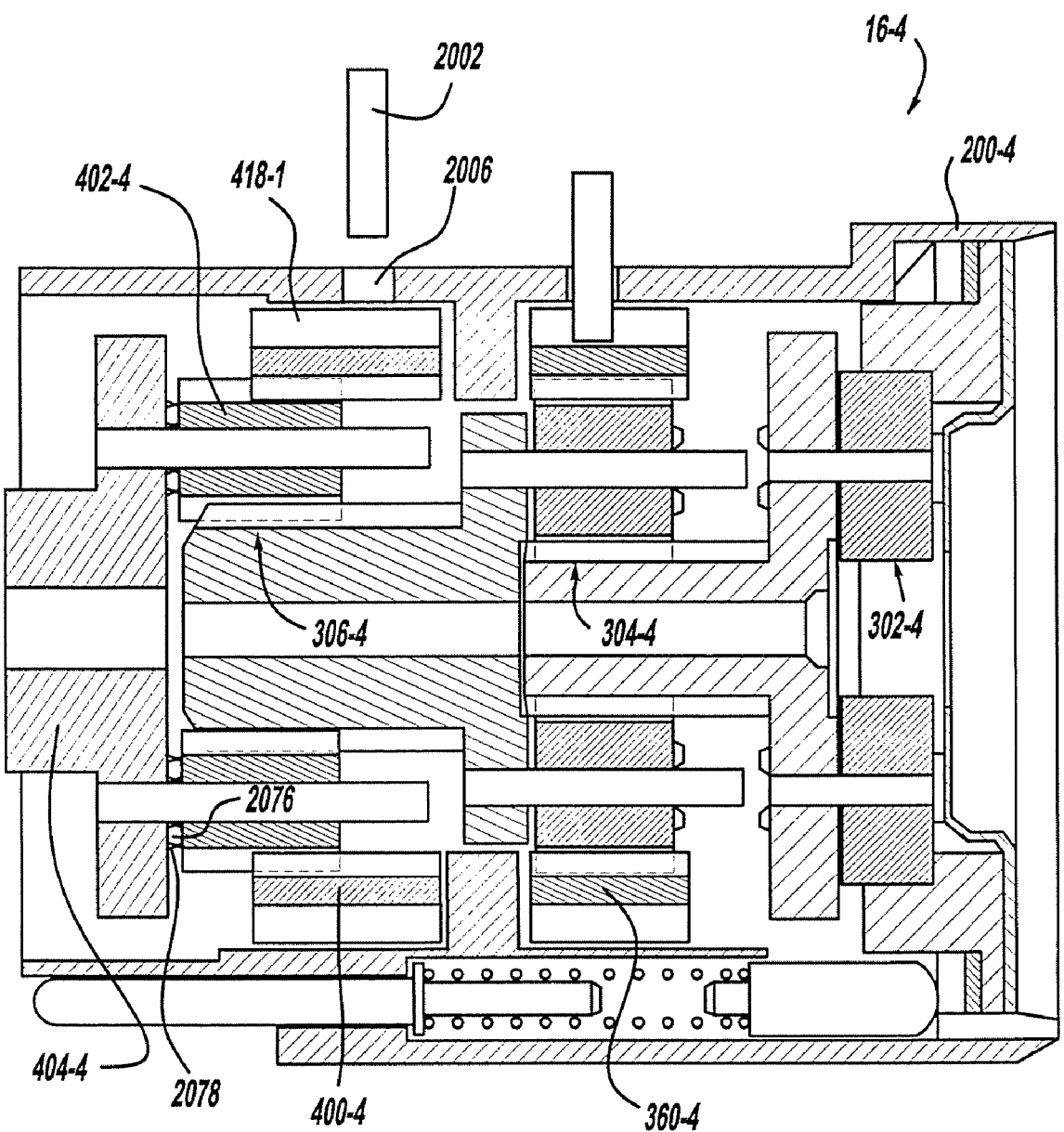
Figure 44:
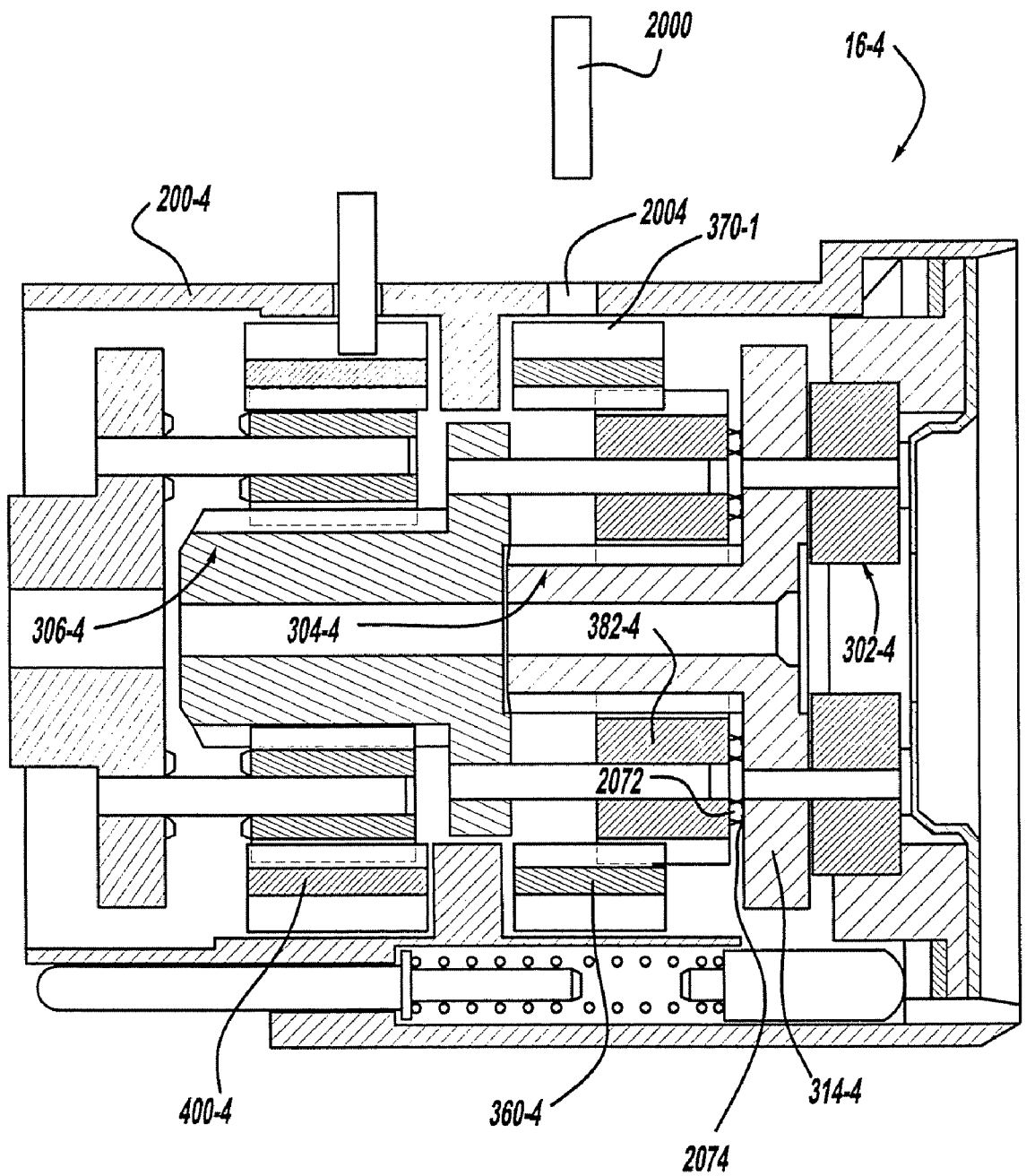

With reference to FIGS. 42 through 44, the transmission assembly 16-4 may be configured such that portions of the second reduction gear set 304-4 and the third reduction gear set 306-4 may slide into and out of locking engagement with another element of the transmission assembly 16-4. In the example provided, the second and third sets of planet gears 382-4 and 402-4, respectively, may be translated between a first position, in which they meshingly engage an associated ring gear, and a second position, in which they non-rotatably engage an associated planet carrier as well as meshingly engage the associated ring gear. In a first speed reduction ratio, which is illustrated in FIG. 42, the second and third ring gears 360-4 and 400-4 are fixed to the transmission sleeve 200-4, in a manner that is similar to that which was described above in conjunction with FIG. 33.

In FIG. 43, the transmission assembly 16-4 is shown in a second overall speed or gear reduction ratio, wherein the first and second reduction gear sets 302-4 and 304-4 are in an active condition and the third reduction gear set 306-4 is in an inactive condition. The third reduction gear set 306-4 may be inactivated by translating the pin 2002 out of engagement with the teeth 418-1 on the third ring gear 400-4 and translating the third set of planet gears 402-4 into engagement with the third planet carrier 404-4 such that the third set of planet gears 402-4 are maintained in a stationary condition relative to the third planet carrier 404-4. Engagement of the third set of planet gears 402-4 to the third planet carrier 404-4 may be made in any desired manner, such as frictional engagement or through mating features. In the example provided, teeth 2076 are formed into an axial end face of the third set of planet gears 402-4 and mating teeth 2078 are formed on the third planet carrier 404-4 which meshingly engage the teeth 2076 on the third set of planet gears 402-4. The third ring gear 400-4 may optionally translate with the third set of planet gears 402-4.

In FIG. 44, the transmission assembly 16-4 is shown in a third overall speed or gear reduction ratio, wherein the first and third reduction gear sets 302-4 and 306-4 are in an active condition and the second reduction gear set 304-4 is in an inactive condition. The second gear set 304-4 may be inactivated by translating the pin 2000 out of engagement with the teeth 370-1 of the second ring gear 360-4 and translating the second set of planet gears 382-4 into engagement with the first planet carrier 314-4 such that the second set of planet gears 382-4 are maintained in a stationary condition relative to the first planet carrier 314-4. Engagement of the second set of planet gears 382-4 to the first planet carrier 314-4 may be made in any desired manner, such as frictional engagement or through mating features. In the example provided, teeth 2072 are formed into an axial end face of the second set of planet gears 382-4 and mating teeth 2074 are formed on the first planet carrier 314-4 which meshingly engage the teeth 2072 on the second set of planet gears 382-4. The second ring gear 360-4 may optionally translate with the second set of planet gears 382-4.

Figure 45:
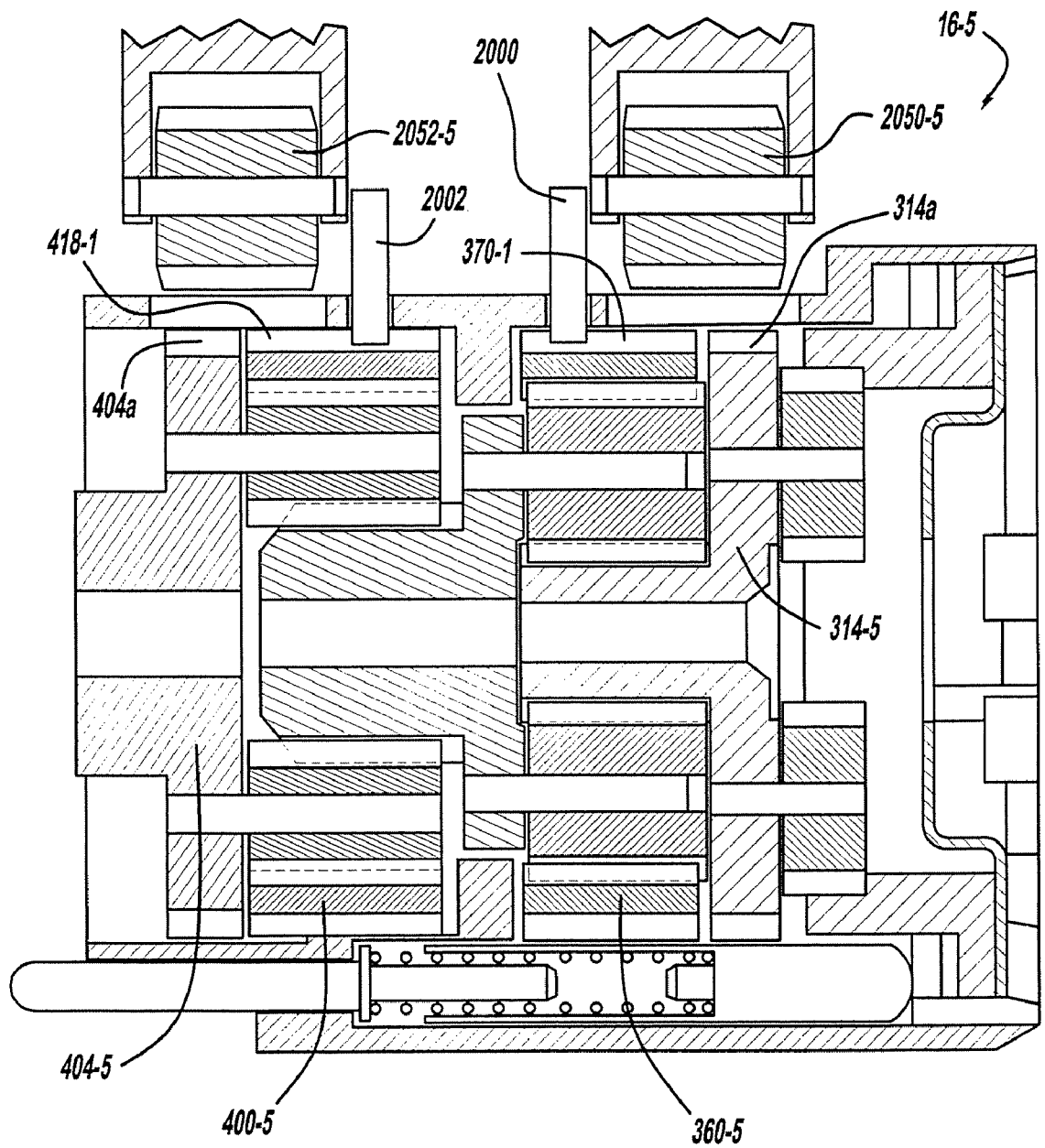
FIGS. 45 through 47 are sectional views similar to FIGS. 23 through 25, respectively, taken along the longitudinal axis of a sixth transmission constructed in accordance with the teachings of the present disclosure.
Figure 46:
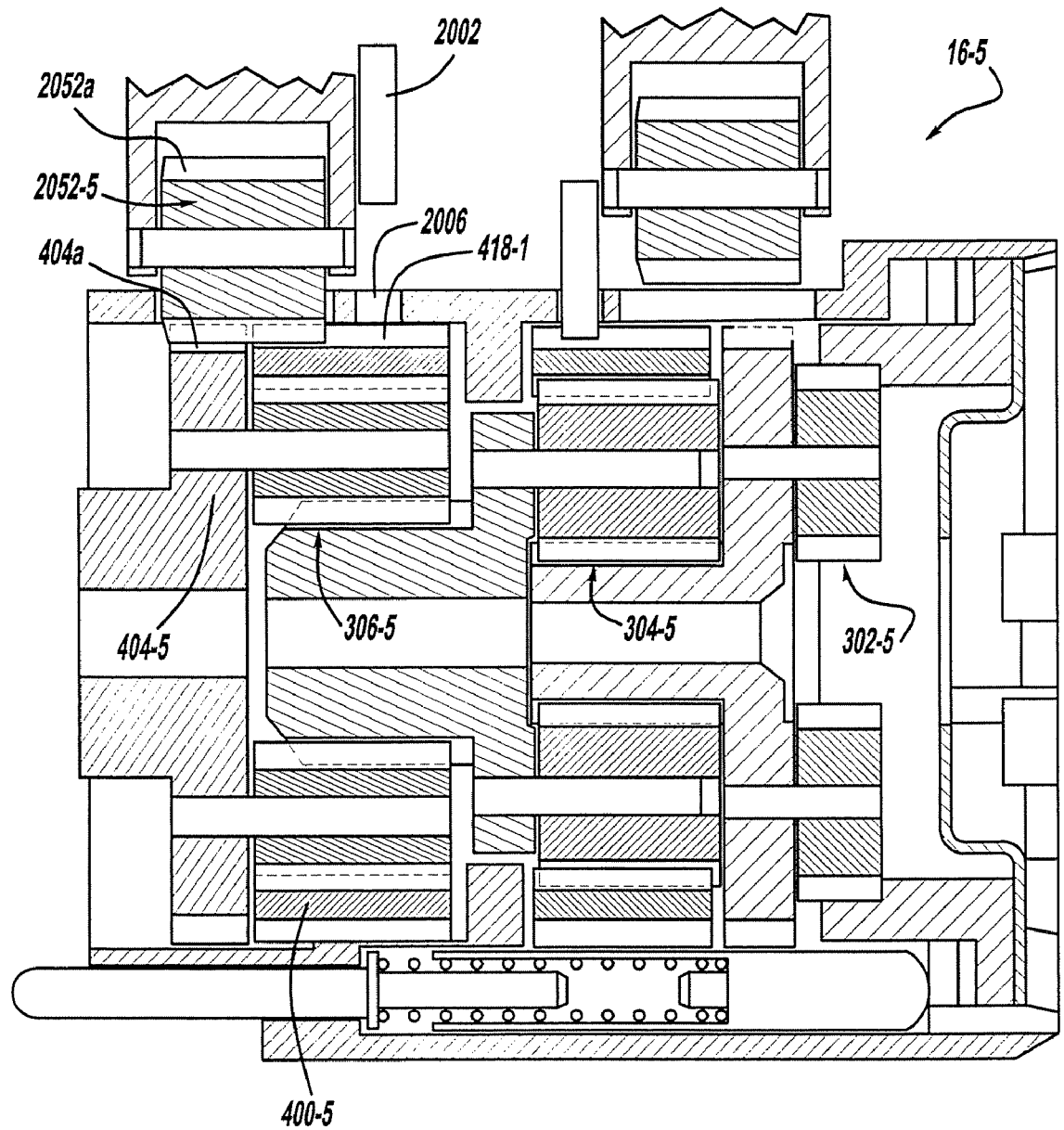
Figure 47:
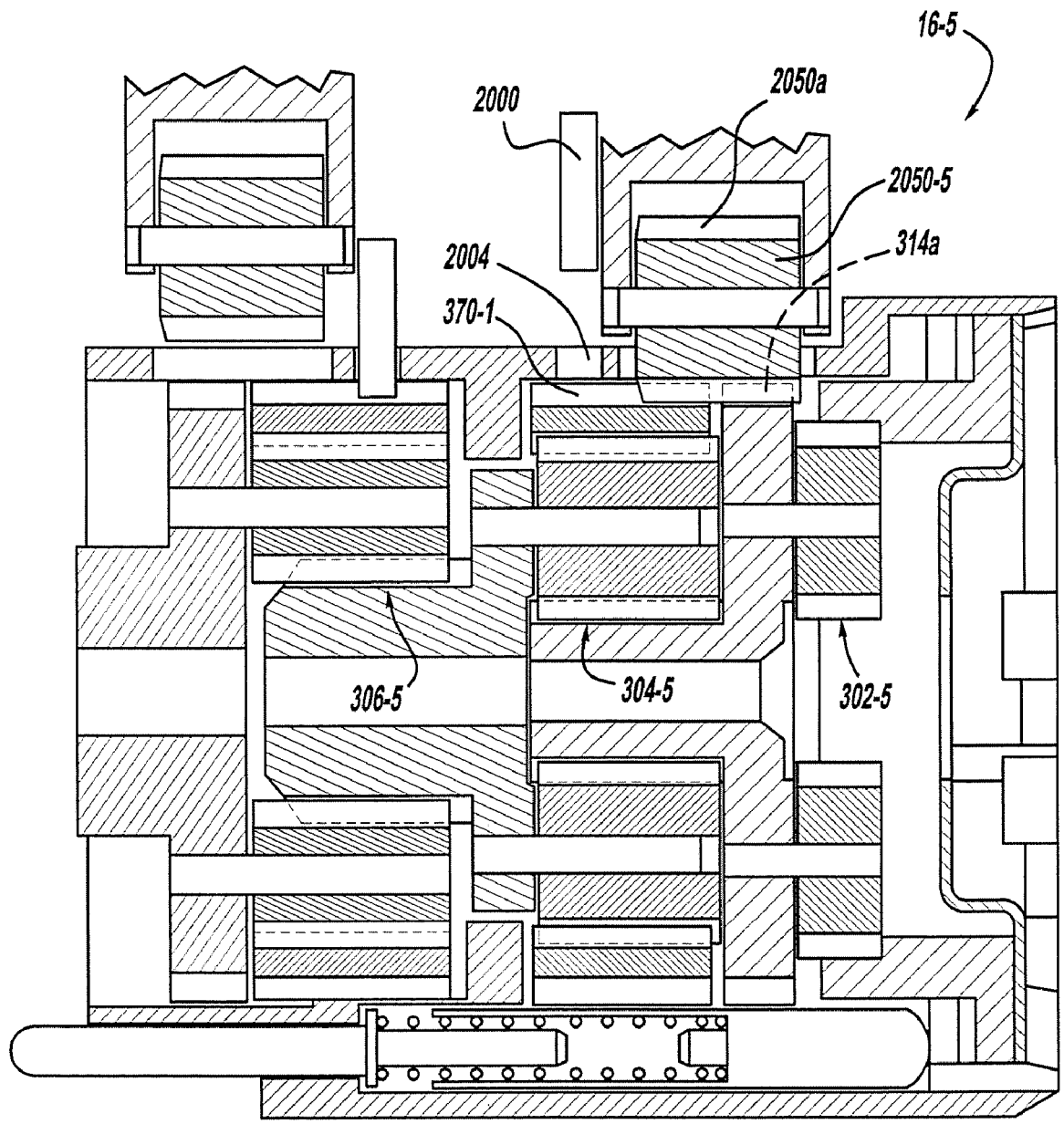

In FIGS. 45 through 47 yet another transmission assembly 16-5 constructed in accordance with the teachings of the present disclosure is illustrated. The transmission assembly 16-5 may include movable elements, such as pins 2000 and 2002, which may be employed to lock the second and third ring gears 360-5 and 400-5, respectively, in a stationary position, and locking elements, such as first and second idler gears 2050-5 and 2052-5, respectively, that may be employed to lock each of the second and third ring gears 360-5 and 400-5, respectively, to the first and third planet carriers 314-5 and 404-5, respectively. With specific reference to FIG. 45, the transmission 16-5 is illustrated in a first overall speed reduction or gear ratio wherein the pins 2050-5 and 2052-5 may be positioned in engagement with teeth 370-1 and 418-1, respectively, on the second and third ring gears 360-5 and 400-5, respectively, to maintain the second and third ring gears 360-5 and 400-5 in a stationary position. In this condition, the first and second idler gears 2050-5 and 2052-5 may be disengaged from the teeth 370-1 and 418-1 of the second and third ring gears 360-5 and 400-5, respectively, as well as from the teeth 314a and 404a of the first and third planet carriers 314-5 and 404-5.

In FIG. 46, the transmission assembly 16-5 is illustrated in a second overall speed reduction or gear ratio wherein the first and second reduction gear sets 302-5 and 304-5, respectively, are in an active condition and the third reduction gear set 306-5 is in an inactive condition. The third reduction gear set 306-5 may be inactivated by translating the pin 2002 out of engagement with the teeth 418-1 of the third ring gear 400-5 and moving the idler gear 2052-5, e.g., by translation and/or rotation, into a position where the teeth 2052a of the idler gear 2052-5 meshingly engage both the teeth 418-1 of the third ring gear 400-5 and the teeth 404a of the third planet carrier 404-5.

In FIG. 47, the transmission assembly 16-5 is illustrated in a third overall speed reduction or gear ratio wherein the first and third reduction gear sets 302-5 and 306-5 are in an active condition and the second reduction gear set 304-5 is in an inactive condition. The second reduction gear set 304-5 may be inactivated by translating the pin 2000 out of engagement with the teeth 370-1 of the second ring gear 360-5 and moving the idler gear 2050-5, e.g., by translation and/or rotation, into a position where the teeth 2050a of the idler gear 2050-5 meshingly engage both the teeth 370-1 of the second ring gear 360-5 and the teeth 314a of the first planet carrier 314-5.

Figure 48:
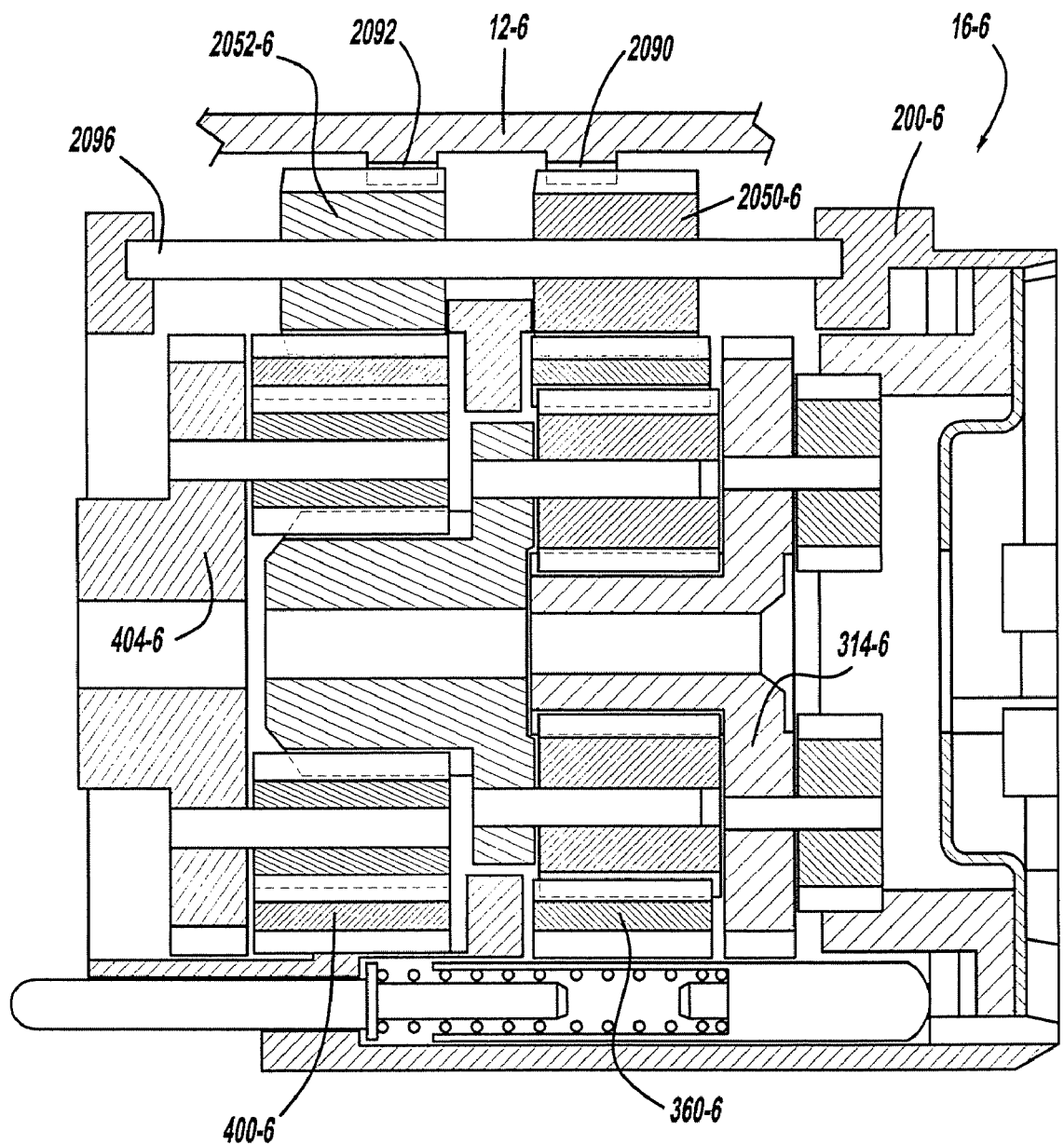
FIGS. 48 through 50 are sectional views similar to FIGS. 23 through 25, respectively, taken along the longitudinal axis of a seventh transmission constructed in accordance with the teachings of the present disclosure.
Figure 49:
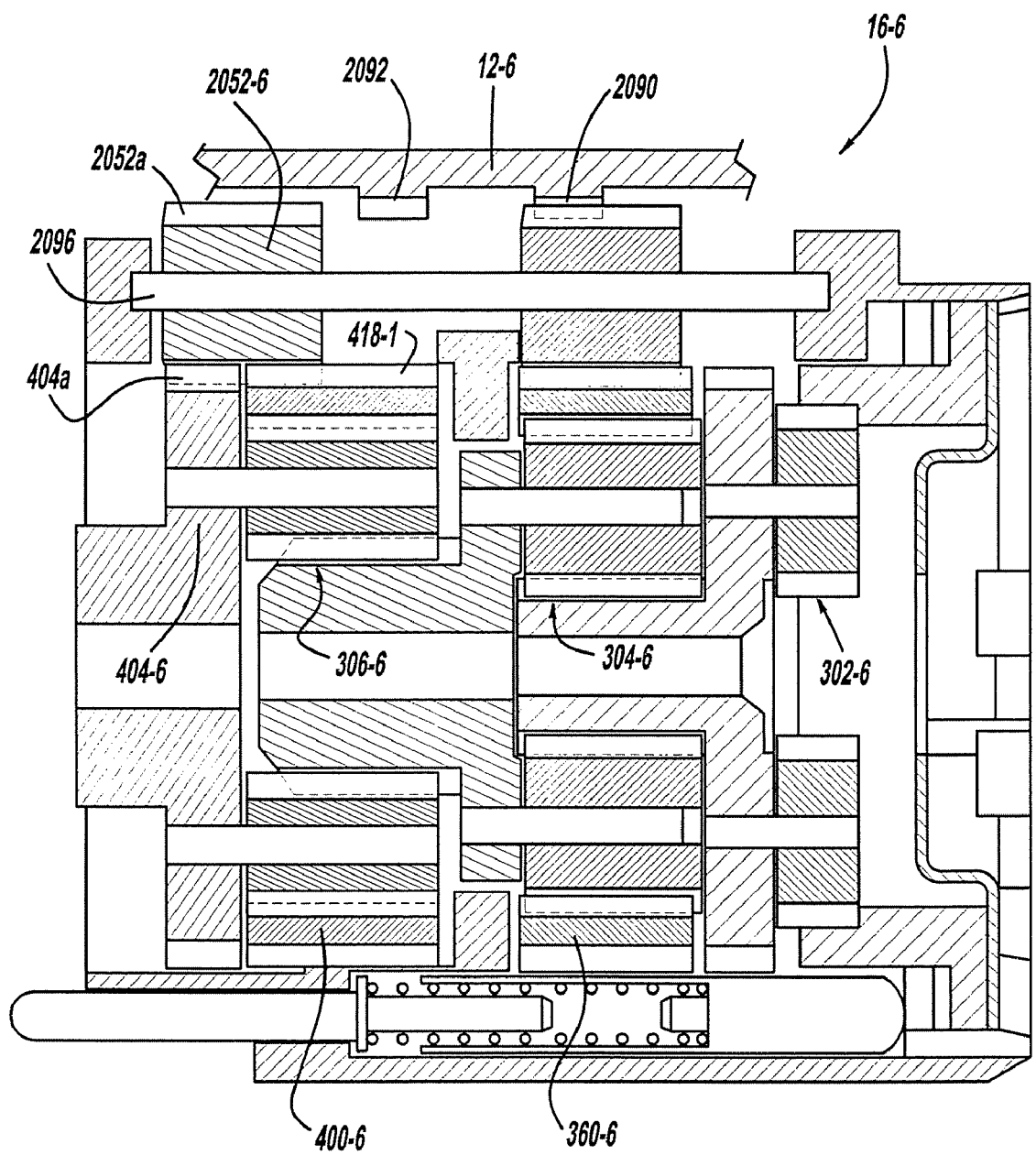
Figure 50:
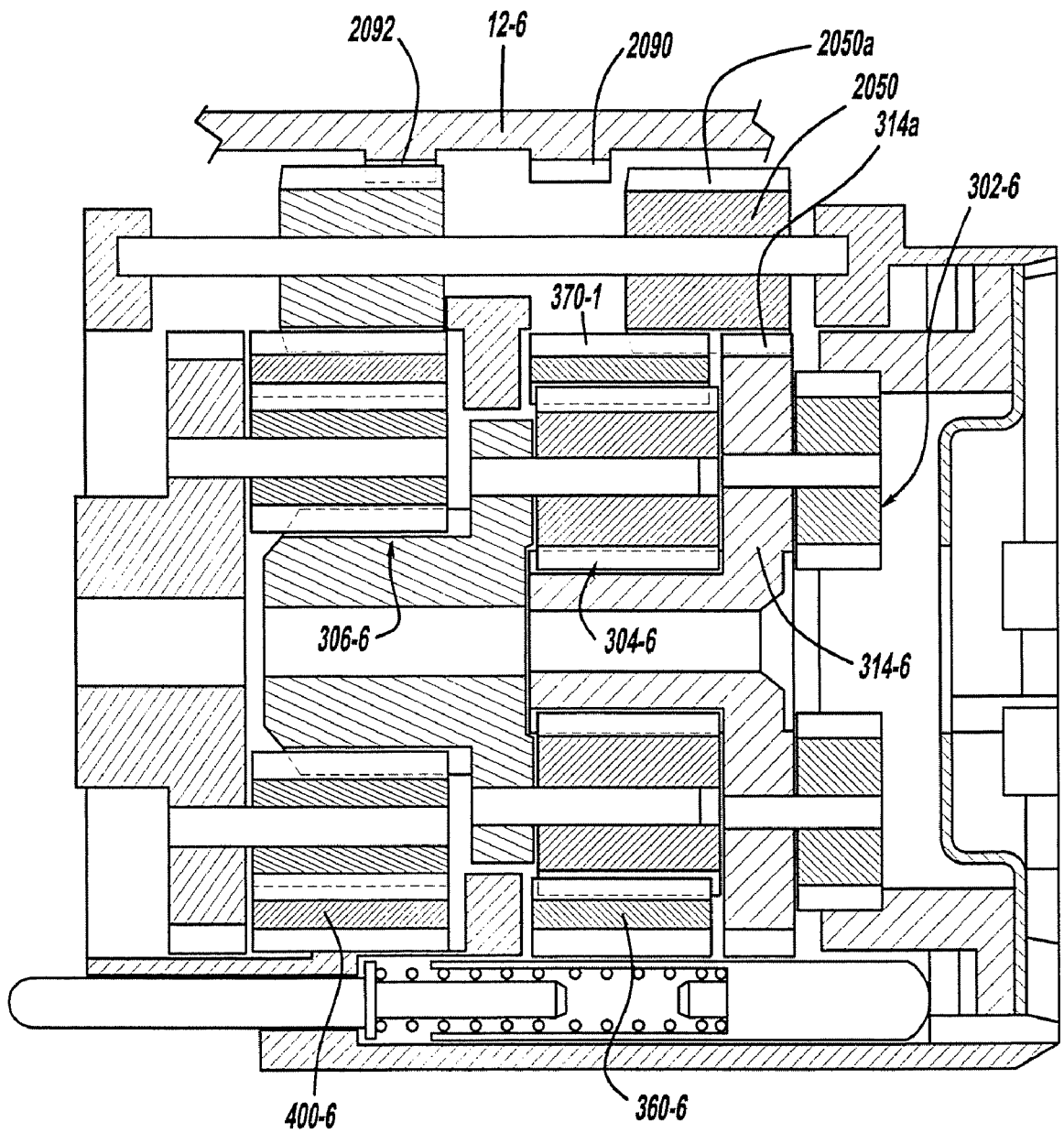

In FIGS. 48 through 50 yet another transmission assembly 16-6 constructed in accordance with the teachings of the present disclosure is illustrated. The transmission assembly 16-6 may include movable elements, such as idler gears 2050-6 and 2052-6 which may be employed to lock the ring gears 360-6 and 400-6, respectively, into a stationary position relative to the transmission sleeve 200-6 or to lock the second and third ring gears 360-6 and 400-6 for rotation with the first and third planet carriers 314-6 and 404-6, respectively. With specific reference to FIG. 48, the transmission assembly 16-6 is illustrated in a first overall speed reduction or gear ratio wherein the idler gears 2050-6 and 2052-6 are positioned to maintain the second and third ring gears 360-6 and 400-6 in a stationary position. The idler gears 2050-6 and 2052-6 may engage a feature, such as teeth 2090 and 2092, respectively, that is formed on another part of the power tool, such as the housing 12-6 or the transmission sleeve 200-6, which inhibits their rotation and thereby locks a respective one of the ring gears in a stationary position.

In FIG. 49, the transmission assembly 16-6 is illustrated in a second overall speed reduction or gear ratio wherein the first and second reduction gear sets 302-6 and 304-6 are in an active condition and the third reduction gear set 306-6 is in an inactive condition. The third reduction gear set 306-6 may be inactivated by translating the idler gear 2052-6, e.g., along the journal pin 2096, into a position where the teeth 2052a of the idler gear 2052-6 do not engage the tooth or teeth 2092 but engage both the teeth 418-1 of the third ring gear 400-6 and the teeth 404a of the third planet carrier 404-6.

In FIG. 50, the transmission assembly 16-6 is illustrated in a third overall speed reduction or gear ratio, wherein the first and third reduction gear sets 302-6 and 306-6 are in an active condition, and the second reduction gear set 304-6 is in an inactive condition. The second reduction gear set 304-6 may be inactivated by translating the idler gear 2050, e.g., along the journal pin 2096, into a position where the teeth 2050a of the idler gear 2050-6 do not engage the tooth or teeth 2090 but engage both the teeth 370-1 of the second ring gear 360-6 and the teeth 314a of the first planet carrier 314-6.

Figure 51:
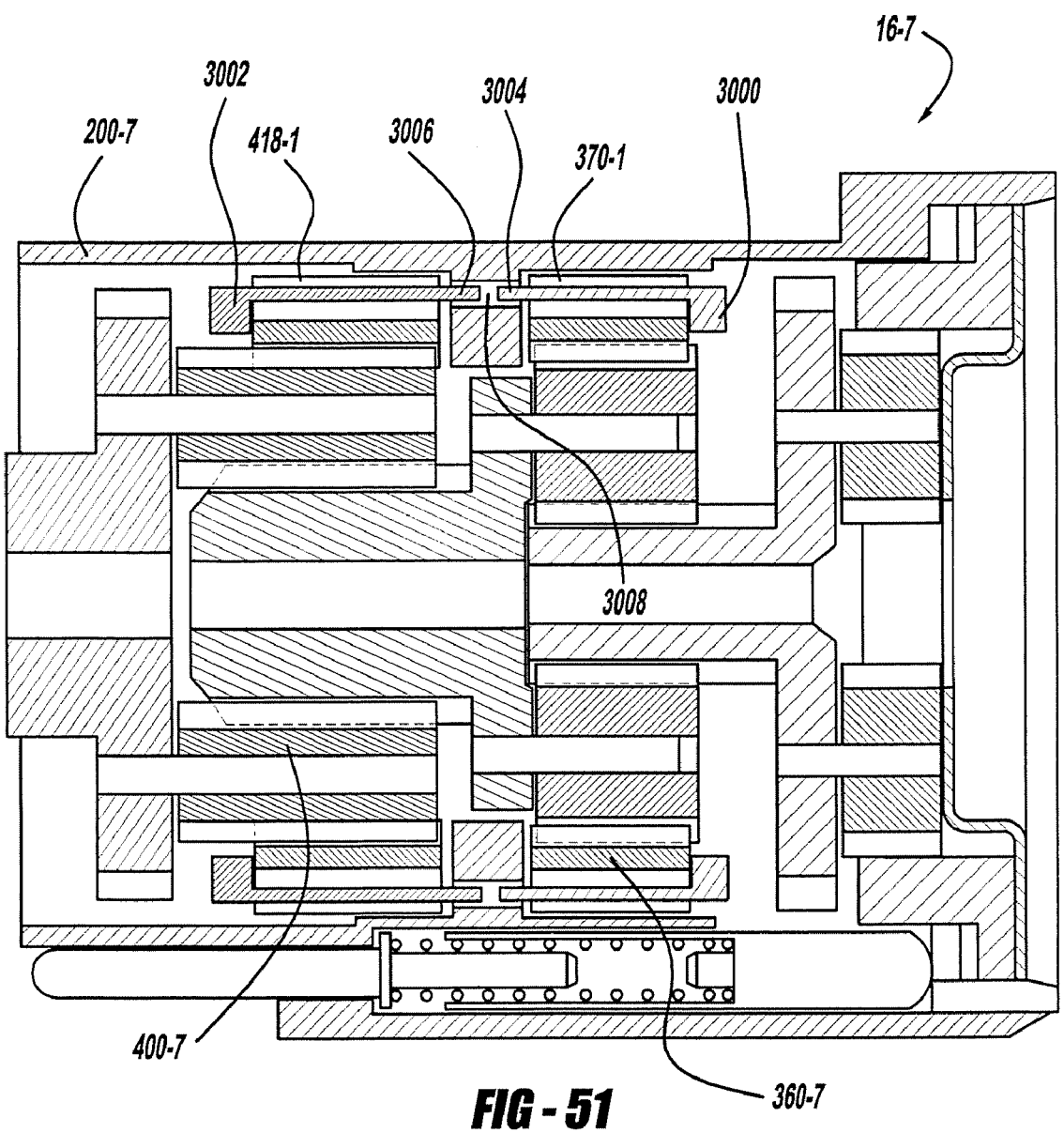
FIGS. 51 through 53 are sectional views similar to FIGS. 23 through 25, respectively, taken along the longitudinal axis of an eighth transmission constructed in accordance with the teachings of the present disclosure.
Figure 52:
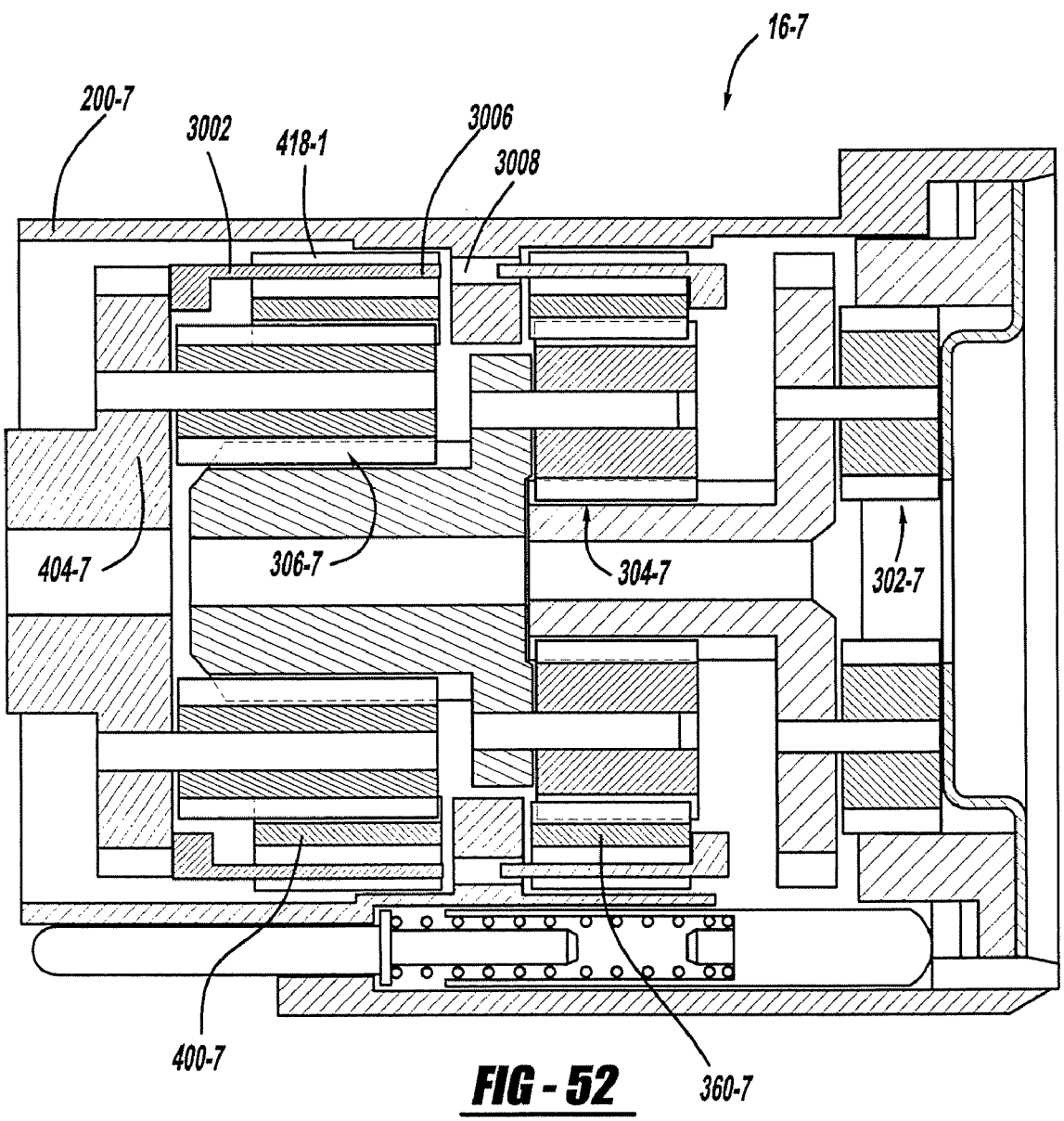
Figure 53:
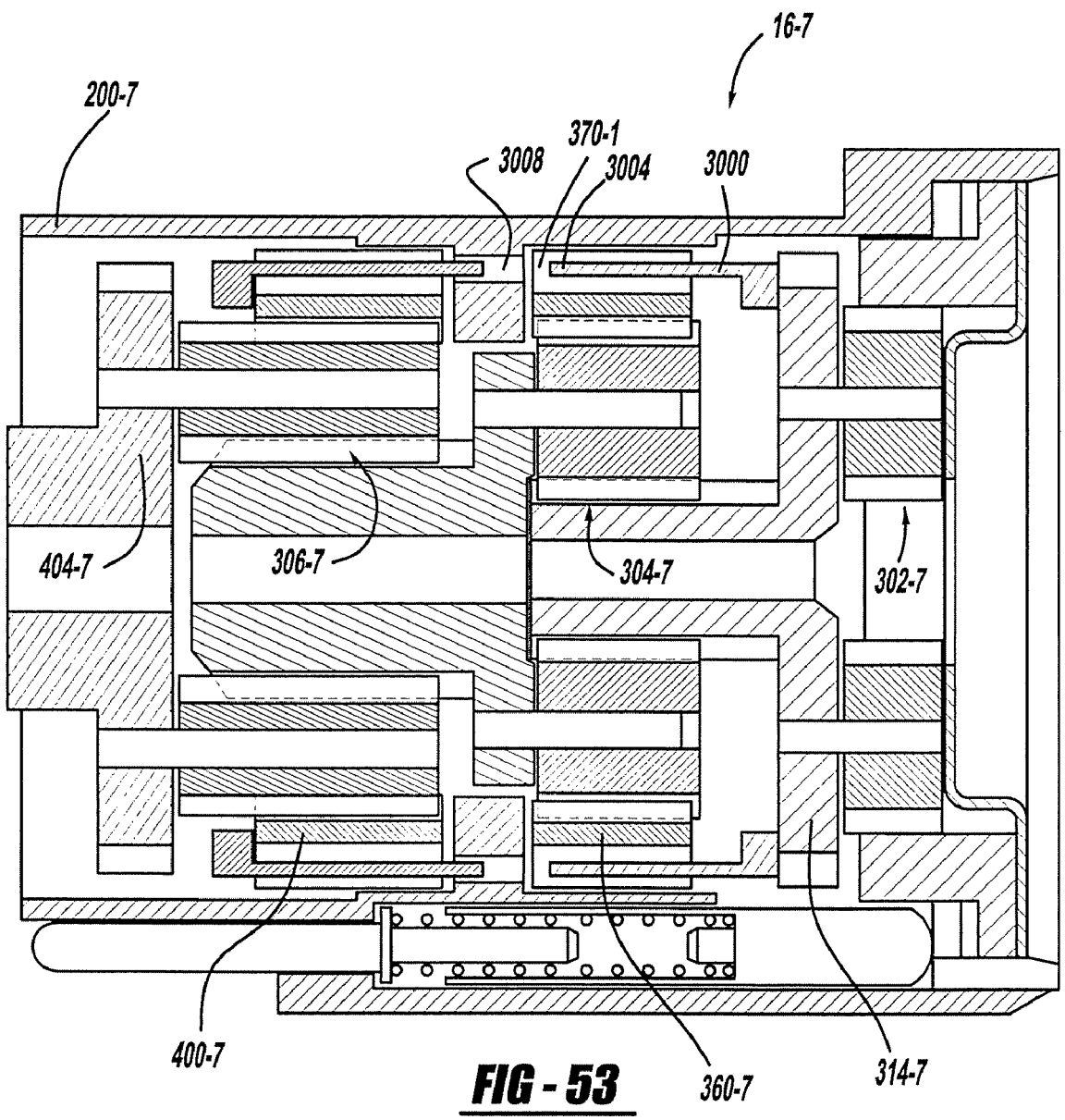

In FIGS. 51 through 53 a further transmission assembly 16-7 constructed in accordance with the teachings of the present disclosure is illustrated. The transmission assembly 16-7 may include movable, intermediate locking elements, such as collars 3000 and 3002, which may be employed to lock the second and third ring gears 360-7 and 400-7 in a stationary position or for rotation with the first and third planet carriers 314-7 and 404-7, respectively. With specific reference to FIG. 51, the transmission 16-7 is illustrated in a first overall speed reduction or gear ratio wherein the collars 3000 and 3002 are positioned to maintain the second and third ring gears 360-7 and 400-7 in a stationary position. The collars 3000 and 3002 may engage the teeth 370-1 and 418-1 of the second and third ring gears 360-7 and 400-7 and may include features, such as teeth or pins 3004 and 3006, respectively, that may engage a mating feature, such as teeth or apertures 3008, that may be formed into another portion of the power tool, such as the transmission sleeve 200-7, to thereby lock a respective one of the ring gears in a stationary position. Alternatively, the pins 3004 and 3006 of the collars 3000 and 3002, respectively, may extend through apertures (not shown) that can be formed in the second and third ring gears 360-7 and 400-7, respectively.

In FIG. 52, the transmission assembly 16-7 is illustrated in a second overall speed reduction or gear ratio wherein the first and second reduction gear sets 302-7 and 304-7 are in an active condition and the third reduction gear set 306-7 is in an inactive condition. The third reduction gear set 306-7 may be inactivated by translating the collar 3002 into a position where the pins 3006 disengage the apertures 3008 in the transmission sleeve 200-7 and the collar 3002 engages both the teeth 418-1 of the third ring gear 400-7 and the third planet carrier 404-7. Any appropriate means may be employed to engage the collar 3002 and the third planet carrier 404-7 to one another, including friction (i.e., frictional engagement), or features, such as pins or teeth, that may be formed on one or both of the third planet carrier 404-7 and the collar 3002. In the example provided, the collar 3002 frictionally engages the planet carrier 404-7.

In FIG. 53, the transmission assembly 16-7 is illustrated in a third overall speed reduction or gear ratio wherein the first and third reduction gear sets 302-7 and 306-7 are in an active condition and the second reduction gear set 304-7 is in an inactive condition. The second reduction gear set 304-7 may be inactivated by translating the collar 3000 into a position where the pins 3004 disengage the apertures 3008 in the transmission sleeve 200-7 and the collar 3000 engages both the teeth 370-1 of the second ring gear 360-7 and the first planet carrier 314-7. Any appropriate means may be employed to engage the collar 3000 and the first planet carrier 314-7 to one another, including friction (i.e., frictional engagement), or features, such as pins or teeth, that may be formed on one or both of the first planet carrier 314-7 and the collar 3000. In the example provided, the collar 3000 frictionally engages the first planet carrier 314-7.

Figure 54:
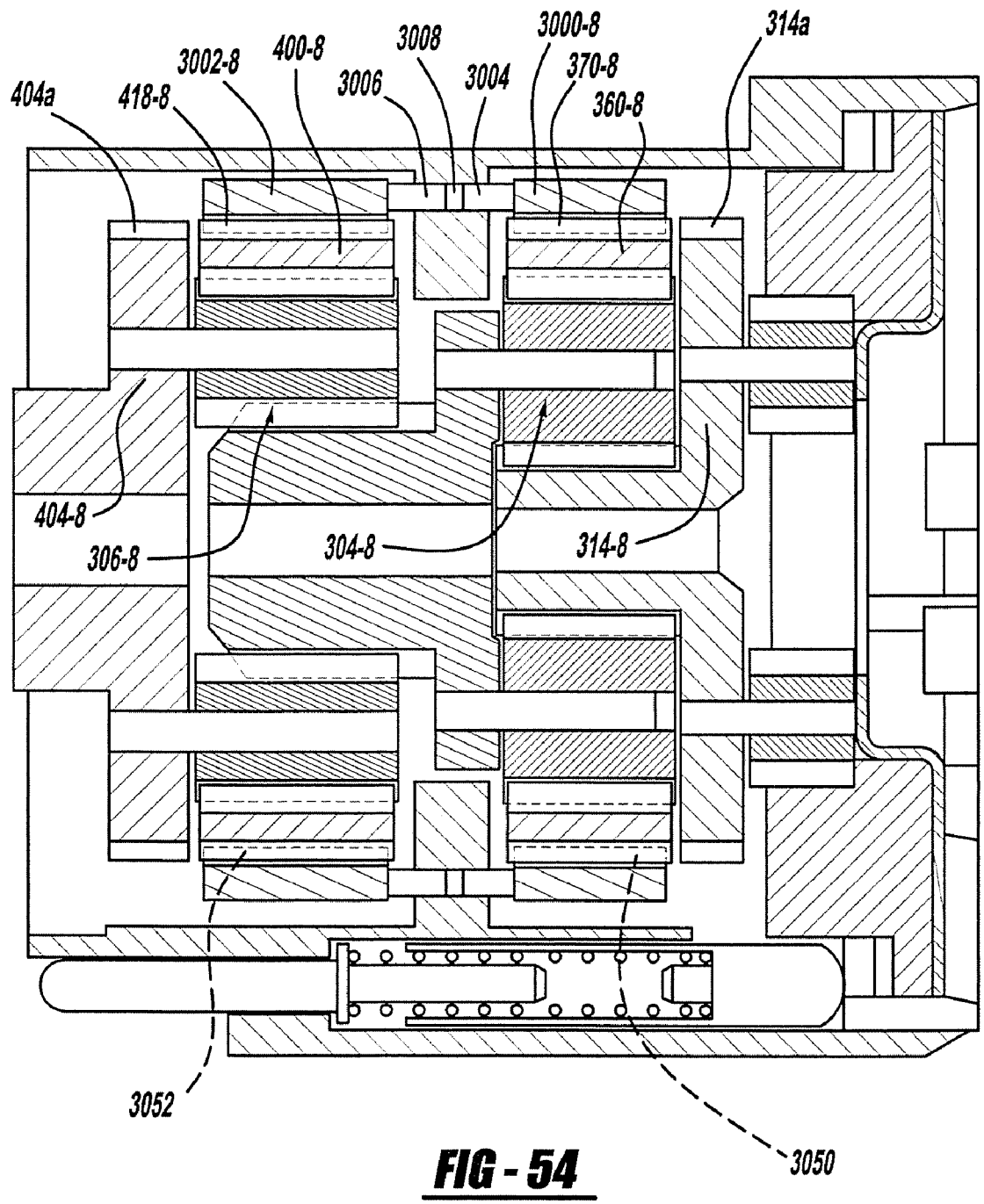
FIGS. 54 through 56 are sectional views similar to FIGS. 23 through 25, respectively, taken along the longitudinal axis of a ninth transmission constructed in accordance with the teachings of the present disclosure.
Figure 55:
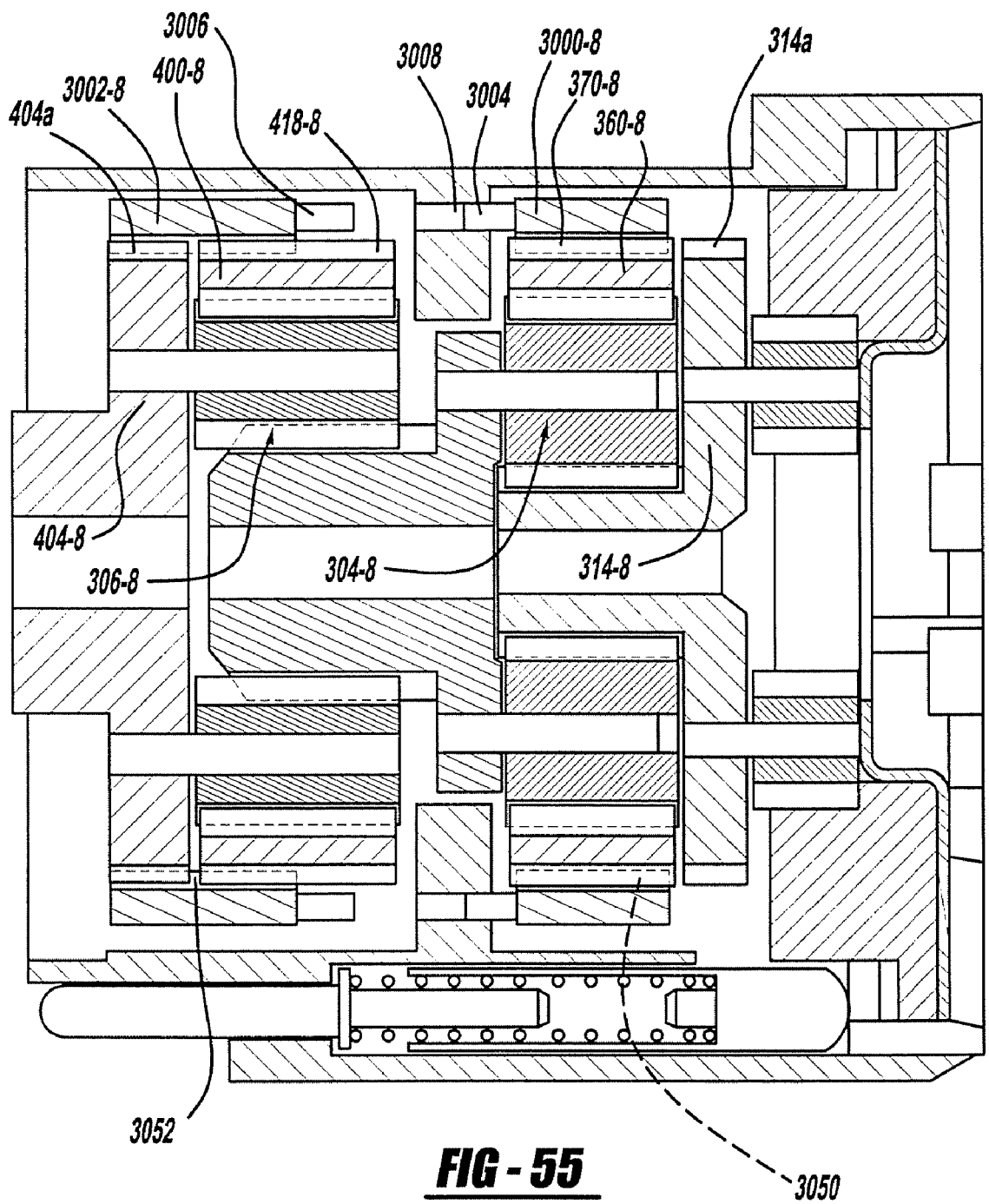
Figure 56:
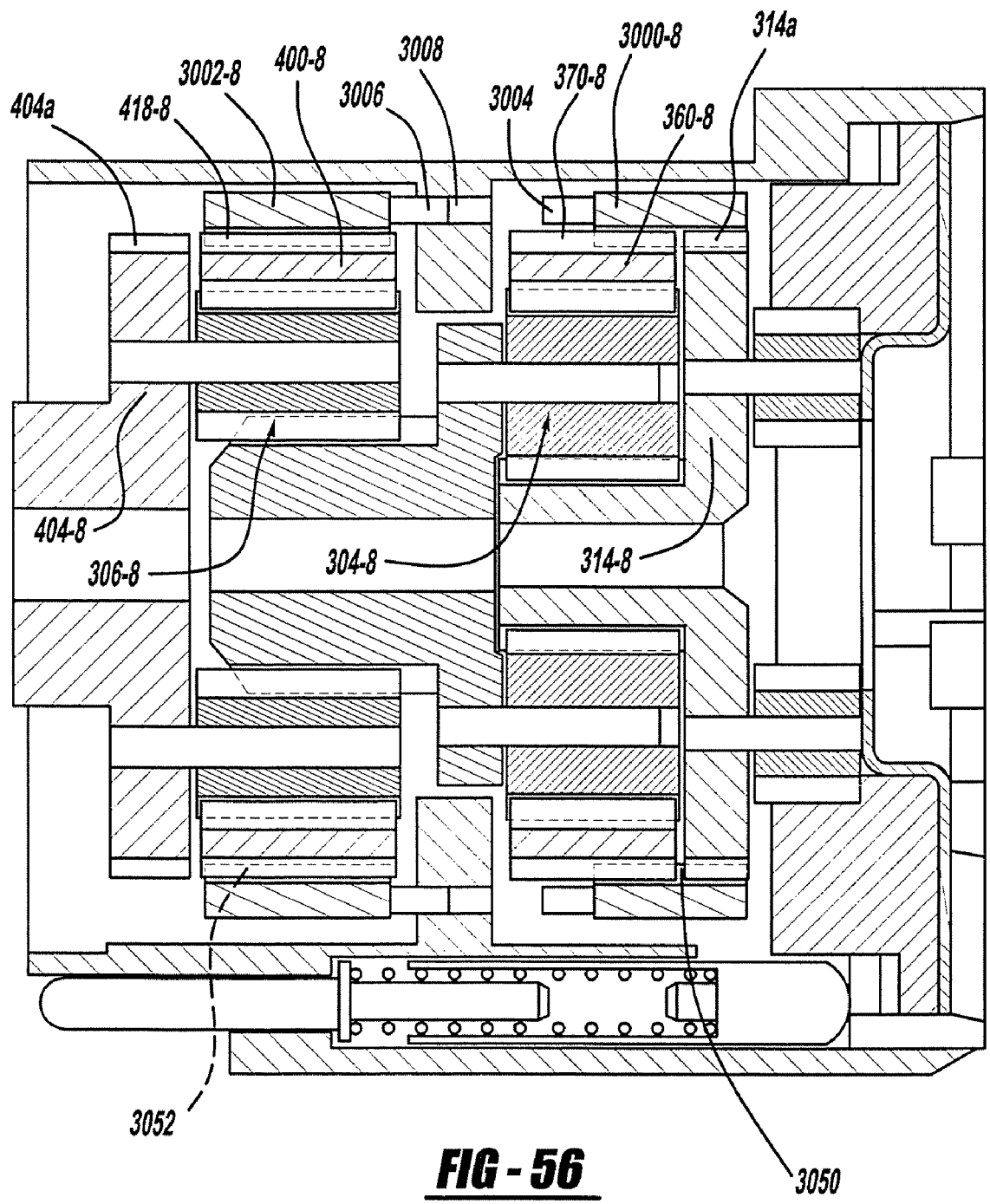

The embodiment of FIGS. 54 through 56 is generally similar to that of FIGS. 51 through 53, except that each of the collars 3000-8 and 3002-8 can include teeth 3050 and 3052, respectively, that meshingly engage the teeth 370-8 and 418-8, respectively, that can be formed on the second and third ring gears 360-8 and 400-8, respectively. As shown in FIG. 56, the collar 3000-8 may be translated into a position where the teeth 3050 meshingly engage both the teeth 370-8 of the second ring gear 360-8 and the teeth 314a of the first planet carrier 314-8 to thereby place the second reduction gear set 304-8 into the inactive mode. Similarly, the collar 3002-8 may be translated into a position where the teeth 3052 engage both the teeth 418-8 of the third ring gear 400-8 and the teeth 404a of the third planet carrier 404-8 to thereby place the third reduction gear set 306-8 into the inactive mode as is shown in FIG. 55.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A method for operating a power tool comprising:
   providing the portable power tool, the portable power tool including a housing, a motor, a driven member, a transmission with a plurality of planetary gear sets that transmits rotary power between the motor and the driven member, and a speed selector, the speed selector including a single switch member that forms a portion of an exterior of the portable power tool and an actuator that couples the single switch member to an axially-translatable member of the transmission;
   moving the single switch member from a first position, which is associated with a first, lowest overall speed reduction ratio, through a second position, which is associated with a second, intermediate overall speed reduction ratio, and into a third position, which is associated with a third, highest overall speed reduction ratio, to cause the transmission to operate in the third overall speed reduction ratio; and
   guiding the actuator with the housing while the single switch member is being moved;
   wherein at least three of the plurality of planetary gear sets transmit torque between the motor and the driven member in each of the first, second and third overall speed reduction ratios; and
   wherein three of the plurality of planetary gear sets perform a speed reduction and torque multiplication function in at least one of the first, second and third overall speed reduction ratios.

2. The method of claim 1, wherein moving the single switch member from the first position through the second position and into the third position includes rotating the single switch member about a longitudinal axis of the transmission.

3. The method of claim 1, wherein each of the first, second and third overall speed reduction ratios is a distinct gear ratio.

4. The method of claim 3, wherein the second overall speed reduction ratio is intermediate the first and third speed reduction ratios.

5. The method of claim 1, wherein the single switch member is employed to selectively non-rotatably lock a ring gear associated with one of the plurality of planetary transmissions to the housing.

6. The method of claim 5, wherein the single switch member is also employed to selectively non-rotatably lock the ring gear to a planet carrier associated with transmission.

7. The method of claim 5, wherein a member in the transmission is moved when the single switch member is moved.

8. The method of claim 7, wherein the member of the transmission includes the ring gear.

9. The method of claim 7, wherein the member of the transmission is translated in an axial direction that is parallel to a longitudinal axis of the transmission.

10. A method for operating a power tool comprising:
    providing the portable power tool, the portable power tool including a housing, a motor, a driven member, a transmission with a plurality of planetary gear sets that transmits rotary power between the motor and the driven member, and a speed selector, the speed selector including a single switch member that forms a portion of an exterior of the portable power tool and an actuator that couples the single switch member to an axially-translatable member of the transmission;
    moving the single switch member from a first position, which is associated with a first, lowest overall speed reduction ratio, through a second position, which is associated with a second, intermediate overall speed reduction ratio, and into third position, which is associated with a third, highest overall speed reduction ratio, to cause the transmission to operate in the third overall speed reduction ratio; and
    guiding the actuator with the housing while the housing the single switch member is being moved;
    wherein at least three of the plurality of planetary gear sets transmit torque between the motor and the driven member in each of the first, second and third overall speed reduction ratios; and
    wherein three of the plurality of planetary gear sets perform a speed reduction and torque multiplication function in at least one of the first, second and third overall speed reduction ratios.

11. The method of claim 10, wherein the housing includes a transmission sleeve into which the transmission is received.

12. The method of claim 10, wherein moving the single switch member from the first position through the second position and into the third position includes rotating the single switch member about a longitudinal axis of the transmission.

13. The method of claim 10, wherein each of the first, second and third overall speed reduction ratios is a distinct gear ratio.

14. The method of claim 13, wherein the second overall speed reduction ratio is intermediate the first and third speed reduction ratios.

15. The method of claim 10, wherein the single switch member is employed to selectively non-rotatably lock a ring gear associated with one of the plurality of planetary transmissions to the housing.

16. The method of claim 15, wherein the single switch member is also employed to selectively non-rotatably lock the ring gear to a planet carrier associated with transmission.

17. The method of claim 15, wherein a member in the transmission is moved when the single switch member is moved.

18. The method of claim 17, wherein the member of the transmission includes the ring gear.

19. The method of claim 17, wherein the member of the transmission is translated in an axial direction that is parallel to a longitudinal axis of the transmission.

20. A method for operating a portable power tool comprising:

providing the portable power tool, the portable power tool including a housing, a motor, a driven member, a transmission with a plurality of planetary gear sets that transmits rotary power between the motor and the driven member, and a speed selector, the speed selector including a single switch member that forms a portion of an exterior of the portable power tool and an actuator that couples the single switch member to an axially-translatable member of the transmission;

moving the single switch member from a first position, which is associated with a first, lowest overall speed reduction ratio, through a second position, which is associated with a second, intermediate overall speed reduction ratio, and into a third position to cause the transmission to operate in a third, highest overall speed reduction ratio; and guiding the actuator with the housing while the single switch member is being moved;

wherein at least three of the plurality of planetary gear sets transmit torque between the motor and the driven member in each of the first, second and third overall speed reduction ratios, wherein three of the plurality of planetary gear sets perform a speed reduction and torque multiplication function in at least one of the first, second and third overall speed reduction ratios, wherein the housing includes a transmission sleeve into which the transmission is received, wherein each of the first, second and third overall speed reduction ratios is a distinct gear ratio and the second overall speed reduction ratio is intermediate the first and third speed reduction ratios, wherein the single switch member is employed to selectively non-rotatably lock a ring gear associated with one of the plurality of planetary transmissions to the housing, wherein the ring gear is moved in an axial direction when the single switch member is moved, wherein the single switch member is also employed to selectively non-rotatably lock the ring gear to a planet carrier associated with transmission, and wherein moving the single switch member from the first position through the second position and into the third position includes rotating the single switch member about a longitudinal axis of the transmission.

* * * * *

UNITED STATES PATENT AND TRADEMARK OFFICE
CERTIFICATE OF CORRECTION

PATENT NO. : 7,404,781 B2  Page 1 of 1
APPLICATION NO. : 11/928173
DATED : July 29, 2008
INVENTOR(S) : Rodney Milbourne et al.

It is certified that error appears in the above-identified patent and that said Letters Patent is hereby corrected as shown below:

Column 26,
Line 47, after "into" insert --a--.
Line 51, after "while" delete "the housing".

Signed and Sealed this

Twelfth Day of January, 2010

David J. Kappos
*Director of the United States Patent and Trademark Office*